United States Patent
Nagaoka

[11] Patent Number: 5,805,345
[45] Date of Patent: Sep. 8, 1998

[54] IMAGE TRANSMISSION OPTICAL SYSTEM

[75] Inventor: Toshiyuki Nagaoka, Akigawa, Japan

[73] Assignee: Olympus Optical Co., Ltd., Tokyo, Japan

[21] Appl. No.: 501,321

[22] Filed: Jul. 12, 1995

[30] Foreign Application Priority Data

Jul. 12, 1994 [JP] Japan .................................. 6-160266
Mar. 6, 1995 [JP] Japan .................................. 7-070389

[51] Int. Cl.⁶ ........................................................ G02B 3/00
[52] U.S. Cl. ............................ 359/654; 359/434; 359/435
[58] Field of Search ................................... 359/652, 653, 359/654, 434, 435

[56] References Cited

U.S. PATENT DOCUMENTS

| | | | |
|---|---|---|---|
| 4,641,927 | 2/1987 | Prescott et al. | 359/654 |
| 4,783,154 | 11/1988 | Takahashi | 359/654 |
| 5,361,166 | 11/1994 | Atkinson et al. | 359/654 |

FOREIGN PATENT DOCUMENTS

| | | |
|---|---|---|
| 49-76536 | 7/1974 | Japan . |
| 61-20015 | 1/1986 | Japan . |
| 62-24208 | 2/1987 | Japan . |
| 4242211 | 8/1992 | Japan . |

*Primary Examiner*—Scott J. Sugarman
*Attorney, Agent, or Firm*—Cushman Darby & Cushman IP Group of Pillsbury Madison & Sutro LLP

[57] ABSTRACT

An image transmission optical system comprising a relay lens system for a single image relaying cycle which has a magnification of approximately 1× and comprises at least one radial gradient-index lens element having a refractive index distribution expressed by the formula (a) shown below and satisfying the following condition (1), thereby favorably correcting logitudinal chromatic aberration produced by the relay lens system for a single image relaying cycle.

$$N(r)=N_{00}+N_{10}r^2+N_{20}r^4+ \ldots \qquad (a)$$

$$1/V_{10}<1/V_{00} \qquad (1)$$

43 Claims, 11 Drawing Sheets

FIG. 9A
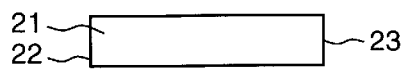
FIG. 9B
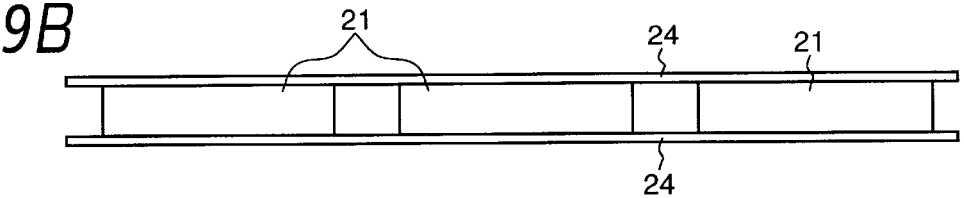
FIG. 9C
FIG. 9D
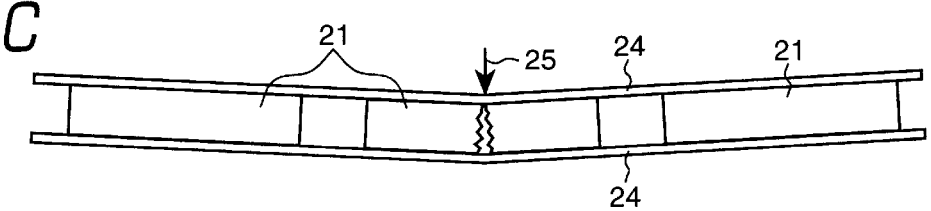
FIG. 10A
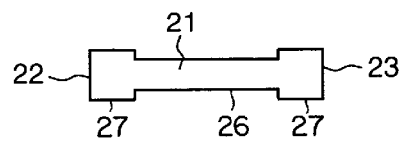
FIG. 10B
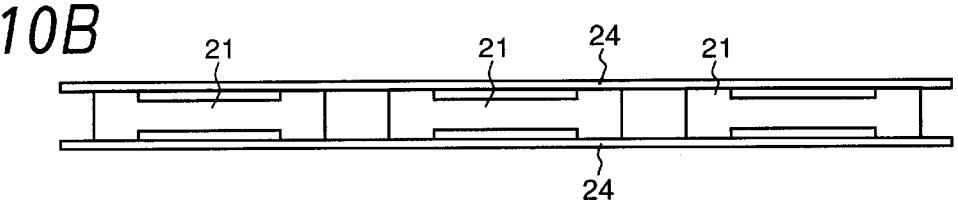
FIG. 10C
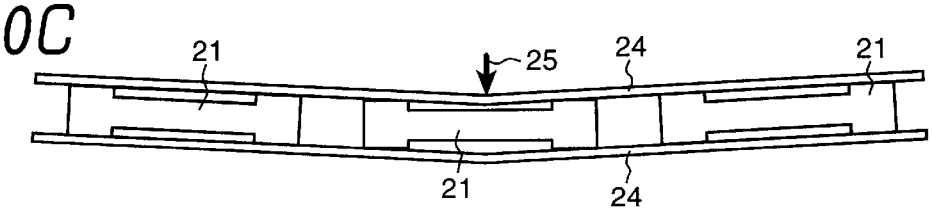
FIG. 10D
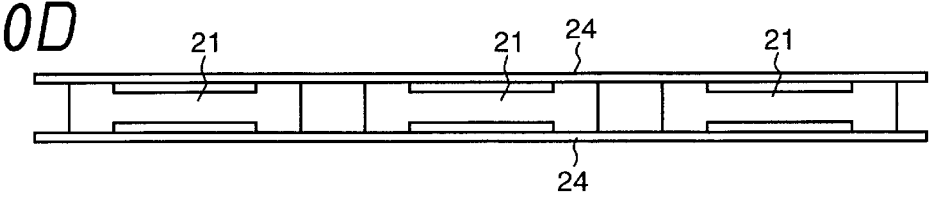

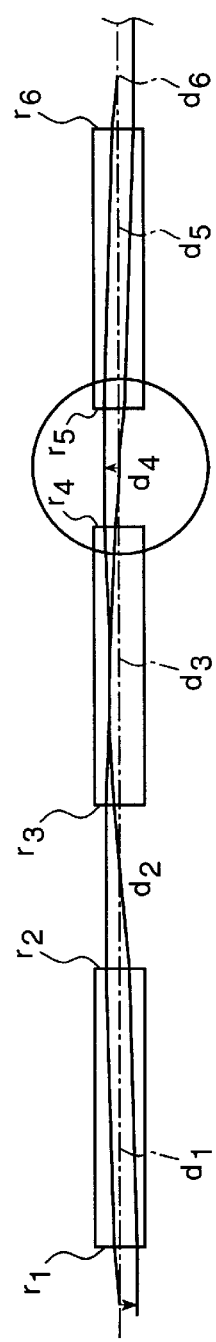
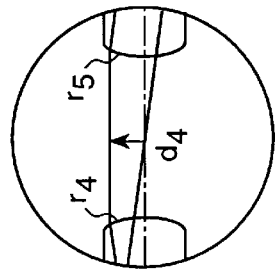
FIG. 18A
FIG. 18C
FIG. 18B

IMAGE TRANSMISSION OPTICAL SYSTEM

BACKGROUND OF THE INVENTION a) Field of the Invention

The present invention relates to an image transmission optical system, and more specifically an image transmission optical system which uses a gradient-index lens element in a particular so-called radial gradient-index lens element which has a refractive index distribution varying in a radial direction.

b) Description of the Prior Art

As image transmission optical systems which are to be used in non-flexible-endoscopes or the similar optical instruments, there are known an optical system disclosed by Japanese Patent Kokai Publication No. Sho 49-76,536 comprising a relay lens system for a single image relaying cycle from an object to an image which is composed as shown in FIG. 1 and another optical system disclosed by Japanese Patent Kokai Publication No. Sho 61-20,015 comprising a relay lens system for a single image relaying cycle from an object to an image which is composed as shown in FIG. 2 or FIG. 3. Each of these conventional examples consists, in order from the object side, of a first lens unit having a positive refractive power, a second lens unit having a positive refractive power and a third lens unit having a positive refractive power: the second lens unit being composed of two or three lens elements.

Mainly for correcting longitudinal chromatic aberration, each of these conventional image transmission optical systems adopts a cemented lens component as the second lens unit. Though it is conceivable to compose the second lens unit of a single lens element for reducing a number of lens elements to be disposed in an image transmission optical system, such a conception is ineffective to obtain an image transmission optical system which has high optical performance since it is difficult to correct longitudinal chromatic aberration favorably in an optical system as a whole by using a homogeneous lens element.

Further, known as another conventional example is an image transmission optical system disclosed by Japanese Patent Kokai Publication No. Hei 4-242,211 which consists, in order from the object side, of a first lens unit having a positive refractive power and a second lens unit having a positive refractive power: each of these lens units being composed of two lens elements or the optical system being composed of a total of four lens elements. When this conventional example is composed of two lens units each consisting of a single lens element or won the optical system is composed of a total of two homogeneous lens elements, it is extremely difficult to correct aberrations favorably in the optical system. In particular, it is difficult, by using two homogeneous lens elements, to favorably correct a Petzval's sum and longitudinal chromatic aberration so as to compose an optical system having high performance.

For correcting the defect described above, it is conceivable to adopt radial gradient-index lens elements which have excellent characteristics for correcting a Petzval's sum and chromatic aberration. An optical system disclosed by Japanese Patent Kokai Publication No. Sho 62-24,208 having a composition shown in FIG. 4 is known as a conventional example of image transmission optical system which uses radial gradient-index lens elements. However, this patent makes no reference to correction of chromatic aberration which is definitively important to judge imaging performance of imaging performance thereof in spite of the fact that it uses the radial gradient-index lens elements which are effective for correcting chromatic aberration.

SUMMARY OF THE INVENTION

A primary object of the present invention is to provide an image transmission optical system which is to be used in non-flexible endoscopes and similar optical instruments, and capable of favorably correcting longitudinal chromatic aberration produced in a relay lens system.

The image transmission optical system according to the present invention comprises a relay lens system which has a magnification of approximately 1× and comprises at least one radial gradient-index lens element which has a refractive index distribution expressed by the formula (a) shown below and satisfies the following condition (1):

$$N(r) = N_{00} + N_{10}r^2 + N_{20}r^4 + \ldots \quad (a)$$

$$1/V_{10} < 1/V_{00} \quad (1)$$

wherein the reference symbol r represents a distance as measured from an optical axis in the radial direction, the reference symbol N(r) designates a refractive index, at a standard wavelength, of a lens portion located at the distance r from the optical axis, the reference symbol $N_{00}$ denotes a refractive index, at the standard wavelength, of a lens portion located on the optical axis, the reference symbols $N_{10}, N_{20}, \ldots$ denote refractive index distribution coefficients of the second, fourth, ... orders respectively at the standard wavelength, and the reference symbols $V_{00}$ and $V_{10}$ designate dispersing powers of the radial gradient-index lens element which are expressed by the following formulae:

$$V_{00} = (N_{00d} - 1)/(N_{00F} - N_{00C})$$

$$V_{10} = N_{10d}/(N_{10F} - N_{10C})$$

wherein the reference symbols $N_{00d}$, $N_{00F}$ and $N_{00C}$ represent refractive indices of the lens portion located on the optical axis for the d-line, F-line and the C-line respectively, and the reference symbols $N_{10d}$, $N_{10F}$ and $N_{10C}$ designate refractive index coefficients of the second order for the d-line, F-line and the C-line respectively.

Further, the image transmission optical system according to the present invention comprises a relay lens system for a single image relaying cycle from an object to an image which has a magnification of approximately 1× and is composed, in order from the object side, of a first lens unit having a positive refractive power and a second lens unit having a positive refractive power, each of which comprises a radial gradient-index lens element having a refractive index distribution expressed by the above-mentioned formula (a).

Furthermore, the image transmission optical system according to the present invention comprises a relay lens system for a single image relaying cycle from an object to an image which has a magnification of approximately 1× and is composed, in order from the object side, of a first lens unit having a positive refractive power, a second lens unit having a positive refractive power and a third lens unit having a positive refractive power: the second lens unit consisting of a single radial gradient-index lens element having a refractive index distribution expressed by the above-mentioned formula (a).

Moreover, the image transmission optical system according to the present invention comprises a relay lens system for a single image relaying cycle from an object to an image which has a magnification of approximately 1× and is composed of at least three lens element including a radial gradient-index lens element which has a refractive index distribution expressed by the above-mentioned formula (a), and satisfies the following conditions (2) and (3):

$$|(N_{00}-1)/r_{1G}|<0.9\times(1/f_G) \quad (2)$$

$$|(N_{00}-1)/r_{2G}|<0.9\times(1/f_G) \quad (3)$$

wherein the reference symbols $r_{1G}$ and $r_{2G}$ represent radii of curvature on an object side surface and an image side surface respectively of the radial gradient-index lens element, and the reference symbol $f_G$ designates a focal length of the radial gradient-index lens element.

All the image transmission optical systems according to the present invention which have been described above favorably correct longitudinal chromatic aberration.

In case of the image transmission optical system according to the present invention which is composed of the first, second and third lens units and in which the second lens unit consists of the single radial gradient-index lens element having the refractive index distribution expressed by the formula (a), it is desirable, for obtaining high optical performance by sufficiently correcting chromatic aberration and a Petzval's sum, to satisfy a condition (5) or conditions (5) and (6) which are to be described later.

Furthermore, in the case of the image transmission optical system according to the present invention which is composed of the three lens units including the second lens unit consisting of the radial gradient-index lens element having the refractive index distribution expressed by the formula (a), it is desirable that a number of a single or a plurality of lens elements disposed on the object side in the second lens unit is the same as that of a single or a plurality of lens elements disposed on the image side lens unit, that the lens element disposed on the object side have radii of curvature and thickness which are substantially the same as those of the lens elements disposed on the image side, and that the lens elements disposed on the object side and those disposed on the image side are arrange on an optical axis symmetrically with regard the second lens unit (the radial gradient-index lens element).

BRIEF DESCRIPTION OF THE DRAWINGS

FIG. 9A, FIG. 9B, FIG. 9C and FIG. 9D show sectional views illustrating processes of breakage of the image transmission optical system according to the present invention;

FIG. 10A, FIG. 10B, FIG. 10C and FIG. 10D show sectional views descriptive of a means for preventing breakage of the image transmission optical system according to the present invention;

FIG. 18A and FIG. 18B are sectional views illustrating a composition of a sixteenth embodiment of the image transmission optical system according to the present invention;

FIG. 18C is an enlarged partial view of the sectional view illustrated in FIG. 18A;

DETAILED DESCRIPTION OF THE PREFERRED EMBODIMENTS

Figure 1:
FIG. 1 through FIG. 4 show sectional views illustrating compositions of conventional image transmission optical systems.
Figure 2:
Figure 3:
Figure 4:

Now, the present invention will be described more detailedly below with reference to the preferred embodiment thereof illustrated in the accompanying drawings.

The image transmission optical system according to the present invention comprises a relay lens system which has a magnification of approximately 1× as described above and is configured so as to correct mainly longitudinal chromatic aberration by using at least one radial gradient-index lens element which has a refractive index distribution expressed by the following formula (a):

$$N(r)=N_{00}+N_{10}r^2+N_{20}r^4+\ldots \quad (a)$$

wherein the reference symbol r represent a distance as measured from an optical axis in the radial direction, the reference symbol N(r) designates a refractive index at a point located at the distance of r from the optical axis, for a ray having a standard wavelength, the reference symbol $N_{00}$ denotes a refractive index on the optical axis for the ray having the standard wavelength, and the reference symbols $N_{10}, N_{20}, \ldots$ represent refractive index distribution coefficients of the second, fourth, ... orders respectively.

Further, it is known that longitudinal chromatic aberration PAC which is produced by a radial gradient-index lens element having a refractive index distribution expressed by the formula (a) is given by the following formula (b):

$$PAC = K(\phi_s/V_{00} + \phi_m/V_{10}) \quad (b)$$

wherein the reference symbol K represents a constant which is determined dependently on a height of ray and an angle of a final paraxial ray, and the reference symbols $\phi_s$ and $\phi_m$ designate refractive indices of a surface and a medium respectively of the radial gradient-index lens element.

It is known that the refractive index $\phi_m$ of medium is approximated by the following formula (c):

$$\phi_m \approx -2N_{10}d_G \quad (c)$$

wherein the reference symbol dG represents thickness of the radial gradient-index lens element.

As is apparent from the formula (b) mentioned above, it is possible to control longitudinal chromatic aberration to be produced by the radial gradient-index lens element by adequately varying a value of $V_{10}$.

It is therefore desirable to use, in an optical system having a magnification of approximately 1× such as the image transmission optical system according to the present invention, at least one radial gradient-index lens element which satisfies the following condition (1):

$$1/V_{10} < 1/V_{00} \quad (1)$$

wherein the reference symbols $V_{00}$ and $V_{10}$ represent dispersing powers of the radial gradient-index lens element which are expressed by the following formulae respectively:

$$V_{00} = (N_{00d} - 1)/(N_{00F} - N_{00C})$$

$$V_{10} = N_{10d}/(N_{10F} - N_{10C})$$

For correcting longitudinal chromatic aberration in the image transmission optical system according to the present invention, it is desirable to use to use at least one radial gradient-index lens element which satisfies the condition (1). A radial gradient-index lens element which satisfies the condition (1) produces longitudinal chromatic aberration in an amount smaller than that to be produced by a homogeneous lens element having a refractive power which is the same as that of the radial gradient-index lens element. If a radial gradient-index lens element does not satisfy the condition (1) and has dispersing powers which are expresses as:

$$1/V_{10} < 1/V_{00} \quad (1)$$

it will not be easy to configure the radial gradient-index lens element so as to produce longitudinal chromatic aberration in an amount smaller than that to be produced by a homogeneous lens element having a refractive power which is the same as that of the radial gradient-index lens element.

The image transmission optical system according to the present invention has been obtained by using at least one radial gradient-index lens element, for more favorable correction of longitudinal chromatic aberration, in the conventional example described in the "Background of the Invention", i.e., the optical system disclosed by Japanese Patent Kokai Publication No. Hei 4-242,211 composed of the two lens units, the optical system disclosed by Japanese Patent Kokai Publication No. Sho 49-76,536 composed of the three lens units, or the optical system disclosed by Japanese Patent Kokai Publication No. Sho 61-20,015 composed of the three lens unit and having the magnification of approximately 1×.

Further, a problem is posed by correction of longitudinal chromatic aberration which is produced in a second lens unit, in particular when this lens unit is composed of a single lens element for reducing the number of lens element used in an image transmission optical system which has a magnification of approximately 1×, and is composed, in order from the object side, of a first lens unit having a positive refractive power, a second lens unit having a positive refractive power and a third lens unit having a positive refractive power. It is therefore desirable to compose the second lens unit of a single radial gradient-index lens element in such an image transmission optical system. The present invention has succeeded in providing an image transmission optical system which is composed of a small number of lens elements and has high imaging performance by composing the second lens unit of a radial gradient-index lens element featuring high chromatic aberration correction in the above-mentioned optical system composed of the three lens units.

Furthermore, in the case of the image transmission optical system according to the present invention, comprising a relay lens system for a single image relaying cycle from an object to an image which has a magnification of approximately 1× and is composed of at least three lens elements, it is desirable to use at least one radial gradient-index lens element which has a refractive index distribution expressed by the formula (a), and satisfies the following conditions (2) and (3):

$$|(N_{00}-1)/r_{1G}| < 0.9 \times 1/f_G \quad (2)$$

$$|(N_{00}-1)/r_{2G}| < 0.9 \times 1/f_G \quad (3)$$

wherein the reference symbol $N_{00}$ represents a refractive index of the radial gradient-index lens element on the optical axis, the reference symbols $r_{1G}$ and $r_{2G}$ designate radii of curvature on an object side surface and an image side surface respectively of the radial gradient-index lens element, and the reference symbols $f_G$ denotes a focal length of the radial gradient-index lens element.

As is apparent from the formula (b), it is possible, by controlling a value of $V_{10}$ of the lens element, to vary to a desired level an amount of chromatic aberration to be produced by the lens element itself. When a radial gradient-index lens element has a refractive power of medium which is extremely lower than a refractive power of surface given by the formula (c), however, the radial gradient-index lens element cannot exhibit its effect sufficient for correction of chromatic aberration. In contrast to a homogeneous lens element, a radial gradient-index lens element permits controlling amounts of aberrations other than chromatic aberration, for example a Petzval's sum and spherical aberration, amounts of these aberrations are influenced mainly by refractive powers of surface and medium. For example, a Petzval's sum PTZ of a radial gradient-index lens element which is expressed by a formula (d) shown below will be strongly positive, thereby tilting an image surface toward the object side if the lens element has a positive refractive power of surface is stronger than a refractive power of medium $\phi_m$:

$$PTZ = \phi_s/N_{00} + \phi_m/N_{00}^2 \quad (d)$$

For this reason, it is necessary, for correcting chromatic aberration favorably by using a Iadial gradient-index lens element, to select an adequate refractive power of surface in combination with an adequate refractive power of medium while taking corrections of other aberrations into consideration.

Table 1 lists variations of aberrations which were obtained by simulating variations of a refractive power of surface and a refractive power of medium. The values of the aberration coefficients were obtained by varying, at an image height of 1 mm and an infinite object distance, a refractive power of surface and a refractive power of medium of a radial gradient-index lens element which has a focal length $f_G$=10 mm, an F number of 4.0, $N_{00}$=1.6 and $V_{00}$=40.

TABLE

Example 1

$r_{1G} = \infty$, $|(N_{00} - 1)/r_{1G}| = 0.00$, $1/f_G = 0.10$
$N_{10} = -1.0573 \times 10^{-2}$, $N_{20} = 3.3569 \times 10^{-5}$, $V_{10} = 932.67$
$r_{2G} = \infty$, $|(N_{00} - 1)/r_{2G}| = 0.00$

|          | SA3      | CM3      | AS3      |
|----------|----------|----------|----------|
| $r_{1G}$ | 0.00000  | 0.00000  | 0.00000  |
| G        | 0.00490  | 0.01410  | -0.00102 |
| $r_{2G}$ | -0.00499 | 0.01006  | -0.00225 |
| Total    | -0.00010 | 0.02416  | -0.00327 |

|          | DIST3    | PTZ3     | PAC      |
|----------|----------|----------|----------|
| $r_{1G}$ | -0.00305 | 0.00000  | 0.00000  |
| G        | -0.00090 | -0.00258 | 0.00984  |
| $r_{2G}$ | 0.00151  | 0.00000  | -0.00984 |
| Total    | -0.00244 | -0.00258 | 0.00000  |

Example 2

$r_{1G} = 20.00$, $|(N_{00} - 1)/r_{1G}| = 0.030$, $1/f_G = 0.10$
$N_{10} = -7.6531 \times 10^{-3}$, $N_{20} = -1.6269 \times 10^{-5}$, $V_{10} = -105.43$
$r_{2G} = \infty$, $|(N_{00} - 1)/r_{2G}| = 0.00$

|          | SA3      | CM3      | AS3      |
|----------|----------|----------|----------|
| $r_{1G}$ | 0.01466  | -0.00137 | -0.00073 |
| G        | -0.01004 | 0.00796  | -0.00083 |
| $r_{2G}$ | -0.00472 | 0.00999  | -0.00235 |
| Total    | -0.00009 | 0.01659  | -0.00392 |

|          | DIST3    | PTZ3     | PAC      |
|----------|----------|----------|----------|
| $r_{1G}$ | -0.00305 | -0.00117 | -0.00586 |
| G        | -0.00070 | -0.00187 | 0.01516  |
| $r_{2G}$ | 0.00166  | 0.00000  | -0.00929 |
| Total    | -0.00209 | -0.00304 | 0.00001  |

Example 3

$r_{1G} = 10.00$, $|(N_{00} - 1)/r_{1G}| = 0.060$, $1/f_G = 0.10$
$N_{10} = -4.5252 \times 10^{-3}$, $N_{20} = -2.7258 \times 10^{-5}$, $V_{10} = -27.18$
$r_{2G} = \infty$, $|(N_{00} - 1)/r_{2G}| = 0.00$

|          | SA3      | CM3      | AS3      |
|----------|----------|----------|----------|
| $r_{1G}$ | 0.01539  | -0.00549 | -0.00146 |
| G        | -0.01110 | 0.00434  | -0.00050 |
| $r_{2G}$ | -0.00445 | 0.00992  | -0.00246 |
| Total    | -0.00016 | 0.00877  | -0.00443 |

|          | DIST3    | PTZ3     | PAC      |
|----------|----------|----------|----------|
| $r_{1G}$ | -0.00305 | -0.00234 | -0.01172 |
| G        | -0.00044 | -0.00110 | 0.02054  |
| $r_{2G}$ | 0.00183  | 0.00000  | -0.00875 |
| Total    | -0.00165 | -0.00345 | 0.00007  |

TABLE-continued

Example 4

$r_{1G} = 8.00$, $|(N_{00} - 1)/r_{1G}| = 0.075$, $1/f_G = 0.10$
$N_{10} = -2.8777 \times 10^{-3}$, $N_{20} = -9.1766 \times 10^{-6}$, $V_{10} = -13.11$
$r_{2G} = \infty$, $|(N_{00} - 1)/r_{2G}| = 0.00$

|          | SA3      | CM3      | AS3      |
|----------|----------|----------|----------|
| $r_{1G}$ | 0.00958  | -0.00858 | -0.00183 |
| G        | -0.00532 | 0.00383  | -0.00025 |
| $r_{2G}$ | -0.00431 | 0.00989  | -0.00252 |
| Total    | -0.00005 | 0.00513  | -0.00460 |

|          | DIST3    | PTZ3     | PAC      |
|----------|----------|----------|----------|
| $r_{1G}$ | -0.00305 | -0.00293 | -0.01465 |
| G        | -0.00027 | -0.00070 | 0.02345  |
| $r_{2G}$ | 0.00192  | 0.00000  | -0.00849 |
| Total    | -0.00139 | -0.00363 | 0.00031  |

Example 5

$r_{1G} = 6.00$, $|(N_{00} - 1)/r_{1G}| = 0.100$, $1/f_G = 0.10$
$N_{10} = -5.8539 \times 10^{-7}$, $N_{20} = 7.3173 \times 10^{-5}$, $V_{10} = -0.0021$
$r_{2G} = \infty$, $|(N_{00} - 1)/r_{2G}| = 0.00$

|          | SA3      | CM3      | AS3      |
|----------|----------|----------|----------|
| $r_{1G}$ | -0.01059 | -0.01526 | -0.00244 |
| G        | 0.01548  | 0.00546  | 0.00035  |
| $r_{2G}$ | -0.00409 | 0.00982  | -0.00262 |
| Total    | 0.00080  | 0.00002  | -0.00471 |

|          | DIST3    | PTZ3     | PAC      |
|----------|----------|----------|----------|
| $r_{1G}$ | -0.00305 | -0.00391 | -0.01953 |
| G        | 0.00008  | 0.00000  | 0.02472  |
| $r_{2G}$ | 0.00209  | 0.00000  | -0.00806 |
| Total    | -0.00087 | -0.00363 | -0.00287 |

Example 6

$r_{1G} = -20.00$, $|(N_{00} - 1)/r_{1G}| = 0.030$, $1/f_G = 0.10$
$N_{10} = -1.3300 \times 10^{-2}$, $N_{20} = 1.01 \times 10^{-4}$, $V_{10} = 153.39$
$r_{2G} = \infty$, $|(N_{00} - 1)/r_{2G}| = 0.00$

|          | SA3      | CM3      | AS3      |
|----------|----------|----------|----------|
| $r_{1G}$ | -0.02569 | -0.00137 | 0.00073  |
| G        | 0.03051  | 0.02166  | -0.00113 |
| $r_{2G}$ | -0.00528 | 0.01012  | -0.00216 |
| Total    | -0.00045 | 0.03041  | -0.00255 |

|          | DIST3    | PTZ3     | PAC      |
|----------|----------|----------|----------|
| $r_{1G}$ | -0.00305 | 0.00117  | 0.00586  |
| G        | -0.00106 | -0.00325 | 0.00454  |
| $r_{2G}$ | 0.00138  | 0.00000  | -0.01039 |
| Total    | -0.00272 | -0.00208 | 0.00001  |

Example 7

$r_{1G} = -10.00$, $|(N_{00} - 1)/r_{1G}| = 0.060$, $1/f_G = 0.10$
$N_{10} = -1.5851 \times 10^{-2}$, $N_{20} = 1.75 \times 10^{-4}$, $V_{10} = 102.62$
$r_{2G} = \infty$, $|(N_{00} - 1)/r_{2G}| = 0.00$

|          | SA3      | CM3      | AS3      |
|----------|----------|----------|----------|
| $r_{1G}$ | -0.05963 | -0.00549 | 0.00146  |
| G        | 0.06389  | 0.02962  | -0.00123 |
| $r_{2G}$ | -0.00556 | 0.01018  | -0.00207 |
| Total    | -0.00130 | 0.03431  | -0.00183 |

|          | DIST3    | PTZ3     | PAC      |
|----------|----------|----------|----------|
| $r_{1G}$ | -0.00305 | 0.00234  | 0.01172  |
| G        | -0.00119 | -0.00387 | -0.00075 |

TABLE-continued

| | | | |
|---|---|---|---|
| $r_{2G}$ | 0.00126 | 0.00000 | −0.01095 |
| Total | −0.00297 | −0.00153 | 0.00002 |

Example 8

$r_{1G} = -8.00$, $|(N_{00} - 1)/r_{1G}| = 0.075$, $1/f_G = 0.10$
$N_{10} = -1.7064 \times 10^{-2}$, $N_{20} = 2.11 \times 10^{-4}$, $V_{10} = 91.59$
$r_{2G} = \infty$, $|(N_{00} - 1)/r_{2G}| = 0.00$

| | SA3 | CH3 | AS3 |
|---|---|---|---|
| $r_{1G}$ | −0.07885 | −0.00858 | 0.00183 |
| G | 0.08261 | 0.03345 | −0.00129 |
| $r_{2G}$ | −0.00571 | 0.01021 | −0.00203 |
| Total | −0.00195 | 0.03507 | −0.00149 |

| | DIST3 | PTZ3 | PAC |
|---|---|---|---|
| $r_{1G}$ | −0.00305 | 0.00293 | 0.01465 |
| G | −0.00125 | −0.00417 | −0.00346 |
| $r_{2G}$ | 0.00121 | 0.00000 | −0.01124 |
| Total | −0.00309 | −0.00124 | −0.00005 |

Example 9

$r_{1G} = -6.00$, $|(N_{00} - 1)/r_{1G}| = 0.100$, $1/f_G = 0.10$
$N_{10} = -1.9000 \times 10^{-2}$, $N_{20} = 2.67 \times 10^{-4}$, $V_{10} = 80.83$
$r_{2G} = \infty$, $|(N_{00} - 1)/r_{2G}| = 0.00$

| | SA3 | CM3 | AS3 |
|---|---|---|---|
| $r_{1G}$ | −0.11310 | −0.01526 | 0.00244 |
| G | 0.11559 | 0.03918 | −0.00144 |
| $r_{2G}$ | −0.00595 | 0.01025 | −0.00196 |
| Total | −0.00347 | 0.03417 | −0.00096 |

| | DIST3 | PTI3 | PAC |
|---|---|---|---|
| $r_{1G}$ | −0.00305 | 0.00391 | 0.01953 |
| G | −0.00135 | −0.00464 | −0.00789 |
| $r_{2G}$ | 0.00113 | 0.00000 | −0.01172 |
| Total | −0.00327 | −0.00073 | −0.00008 |

Example 10

$r_{1G} = 10.00$, $|(N_{00} - 1)/r_{1G}| = 0.060$, $1/f_G = 0.10$
$N_{10} = -9.3808 \times 10^{-3}$, $N_{20} = -5.62 \times 10^{-5}$, $V_{10} = -145.10$
$r_{2G} = 10.00$, $|(N_{00} - 1)/r_{2G}| = 0.060$

| | SA3 | CM3 | AS3 |
|---|---|---|---|
| $r_{1G}$ | 0.03436 | −0.00549 | −0.00146 |
| G | −0.02644 | 0.01078 | −0.00066 |
| $r_{2G}$ | −0.00807 | −0.00510 | −0.00435 |
| Total | −0.00016 | 0.00019 | −0.00647 |

| | DIST3 | PTZ3 | PAC |
|---|---|---|---|
| $r_{1G}$ | −0.00305 | −0.00234 | −0.01172 |
| G | −0.00078 | −0.00229 | 0.01429 |
| $r_{2G}$ | 0.00314 | 0.00234 | −0.00256 |
| Total | −0.00069 | −0.00229 | 0.00001 |

Example 11

$r_{1G} = 8.00$, $|(N_{00} - 1)/r_{1G}| = 0.075$, $1/f_G = 0.10$
$N_{10} = -7.6232 \times 10^{-3}$, $N_{20} = -6.98 \times 10^{-5}$, $V_{10} = -63.85$
$r_{2G} = 10.00$, $|(N_{00} - 1)/r_{2G}| = 0.060$

| | SA3 | CM3 | AS3 |
|---|---|---|---|
| $r_{1G}$ | 0.03275 | −0.00858 | −0.00183 |
| G | −0.02713 | 0.00786 | −0.00058 |
| $r_{2G}$ | −0.00593 | −0.00284 | −0.00422 |
| Total | −0.00031 | −0.00357 | −0.00664 |

| | DIST3 | PTZ3 | PAC |
|---|---|---|---|
| $r_{1G}$ | −0.00305 | −0.00293 | −0.01465 |
| G | −0.00066 | −0.00186 | 0.01731 |
| $r_{2G}$ | 0.00336 | 0.00234 | −0.00264 |
| Total | −0.00035 | −0.00245 | 0.00002 |

Example 12

$r_{1G} = -10.00$, $|(N_{00} - 1)/r_{1G}| = 0.060$, $1/f_G = 0.10$
$N_{10} = -9.3808 \times 10^{-3}$, $N_{20} = 6.29 \times 10^{-5}$, $V_{10} = -1197.50$
$r_{2G} = -10.00$, $|(N_{00} - 1)/r_{2G}| = 0.060$

| | SA3 | CM3 | AS3 |
|---|---|---|---|
| $r_{1G}$ | −0.03436 | −0.00549 | 0.00146 |
| G | 0.02743 | 0.00704 | −0.00168 |
| $r_{2G}$ | 0.00643 | 0.04508 | 0.00142 |
| Total | −0.00050 | 0.04663 | 0.00121 |

| | DIST3 | PTZ3 | PAC |
|---|---|---|---|
| $r_{1G}$ | −0.00305 | 0.00234 | 0.01172 |
| G | −0.00092 | −0.00229 | 0.01304 |
| $r_{2G}$ | 0.00098 | −0.00234 | −0.02470 |
| Total | −0.00298 | −0.00229 | 0.00006 |

Example 13

$r_{1G} = -8.00$, $|(N_{00} - 1)/r_{1G}| = 0.075$, $1/f_G = 0.10$
$N_{10} = -1.0494 \times 10^{-2}$, $N_{20} = 7.06 \times 10^{-5}$, $V_{10} = 537.02$
$r_{2G} = -10.00$, $|(N_{00} - 1)/r_{2G}| = 0.060$

| | SA3 | CM3 | AS3 |
|---|---|---|---|
| $r_{1G}$ | −0.04677 | −0.00858 | 0.00183 |
| G | 0.03185 | 0.00589 | −0.00200 |
| $r_{2G}$ | 0.01432 | 0.05106 | 0.00182 |
| Total | −0.00060 | 0.04836 | 0.00165 |

| | DIST3 | PTZ3 | PAC |
|---|---|---|---|
| $r_{1G}$ | −0.00305 | 0.00293 | 0.01465 |
| G | −0.00103 | −0.00256 | 0.01108 |
| $r_{2G}$ | 0.00102 | −0.00234 | −0.02567 |
| Total | −0.00305 | −0.00198 | 0.00006 |

Listed in the above table are coefficients of spherical aberration of the third order SA3, coma of the third order CM3, astigmatism of the third order AS3, distortion of the third order DIST3, Petzval's sum of the third order PTZ3 and longitudinal chromatic aberration PAC as well as aberration coefficients of an object side surface, a medium, an image side surface and total value of the radial gradient-index lens element. Further, variations of radii of curvature were regarded as variables of $N_{10}$, $N_{20}$ and $V_{10}$ for designing a radial gradient-index lens element which had the focal length $f_G = 10$ mm, spherical aberration of the third order SA3≈0 and longitudinal chromatic aberration PAC=0.

Listed in Examples 1 through 9 shown in Table 1 are aberration coefficients of radial gradient-index lens elements having a second surface (an image side surface) which is planar ($r_{2G}=\infty$) and first surfaces (object side surfaces) which have $r_{1G}=\infty$, 20, 10, 8, 6, −20, −10, −8 and −6 (mm) respectively. Further, listed in Examples 10 through 12 are aberration coefficients of radial gradient-index lens elements which have first curved surfaces $r_{1G}$, second curved surface $r_{2G}$ and numerical data listed in the table.

In Example 1, wherein a radial gradient-index lens element has planar surfaces on both sides thereof, all the aberration coefficients have very small values.

In Examples 2 through 5, wherein second planar surfaces ($r_{2G}=\infty$) are selected, radii of curvature $r_G$ of first surfaces are progressively shortened for obtaining refractive powers of surface which are stronger in the positive direction. As clarified by these examples, Petzval's sum and astigmatism in particular have values which are enlarged as a first surface of a radial gradient-index lens element has a radios of curvature $r_{1G}$ which is shorter than that on the planer surface adopted in Example 1. This is because a Petzval's sum is produced in a larger total amount by selecting a positive refractive power of surface which is stranger than a refractive power of medium as is apparent from the formula (d) expressing Petzval's sums. Similarly, astigmatism is produced in a larger total amount when a re-active power of surface is strengthened. When a radial gradient-index lens is to have a positive refractive power of surface, it is therefore preferable to select a refractive power of surface which is weak to a certain degree relatively to a refractive power of medium for preventing a Petzval's sum and astigmatism from being aggravated.

In Examples 6 through 9 wherein first concave surfaces are used, radii of curvature $r_{1G}$ are progressively smaller for obtaining negative refractive powers of surface which are progressively stronger. In these Examples, all the aberrations including Petzval's sum and astigmatism are not produced in amounts which are much larger than those produced by the planar surfaces used in Example 1 regardless of the strengthened negative refractive power of the first surface. However, all of these examples allow aberrations to be produced in amounts larger than those of the aberrations produced by the two planar surfaces used in Example 1 as is apparent from the values of spherical aberration, but aberrations having different signs produced by the surfaces and media are canceled with each other, thereby reducing total amounts of the aberrations to be produced by the radial gradient-index lens elements. In Example 9 wherein $r_{1G}=-6$ mm is selected, for example, amounts of aberrations produced by the surfaces and medium are approximately 20 times as large as those produced in Example 1. Speaking concretely, a total amount of spherical aberration of the third order has a value nearly equal to O in Example 1 wherein the first surface ($r_{1G}$) has a spherical aberration coefficient SA3=0, the medium (G) has a spherical aberration coefficient SA3= 0.00490 and the second surface ($r_2G$)) has a spherical aberration coefficient SA3=−0.00499. In contrast, a total amount of spherical aberration of the third order has a value nearly equal to 0.0035 in Example 9 wherein the first surface ($r_{1G}$) has a spectrical aberration coefficient SA3=−0.1131, the medium (G) has a spherical aberration coefficient SA3= 0.11559 and the second surface ($r_{2G}$) has a spherical aberration coefficient SA3=−0.00595. Accordingly, Example 9 imposes stricter manufacturing tolerances (within allowable variation of refractive index distributions) to a radial gradient-index lens element than those imposed by Example 1, and is therefore undesirable from viewpoints of manufacturing since it allows enhancement of cost and degradation of performance caused due to eccentricity. It is therefore desirable to select a refractive power of surface which is weak to a certain degree relatively to a refractive power of medium for loosening manufacturing tolerances when a radial gradient-index lens element is to have a negative refractive power of surface.

In each of Examples 10 through 13, a radial gradient-index lens element has curved surfaces on both sides thereof and it produces aberrations in amounts which are not so large as compared with those of aberrations produced in Example 1. In this example, longitudinal chromatic aberration and spherical aberration in particular are produced in large amounts by the surfaces and medium of the radial gradient-index lens element and are canceled with each other, thereby reducing total amounts thereof. In Example 12, for instance, the first surface has a radius of curvature $r_{1G}$ of −10 mm which is equal to that of the second surface, whereby the radial gradient-index lens element has a paraxial refractive power of surface of 0. Though the paraxial refractive power of surface is the same between Example 1 and Example 12, the later allows the surface and medium of the radial gradient-index lens element to produce aberrations in a larger amount. Speaking of longitudinal chromatic aberration, PAC is produced in a total amount nearly equal to 0 in Example 1 wherein the first surface ($r_{1G}$) has PAC=0, the medium (G) has PAC=0.00984 and the second surface ($r_2$G) has PAC=−0.00984. In contrast, Example 12 allows aberrations in amounts 1.3 to 2.5 times as large to be produced by the first surface ($rl_{1G}$) having PAC=0.01172, the medium (G) having PAC=0.01304 and the second surface ($r_{2G}$) having PAC=−0.02470, though it suppresses a total amount of longitudinal chromatic aberration nearly to 0. Further, spherical aberration is produced in a total amount of SA3=0 in example 1 wherein the first surface ($r_{1G}$) has SA3=0, the medium (G) has SA3=0.00490 and the second surface ($r_{2G}$) has SA3=−0.00499. In contrast, Example 12 allows aberration in amounts approximately 5.5 to 6.5 times as large to be produced by the first surface ($r_{1G}$) having SA3=−0.03436, the medium (G) having SA3= 0.02743 and the second surface ($r_{2G}$) having SA3=0.00643, though it suppresses a total amount of spherical aberration nearly to 0. Accordingly, Example 12 imposes stricter tolerances to manufacturing of a radial gradient-index lens element than those imposed by Example 1, thereby being undesirable from viewpoints of manufacturing since it increases cost and degrades performance due to eccentricity.

As is understood from the foregoing description of these Examples, it is desirable to select a refractive power of surface which is weak to a certain degree relatively to a refractive power of medium for loosening manufacturing tolerances when a radial gradient-index lens element is to have a meniscus shape.

Considering the points described above, it is desirable, for favorably correcting aberrations, longitudinal chromatic aberration, in the image transmission optical system according to the present invention and loosening tolerances there for, to use at least one radial gradient-index lens element which satisfies the conditions (2) and (3).

Further, it is more desirable, needless to say, that all of radial gradient-index lens elements satisfy the conditions (2) and (3).

Furthermore, it is desirable for favorably correcting longitudinal chromatic aberration in particular that a relay lens system for a single image relaying cycle from an object to an image is an image transmission optical system composed of at least three lens elements including at least one radial gradient-index lens element satisfying the following condition (4):

$$-0.1 < N_{10} \times IH^2 < 0 \qquad (4)$$

wherein the reference symbol $N_{10}$ represents a refractive index distribution coefficient of the second order and the reference symbol IH designates an image height.

It is possible to correct longitudinal chromatic aberration to a favorable level in the image transmission optical system according to the present invention by using at least one radial gradient-index lens element which has a function to correct longitudinal chromatic aberration contrastingly to a homogeneous lens element. For more effective use of a radial gradient-index lens element, it is desirable to select one which satisfies the condition (4). As is clear from the formula (b), it is necessary for favorable correction of longitudinal chromatic aberration that a radial gradient-index lens element has a refractive power of medium $\phi$m which has a sufficiently large value. If a radial gradient-index lens element has $\phi$m which has a very small value, the gradient-index lens element will undesirably have a correcting function as low as that of a homogeneous lens element. Further, the condition (4) is required for obtaining a sufficiently large value of $\phi$m since the refractive power of medium $\phi$m is proportional to a product of refractive index distribution coefficient $N_{10}$ of the second order multiplied by the thickness $d_G$ of a radial gradient-index lens element.

If the upper limit of the condition (4) is exceeded, a refractive power of medium will have a negative value, thereby aggravating a Petzval's sum in particular. If the lower limit of the condition (4) is exceeded, in contrast, a difference between a refractive index of a lens portion located on the optical axis and that of a marginal lens portion will be too large, thereby undesirably enhancing a manufacturing cost of the radial gradient-index lens element and making manufacturing tolerances therefor stricter.

Needless to say, it is more desirable that all radial gradient-index lens elements to be used in the image transmission optical system according to the present invention satisfy the condition (4).

When a relay lens system for a single image relaying cycle from an object to an image which has a magnification of approximately 1× is to be composed of a first lens unit having a positive refractive power and a second lens unit having a positive refractive power, it is desirable to compose each of these lens units of a single gradient-index lens element having a refractive index distribution expressed by the formula (a).

A radial gradient-index lens element has excellent characteristics to correct longitudinal chromatic aberration and a Petzval's sum as already described above. It is therefore possible, by composing the image transmission optical system according to the present invention of two radial gradient-index lens element, to correct aberrations more favorably therein than those in an optical system composed of two homogeneous lens elements, or obtain an image transmission optical system which is composed of a small number of lens elements and has excellent imaging performance.

For reducing manufacturing costs of radial gradient-index lens elements while favorably correcting aberrations in an image transmission optical system having a magnification of approximately 1× and comprising a relay lens system for a singer image relaying cycle from an object to an image which is composed, in order from the object side, of a first lens unit having a positive refractive power and a second lens unit having a positive refractive power, and disposed from an object to an image, it is preferable to compose each of the lens units of a cemented lens component composed of a homogeneous lens element and a radial gradient-index lens element.

Though it is desirable for reducing a number of lens elements required for composing an image transmission optical system to compose each of the lens units of a single radial gradient-index lens element as described above, volumes of radial gradient-index lens elements may be increased, thereby posing a problem of enhancement in manufacturing costs thereof when, for example, the lens system according to the present invention is be used in an image transmission optical system which has a relatively prolonged total length. A ratio of volumes to be occupied by radial gradient-index lens elements relative to that of an image transmission optical system can be lowered by composing each of the lens units of a cemented lens component consisting of a homogeneous lens element and a radial gradient-index lens element.

Further, a merit which allows simplification of a lens barrel can be obtained by composing each of two lens units of a cemented lens component since such a composition allows omissions of two parts which were conventionally required for composing the image transmission optical system consisting of the three lens units.

When each of the first lens unit and the second lens unit is to be composed of a cemented lens component consisting of a homogeneous lens element and a radial gradient-index lens element, it is desirable to select radial gradient-index lens elements having a refractive index distribution expressed by the formula (a) as lens elements to be disposed on the image side in the first lens unit and on the object side in the second lens unit respectively.

When cemented lens components are used for composing the first lens unit and the second lens unit in the image transmission optical system according to the present invention, an image side surface of the first lens unit and an object side surface of the second lens unit in particular are apt to produce longitudinal chromatic aberration in large amounts due to a fact that these surfaces have imaging functions or axial rays are high on these surfaces. It is therefore possible to correct longitudinal chromatic aberration favorably in the image transmission optical system as a whole by disposing the radial gradient-index lens elements on the image side in the first lens unit and on the object side in the second lens unit.

Due to the materials practically selectable for manufacturing radial gradient-index lens elements, Abbe's numbers of these lens elements have values which are limited nearly within a range of $30<V_{00}<90$, or nearly equal to those of Abbe's number of practically available glass materials. So far as values of Abbe's number are limited nearly within this range, it is conceivable, for correcting longitudinal chromatic aberration by using a radial gradient-index lens element which has a positive total value of refractive powers of surface and medium, to select refractive powers which are within one of the ranges defined below:

$$0<\phi_m<\phi s, \; V_{10}<V_{00} \qquad (I)$$

$$\phi_m<0<\phi s, \; 0<V_{10}<V_{00} \qquad (II)$$

$$0<\phi s<\phi_m, \; V_{10}<0 \qquad (III)$$

$$\phi s<0<\phi_m, \; V_{00}<V_{10} \qquad (IV)$$

In the range (I), out of those mentioned above, a refractive power of surface has a positive value which is larger than a positive value of a refractive power of medium and the radial gradient-index lens elements have functions to correct longitudinal chromatic aberration more effectively than homogeneous lens elements having the same refractive power so far as $V_{10}$ has a negative value. It is therefore possible to favorably correct longitudinal chromatic aberration by using radial gradient-index lens elements which satisfy any one of the above-mentioned conditions (I) through (IV).

When the image transmission optical system according to the present invention is to be composed of two lens units, three lens units or at least three lens elements, it is desirable, for favorably correcting longitudinal chromatic aberration by using radial gradient-index lens elements, to adopt at least one radial gradient-index lens element which satisfies the following condition (5):

$$1/v_{10}2/V_{00} \qquad (5)$$

It is possible to reduce a value of longitudinal chromatic aberration so far as the condition (5) is satisfied. If $1/N_{10}$ is larger than $2/V_{00}$, the radial gradient-index lens element will produce remarkable longitudinal chromatic aberration, thereby undesirably degrading imaging performance of the image transmission optical system.

Needless to say, it is desirable that all radial gradient-index lens elements to be used in the image transmission optical system satisfy the condition (5).

For correcting a Petzval's sum in addition to longitudinal chromatic aberration in the case (II) mentioned above wherein a radial gradient-index lens element has a negative refractive power of medium $\phi_m$, the radial gradient-index lens element has a Petzval's sum which is larger than that of a homogeneous leas element having the same refractive power. For this reason, the image transmission optical system according to the present invention uses at least one radial gradient-index lens element which satisfies the following condition (6):

$$N_{10}<0 \qquad (6)$$

A radial gradient-index lens element which satisfies the condition (6) has a positive refractive power of medium as judged from the formula (c), thereby being capable of favorably correcting a Petzval's sum. A radial gradient-index lens element which does not satisfy the condition (6) will have a negative refractive power of medium, thereby aggravating a Petzval's sum and undesirably tilting an image surface toward the object side.

It is more desirable, needless to say, that all radial gradient-index lens elements to be used in the image transmission optical system according to the present invention satisfy the condition (6).

When a radial gradient-index lens element having a positive refractive power of medium which is adopted for correcting a Petzval's sum has a positive value of $V_{10}$ which is extremely smaller than a positive value of $V_{00}$, for example, it is impossible to correct longitudinal chromatic aberration. It is therefore desirable to use a radial gradient-index lens element which has a positive value of $V_{10}$ larger than a positive value of $V_{00}$.

When the image transmission optical system according to the present invention is to be composed of two lens units, it is desirable for correction of aberrations that at first lens unit comprises lens elements in a number which is the same as that of lens elements disposed in a second lens unit, that shapes of the lens elements and a refractive index of a radial gradient-index lens element in the first lens unit are the same as those in the second lens unit, that the first lens unit and the second lens unit are disposed symmetrically on an optical axis, and that a distance as measured from an object to an object side surface of the first lens unit is nearly equal to a distance as measured from an image side surface of the second lens unit to an image surface.

By composing the image transmission optical system as described above, it is possible to cancel distortion, lateral chromatic aberration and coma produced by the first lens unit with those produced by the second lens unit, thereby remarkably reducing these aberrations in the optical system as a whole. Since distortion, lateral chromatic aberrations and coma are produced in amounts which are proportional to an odd-number power of heights of offaxial rays, the composition described above allows the second lens unit to produce distortion, lateral chromatic aberration and coma which have the same amounts as and opposite signs to those produced by the first lens unit. When lens elements disposed in the first lens unit have shapes and refractive index distribution which are not substantially the same as those of the lens elements disposed in the second lens unit, it is difficult to remarkably reduce amounts of these aberrations even by disposing these lens elements symmetrically. It is also difficult to remarkably reduce amounts of these aberrations when lens elements disposed in the first lens unit have shapes and refractive index distribution which are substantially the same as those of lens elements disposed in the second lens unit, but these lens elements are not disposed symmetrically on the optical axis.

When radial gradient-index lens elements which have the same shapes and the same refractive index distributions are disposed symmetrically on the optical axis, it is desirable for correction of aberrations that the distance as measured from the object side surface to the object is nearly equal to the distance as measured from the image side surface of the second lens unit to the image surface. It is possible by selecting such a disposition to make absolute values of heights of offaxial rays passing through the first lens unit nearly equal to those of offaxial rays passing through the second lens unit, thereby extremely reducing amounts of distortion, lateral chromatic aberration and coma to be produced in the image transmission optical system. When lens elements are not disposed as described above, it will be difficult to extremely reduce amounts of distortion, lateral chromatic aberration and coma.

When the image transmission optical system according to the present invention is composed, in order from the object side, of a first lens unit having a positive refractive power and a second lens unit having a positive refractive power, it is desirable for correction of aberrations to satisfy the following conditions (7), (8), (9) and (10):

$$-0.6<IH/r_1<0.15 \qquad (7)$$

$$-1.0<IH/r_2<0.1 \qquad (8)$$

$$-0.1<IH/r_3<1.0 \qquad (9)$$

$$-0.15<IH/r_4<0.6 \qquad (10)$$

wherein the reference symbol IH represents an image height, the reference symbol $r_1$ designates a radius of curvature on the object side surface of the first lens unit, the reference symbol $r_2$ denotes a radius of curvature on an image side surface of the first lens unit, the reference symbol $r_3$ represents a radius of curvature on an object side surface of the second lens unit and the reference symbol $r_4$ designates a radius of curvature on the image side surface of the second lens unit.

For correcting a Petzval's sum and longitudinal chromatic aberration in the image transmission optical system according to the present invention, it is desirable that a radial gradient-index lens element has a positive refractive power of medium and a positive weak refractive power of surface or a negative refractive power of surface within an adequate range. Further, it is desirable for correction of aberrations that rays emerging from the image side surface of the first lens unit (i.e., rays incident on the object side surface of the second lens unit) are nearly in parallel with the optical axis. For this reason, it is desirable that the image side surface of the first lens unit and the object side surface of the second lens unit do not have strong negative refractive power. If these surfaces have strong negative refractive powers, they will abruptly refract axial rays, thereby undesirably producing aberrations in large amounts. Further, it is undesirable that the image side surface of the first lens unit and the object side surface of the second lens unit have strong positive refractive powers of surface. Such strong refractive powers of surface will make it impossible to allow a radial gradient-index lens element to sufficiently exhibit its effect to correct a Petzval's sum or longitudinal chromatic aberration. Since it is desirable that the object side surface of the first lens unit and the image side surface of the second lens unit have shapes which are adequate for those of the image side surface of the first lens unit and the object side surface of the second lens unit, the image transmission optical system according to the present invention uses a first lens unit and a second lens unit which are configured so as to satisfy the conditions (7) through (10).

If the lower limit of −0.6 of the condition (7) is exceeded, the object side surface of the first lens unit will have too strong a negative refractive power and a light bundle coming from an object will have a large angle of emergence on this surface, thereby undesirably enlarging a diameter of the first lens unit. If the upper limit of 0.15 of the condition (7) is exceeded, in contrast, the object side surface of the first lens unit will have too strong a positive refractive power, thereby undesirably producing remarkably spherical aberration.

If the lower limit of −1.0 of the condition (8) is exceeded, the image side surface of the first lens unit will have too strong a positive refractive power, thereby undesirably producing remarkable spherical aberration. If the upper limit of 0.1 of the condition (8) is exceeded, in contrast, the image side surface of the first lens unit will have too strong a negative refractive power, thereby undesirably producing remarkable aberrations.

If the lower limit of −1.0 of the condition (9) is exceeded, the object side surface of the second lens unit will have too strong a negative refractive power, thereby undesirably producing remarkable aberrations. If the upper limit of 1.0 of the condition (9) is exceeded, in contrast, the object side surface of the second lens unit will have too strong a positive refractive power, thereby undesirably producing remarkable spherical aberration.

If the lower limit of −0.15 of the condition (10) is exceeded, the image side surface of the second lens unit will have too strong a positive refractive power, thereby undesirably producing remarkable spherical aberration. If the upper limit of 0.6 of the condition (10) is exceeded, the image side surface of the second lens unit will have too strong a negative refractive power and rays will be incident at large angles on this surface, thereby undesirably making it necessary to configure the second lens unit so as to have a diameter which is larger than required.

The image transmission optical system according to the present invention is applicable to non-flexible endoscopes which are to be inserted into human bodies and aircraft engines, for example, for observing internal conditions thereof. Due to such purposes of application, an image transmission optical system which is to be used in non-flexible endoscopes must, unlike an objective lens system which is to be used in cameras or microscopes, have an elongated external form and use a relay lens system which is very long as measured from an object to an image relatively to an image radius. This requirement must be taken into sufficient consideration when the image transmission optical system according to the present invention is to be used in non-flexible endoscopes.

When the image transmission optical system according to the present invention is composed, in order from the object side, of a first positive lens unit and a second positive lens unit, for example, it is undesirable to prolong the distance as measured from an object to an image simply by prolonging a distance as measured from an object side end surface of the first lens unit to the object, a distance as measured from an image side end surface of the second lens unit to the image or prolonging the lens units, but it is necessary to take locations of principal points of the lens units into sufficient consideration.

A reason for this consideration will be described with reference to the accompanying drawings. The image transmission optical system according to the present invention which is composed, in order from the object side, first first positive lens unit and a second positive lens unit is schematically illustrated in FIG. 5, wherein a reference numeral 1 represents an optical axis, a reference numeral 2 designates an object, a reference numeral 3 denotes an image of the object 2, a reference numeral 4 represents a location of a front principal point of the first lens unit, a reference numeral 5 designates a location of a rear principal point of the first lens unit, a reference numeral 6 denotes a location of a front principal point of the second lens unit, a reference numeral 7 represents a location of a rear principal point of the second lens unit, a reference numeral 8 designates an axial ray coming from the object 2, a reference numeral 9 denotes an offaxial principal ray coming from the object 2, a reference numeral 10 represents a point of intersection between the location 4 of the front principal point of the first lens unit and the paraxial ray 8, a reference numeral 11 designates a point of intersection between the location 7 of the rear principal point of the second lens unit and the axial ray 8, a reference numeral 12 denotes a point of intersection between the location 5 of the rear principal point of the first lens unit and the offaxial principal ray 9, a reference numeral 13 represents a point of intersection between the location 6 of the front principal point of the second lens unit and the offaxial principal ray 9, a reference symbol OD designates a distance as measured from the object 2 to the location 4 of the front principal point of the first lens unit, a reference symbol HD denotes a distance as measured from the location 5 of the rear principal point of the first lens unit to the location 6 of the front principal point of the second lens unit, and a reference symbol ID represents a distance as measured from the location 7 of the rear principal point of the second lens unit to the image 3.

Figure 5:
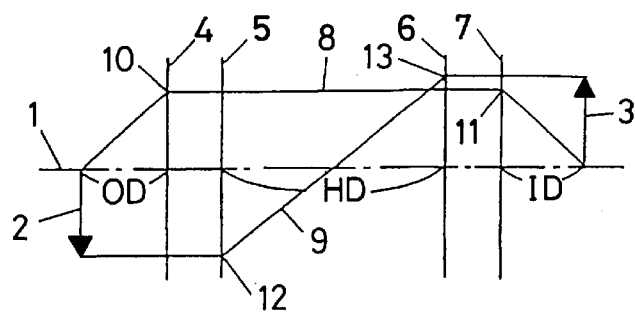
FIG. 5 shows a schematic diagram illustrating functions of the image transmission optical system according to the present invention.
Figure 6:
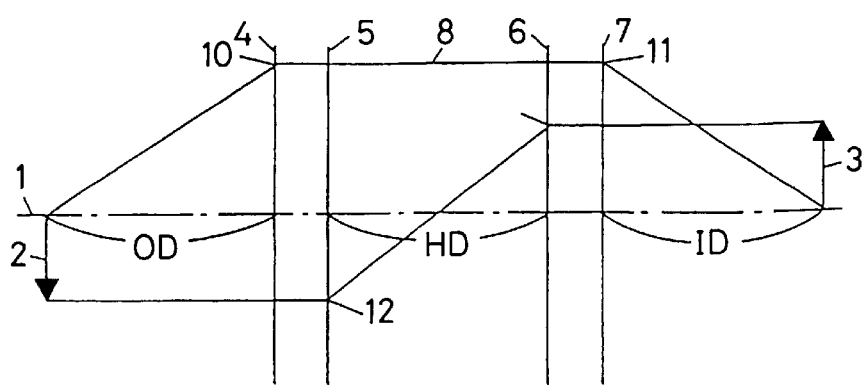
FIG. 6, FIG. 7 and FIG. 8 show schematic diagrams illustrating functions of optical systems obtained by modifying the optical system shown in FIG. 5.

In FIG. 6, a distance as measured from the object 2 to the image 3 is made longer than that shown in FIG. 5 by prolonging the distance OD as measured from the object 2 to the location 4 of the front principal point of the first lens unit and the distance ID as measured from the location 7 of the rear principal point of the second lens unit to the image 3. However, this arrangement is undesirable since the axial ray coming from the object is incident on a higher point on the first lens unit as is clear from FIG. 6, thereby enlarging diameters of the lens units though the optical system has a numerical aperture (NA) which remains unchanged from that shown in FIG. 5. Further, this arrangement is undesirable from a viewpoint of correction of spherical aberration since it is difficult to correct spherical aberration when the axial ray 8 is incident on the higher point on the first lens unit.

Figure 7:
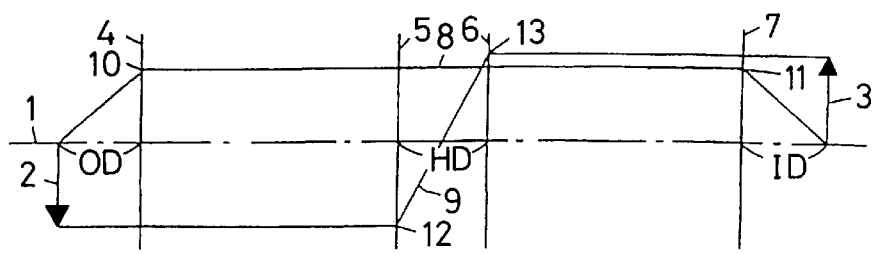
Figure 8:
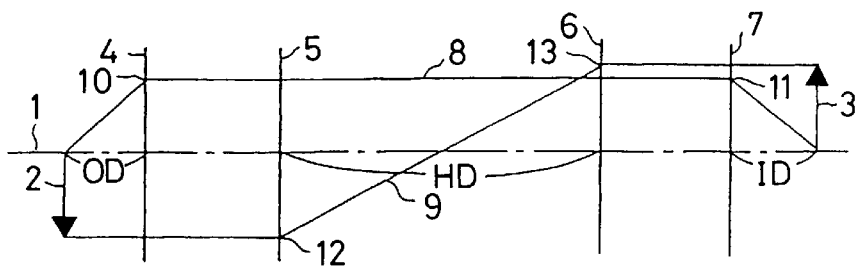

In FIG. 7, the distance as measured from the object to the image 3 is made longer by prolonging distances between the locations of the front principal points and the locations of the rear principal points of the lens unit. However, this arrangement is undesirable since it enlarges angles of refraction of the offaxial principal ray at the location 5 of the rear principal point of the first lens unit and at the location 6 of the front principal point of the second lens unit, thereby aggravating astigmatism in particular.

It is therefore desirable for the image transmission optical system according to the present invention to prolong the distance between the front principal points and the rear principal points of the lens unit while avoiding extreme enlargement of the angles of refraction of the offaxial principal ray 9, and prolong the distance HD between the location 5 of the rear principal point of the first lens unit and the location 6 of the front principal point of the second lens unit so as to satisfy the following condition (11):

$$5 < HD/IH \tag{11}$$

When the image transmission optical system according to the present invention satisfies the condition (11), it allows the distance as measured from the object 2 to the image 3 to be prolonged without enlarging diameters of lens elements to be disposed therein or aggravating spherical aberration and astigmatism. If the condition (11) is not satisfied, the angles of refraction of the offaxial principal ray will be enlarged and astigmatism in particular will be aggravated.

For prolonging the distance as measured from the object 2 to the image surface 3 relatively to a radius of the image, it is necessary to select adequate thickness for radial gradient-index lens elements. In the image transmission optical system according to the present invention, it is desirable that at least one radial gradient-index lens element satisfies the following condition (12):

$$1.0 < d_G/IH < 50 \tag{12}$$

wherein the reference symbol $d_G$ represents thickness of the radial gradient-index lens element and the reference symbol IH designates an image height.

When the image transmission optical system according to the present invention is configured so as to satisfy the condition (12), it allows the distance as measured from the object 2 to the image surface 3 to be prolonged while favorably correcting aberrations. If the lower limit of 1.0 of the condition (12) is exceeded, it will, be difficult to prolong the distance as measured from the object 2 to the image surface 3. If the upper limit of 50 of the upper limit of the condition (12) is exceeded, it will be difficult to correct astigmatism as already described with reference to FIG. 7.

It is more desirable, needless to say that the condition (12) is satisfied by all radial gradient-index lens elements to be used in the image transmission optical system according to the present invention.

When the image transmission optical system is to be composed, in order from the object side, of a first positive lens unit and a second positive lens unit, it is desirable, for prolonging the distance as measured from an object to an image without enlarging diameters of lens elements, to configure a radial gradient-index lens element so as to have an adequate diameter and an adequate value of the refractive index distribution coefficient of the second order $N_{10}$. If $N_{10}$ has an extremely large value, the formula (c) will oblige the radial gradient-index lens element to have small thickness $d_G$, for obtaining a required refractive power of medium of the lens element. Such small thickness is undesirable for prolonging the distance as measured from the object 2 to the image surface 3. Accordingly, at least one radial gradient-index lens element to be used in the image transmission optical system is configured so as to satisfy the following condition (13):

$$0.1 \times 10^{-5} |N_{10} X \; IH^2| < 0.1 \tag{13}$$

wherein the reference symbol $N_{10}$ represents a refractive index distribution coefficient of the second order and the reference symbol IH designates an image height.

When the image transmission optical system according to the present invention is configured so as to satisfy the condition (13), it permits prolonging the distance as measured from the object 2 to the image surface 3. If the lower limit of $0.1 \times 10^{-5}$ of the condition (13) is exceeded, it will undesirably be impossible to obtain the effects of the radial gradient-index lens element to correct a Petzval's sum and longitudinal chromatic aberration. If the upper limit of 0.1 of the condition (13) is exceeded, thickness $d_G$ of the lens element will be reduced, thereby making it difficult to prolong the distance as measured from the object 2 to the image surface 3.

For obtaining a sufficient effect for correcting a Petzval's sum or longitudinal chromatic aberration by using a radial gradient-index lens element in the image transmission optical system according to the present invention, it is necessary to select an adequate ratio between a refractive power of surface and a refractive power of medium. When a refractive power of surface has a value which is very large relatively to that of a refractive power of medium, it will be impossible to obtain a sufficient effect for correcting a Petzval's sum as is judged from the formula (d). A similar analysis applies to the correction of longitudinal chromatic aberration which is given by the formula (b). It is desirable for the image transmission optical system according to the present invention to comprise at least one radial gradient-index lens element which satisfies the following condition (14):

$$0.1 < \phi_m/\phi < 5 \tag{14}$$

wherein the reference symbol $\angle_m$ represents a refractive power of medium of the radial gradient-index lens element, and the reference symbol $\phi$ designates a total sum of a refractive power of surface and a refractive power of medium of the radial gradient-index lens element.

If the lower limit of 0.1 of the condition (14) is exceeded, the refractive power of surface will be too strong relatively to the refractive power of medium, thereby making it impossible to obtain a sufficient effect of the radial gradient-index lens element for correcting Petzval's sum or longitudinal chromatic aberration. If the upper limit of 5 of the condition (14) is exceeded, the refractive power of medium will be too strong, thereby undesirably making it difficult to thicken the lens element.

It is more desirable, needless to say, that the condition (14) be satisfied by all radial gradient-index lens elements used in the image transmission optical system according to the present invention.

When the image transmission optical system according to the present invention which has the magnification of approximately 1× is to be composed, in order form the object side, of a first lens unit having a positive refractive power, a second lens unit having a positive lens unit and a third lens unit having a positive refractive power, or at least three lens elements, it is desirable for favorable correction of aberrations to use a radial gradient-index lens element which has a refractive index distribution expressed by the formula (a) in a relay lens system for a single image relaying cycle from an object to an image, and dispose a single or a plurality of lens elements on the object side of the radial gradient-index lens element and a single or a plurality of lens elements on the image side of the radial gradient-index lens element: a number of the lens elements disposed on the object side being equal to that of the lens elements disposed on the image side, and the lens element disposed on the object side having substantially the same radii of curvature and thickness as those of the lens elements disposed on the image side, and the lens elements disposed on the object side and the lens elements disposed on the image side being symmetrical on the optical axis with regard to the gradient-index lens element. By composing the relay lens system as described above, it is possible to extremely reduce aberrations in the relay lens system owing to cancellation of distortion, lateral chromatic aberration and coma between the lens elements disposed on the object side of the radial gradient-index lens element and those produced by the lens elements disposed on the image side. Since distortion, lateral chromatic aberration and coma are produced in amounts proportional to an odd number power of a height of an offaxial ray, aberrations to be produced by the lens elements disposed on the object side of the radial gradient-index lens element are nearly equal in amounts thereof and opposite in signs thereof to those of aberrations to be produced by the lens elements disposed on the image side. When the lens elements disposed on the object side are different in a number thereof or shapes thereof from the lens element disposed on the image side, it will be difficult to reduce aberrations to very small amounts in the relay lens system as a whole. Even when the lens elements disposed on the object side are substantially the same in number thereof and in shapes thereof as those disposed on the image side, it is difficult to reduce the aberrations to extremely low levels unless the lens elements are disposed symmetrically on the optical axis.

When the image transmission optical system according to the present invention is to be composed, in order from the object side, of a first lens unit having a positive refractive power, a second lens unit having a positive refractive power and a third lens unit having a positive refractive power, or at least three lens elements, it is desirable for favorable correction of longitudinal chromatic aberration to satisfy the following condition (15):

$$0.8 < d_G/IH < 15 \tag{15}$$

Since a radial gradient-index lens element has a capability to correct chromatic aberration by itself which is higher than that of a homogeneous lens element, it is possible to correct longitudinal chromatic aberration to a favorable level in the image transmission optical system according to the present invention by using a radial gradient-index lens element. For more effective use of a radial gradient-index lens element, it is desirable to configure it so as to satisfy the condition (15). For favorable correction of longitudinal chromatic aberration, a radial gradient-index lens element must have a sufficiently strong refractive power of medium $\phi_m$ as is understood from the formula (b). A radial gradient-index lens element which has a very small value of $\phi_m$ will undesirably have a correcting capability as low as that of a homogeneous lens element. Since a refractive power of medium $\phi_m$ is proportional to a product of refractive index distribution coefficient of the second order $N_{10}$ multiplied by thickness $d_G$ of a radial gradient-index lens element as expressed by the formula (c), the condition (15) is required for obtaining a sufficiently large value of $\phi_m$.

If the upper limit of the condition (15) is exceeded, a radial gradient-index lens element will be too thick, thereby requiring a high manufacturing cost and strict tolerances. If the lower limit of the condition (15) is exceeded, in contrast, the radial gradient-index lens element will have a weak refractive power of medium, thereby being hardly capable of correcting longitudinal chromatic aberration to a favorable level.

When the image transmission optical system according to the present invention is to be used in non-flexible endoscopes or the similar optical instruments, the optical system must transmits an image a plurality of times while maintaining marginal light intensity at a sufficient level. When the image transmission optical system according to the present invention is to be used in non-flexible endoscopes, it is therefore desirable to configure it so as to be nearly telecentric, and satisfy the following conditions (16) and (17):

$$10 < EP/IH \tag{16}$$

$$10 < OP/IH \tag{17}$$

wherein the reference symbol EP represents a distance as measured from a surface of an object to a surface of an entrance pupil and the reference symbol OP designates a distance as measured from an image surface to a surface of an exit pupil.

If the condition (16) or (17) is not satisfied, marginal light intensity will be insufficient after an image is relayed a plurality of times, whereby marginal portions will undesirably be dark as compared with central portions on an image surface.

The image transmission optical system according to the present invention is capable of correcting longitudinal chromatic aberration when it is configured so as to satisfy the condition (5). When the optical system is to be composed, in order from the object side, of a first positive lens unit and a third positive lens unit; or at least three lens elements, it is desirable for more favorable correction of longitudinal chromatic aberration to configure it so as to satisfy the condition (1).

When the image transmission optical system according to the present invention is configured so as to satisfy the condition (1), it is capable of correcting longitudinal chromatic aberration more favorably. If the condition (1) is not satisfied, longitudinal chromatic aberration will undesirably be aggravated.

Considering productivity of the image transmission optical system according to the present invention which has each of the compositions described above, it is desirable from a viewpoint of manufacturing cost to configure a radial gradient-index lens element so as to have a nearly planar surface on either side or nearly planar surfaces on both sides.

A radial gradient-index lens element which has a refractive power of medium has a function of a lens even when it has nearly planar surfaces. Further, the radial gradient-index lens element allows longitudinal chromatic aberration to be controlled to a desired level by selecting an adequate value for $V_{10}$ as judged from the formula (b) even when it has planar surfaces or a refractive power of surface $\phi_s$ which is nearly equal to 0. Accordingly, it is possible, by configuring a radial gradient-index lens element so as to have nearly planar surfaces on both sides, not only to obtain a function for favorable correction of longitudinal chromatic aberration but also a function to reduce cost and time which are required for polishing the lens element.

A shorter distance as measured from an object to a front principal point of the first lens unit is more preferable as has already been described with reference to FIG. 5 through FIG. 8. When this distance is extremely short, however, the relay lens system may form images of foreign matter adhering to lens surfaces. Images of foreign matter adhering to the lens surfaces constitute noise components, thereby making it difficult to obtain favorable images. For preventing such noise components to be constituted, it is desirable to configure the image transmission optical system so as to satisfy the following condition (18):

$$1 < BD/IH < 20 \tag{18}$$

wherein the reference symbol BD represents a distance between an object and the object side surface of the first lens unit, and the reference symbol IH designates an image height.

When the condition (18), which represents a state where the object is located outside the relay lens system, is satisfied, the image transmission optical system according to the present invention has a performance capable of forming a favorable image. If the lower limit of 1 of the condition (18) is exceeded, the relay lens system may undesirably form images of foreign matter adhering to lens surfaces. If the upper limit of 20 of the condition (18) is exceeded, in contrast, rays coming from the object will be incident high on the first lens unit, thereby obliging the first lens unit to have a large diameter and making it difficult to correct aberrations.

As an image transmission optical system which is to be used in a non-flexible endoscope, for example, may require a thick lens element, the image transmission optical system according to the present invention is apt to use a thick radial gradient-index lens element. As compare with the optical system disclosed by Japanese Patent Kokai Publication No. Hei 4-242,211, for example, the image transmission optical system according to the present invention which is to be composed, in order from the object side, of a first positive lens unit consisting of a radial gradient-index lens element and a second positive lens unit consisting of a radial gradient-index lens element tends to use longer lens elements. When the image transmission optical system according to the present invention is to be disposed serially in a plurality of sets for use in a non-flexible endoscope, for example, it poses a problem that lens elements used therein are more fragile than homogeneous lens elements.

For preventing a radial gradient-index lens element from being fragile, it is desirable to configure it so as to have a central diameter which is different from a diameter at both ends thereof as viewed in a direction along a width thereof.

Means for preventing breakage of radial gradient-index lens elements will be described below with reference to FIG. 9A through FIG. 10D. FIG. 9A, FIG. 9B, FIG. 9C and FIG. 9D show sectional views illustrating portions of an image transmission optical system of a non-flexible endoscope which is composed by disposing a plurality of radial gradient-index lens elements having a columnar form. In these drawings, reference numeral 21 represents a radial gradient-index lens element, reference numerals 22 and 23 designate air-contact surfaces of the radial gradient-index lens element, reference numeral 24 denotes a lens barrel, and reference numeral 25 is an arrow indicating a stress which constitutes a cause of breakage.

FIG. 9A shows a sectional view illustrating the radial gradient-index lens element, FIG. 9B shows a sectional view illustrating a relay lens system composed by disposing a plurality of radial gradient-index lens elements 21, FIG. 9C shows a sectional view schematically illustrating a condition where the radial gradient-index lens element 21 is broken by a stress applied in a direction indicated by the arrow 25 to the lens system shown in FIG. 9B and FIG. 9D shows a sectional view schematically illustrating a condition where the radial gradient-index lens element is free from the stress which was applied in the condition shown in FIG. 9C. When the radial gradient-index lens element 21 has a columnar form, the stress applied to a point indicated by the arrow 25 transmits directly to the radial gradient-index lens element 21, whereby it is broken as illustrated in FIG. 9C. Even in the condition illustrated in FIG. 9D where it is free from the stress, the lens element 21 is kept in the broken condition and cannot be used again as a sound lens element of an image transmission optical system which must have high imaging performance.

When the radial gradient-index lens element is to be used in the image transmission optical system according to the present invention, it is therefore desirable to configure the lens element so as to have a form having ununiform diameter as shown in FIG. 10A. The radial gradient-index lens element 21 configured so as to have the form illustrated in FIG. 10A has a diameter in the vicinity of a center thereof which is largely different from that in the vicinities of both ends thereof in a direction along thickness of the lens element. When the radial gradient-index lens element 21 having the form illustrated in FIG. 10A is disposed serially in a plurality as shown in FIG. 10B, a stress applied to a point indicated by an arrow 25 causes only deflection of a lens barrel but cannot break the radial gradient-index lens element 21 owing to an airspace reserved between the lens barrel 24 and the radial gradient-index lens element 21 under the point indicated by the arrow 25 to which the strees is applied.

Accordingly, the radial gradient-index lens element 21 is usable again as a sound lens element of the image transmission optical system.

By configuring the radial gradient-index lens element 21 so as to have the form illustrated in FIG. 10A, for example, it is possible to prevent the lens element from being broken when a plurality of image transmission optical systems according to the present invention are disposed for use in a non-flexible endoscope.

A plurality of relay lens systems are disposed serially as occasion demands to compose an image transmission system. When a relay lens system which ranges from an object surface to an image surface is taken as a set, two, three, four, ... relay lens sets are disposed serially as occasion demands. When aberrations are not corrected sufficiently in a relay lens set, aberrations are produced in an image transmission system in amounts which are larger correspondingly to a number of relay lens sets disposed in the transmission optical system. When a Petzval's sum and longitudinal chromatic aberration in particular are not corrected sufficiently in a relay lens set, these aberrations are produced in large amounts in an image transmission system composed of a plurality of relay lens sets, thereby remarkably degrading imaging performance thereof It is therefore required to correct aberrations remarkably favorably in each of the relay lens sets and this requirement is satisfied by using radial gradient-index lens elements as in the case of the image transmission optical system according to the present invention which has each of the compositions described above. When an image transmission optical system is to be composed by serially disposing a plurality of relay lens sets, it is possible to obtain an image transmission optical system which is composed of a small number of lens elements and has excellent imaging performance by using the relay lens sets which are composed of radial gradient-index lens elements for use in the image transmission optical system according to the present invention.

The image transmission optical system according to the present invention is usable for transmitting an image in an non-flexible endoscope.

When the image transmission optical system according to the present invention is intended for such application, it is desirable to add an objective lens having an imaging function to the image transmission optical system according to the present invention so that an image formed by the objective lens is transmitted by the image transmission optical system which has one of the compositions described above. By selecting such a composition, it is possible to configure a non-flexible endoscope which is composed of a small number of lens elements or has high performance.

For correcting a Petzval's sum and longitudinal chromatic aberration more favorably in the image transmission optical system according to the present invention by using a radial gradient-index lens element, it is desirable to configure the lens element so as to have a refractive power of medium $\phi_m$ to be given by the formula (c). When the radial gradient-index lens element has an extremely small value of $\phi_m$, the lens element is incapable of sufficiently exhibiting its effect to correct a Petzval's sum or longitudinal chromatic aberration as is judged from the formula (b) and the formula (d), thereby making it impossible to obtain an image transmission optical system having high optical performance. It is therefore desirable for the image transmission optical system according to the present invention to comprise at least one radial gradient-index lens element which satisfies the following condition (19):

$$0.05 < |N_{10} \times f_G^2| < 4 \tag{19}$$

wherein the reference symbol $N_{10}$ represents a refractive index distribution coefficient of the second order and the reference symbol $f_G$ designates a focal length of the radial gradient-index lens element.

When the radial gradient-index lens element satisfies the condition (19), it has a refractive power of medium which is sufficiently strong relatively to a total refractive power thereof, thereby being capable of favorably correcting a Petzval's sum and longitudinal chromatic aberration. If the lower limit of 0.05 of the condition (19) is exceeded, the refractive power of medium will undesirably have a small value, whereby the radial gradient-index lens element is incapable of sufficiently exhibiting its effects for correcting a Petzval's sum and longitudinal chromatic aberration. If the upper limit of 4 of the condition (19) is exceeded, a Petzval's sum and longitudinal chromatic aberration will undesirably be overcorrected. It is more desirable, needless to say, that the condition (19) is satisfied by all radial gradient-index lens elements to be used in the image transmission optical system according to the present invention.

When a radial gradient-index lens element has thickness $d_G$ which is extremely small, the formula (c) gives a small value of refractive power of medium, thereby making it impossible to obtain the sufficient effect for correcting a Petzval's sum and longitudinal chromatic aberration. For obtaining a sufficient refractive power of medium, it is desirable that at least one of radial gradient-index lens elements to be used in the image transmission optical system according to the present invention satisfies the following condition (20):

$$0.05 < d_G/f_G < 4 \tag{20}$$

When a radial gradient-index lens element satisfies the condition (20) in the image transmission optical system according to the present invention, the radial gradient-index lens element has a sufficient refractive power of medium relatively to a total refractive power thereof, thereby being capable of favorably correcting a Petzval's sum and longitudinal chromatic aberration. If the lower limit of 0.05 of the condition (20) is exceeded, the refractive power of medium will have an undesirably small value, thereby making it impossible to obtain the effects for correcting a Petzval's sum and longitudinal chromatic aberration. If the upper limit of 4 of the condition (20) is exceeded, in contrast, a Petzval's sum and longitudinal chromatic aberration will undesirably be overcorrected. It is more desirable that the condition (20) is satisfied by all radial gradient-index lens elements to be used in the image transmission optical system according to the present invention.

For correcting a Petzval's sum and longitudinal chromatic aberration with a radial gradient-index lens element, it is desirable that this lens element has a refractive index of medium $\phi_m$ having a value which is large to a certain degree. When the radial gradient-index lens element is configured so as to satisfy the condition (19), it has a large absolute value of $N_{10}$, thereby being capable of correcting the aberrations mentioned above. For preparing a medium which has a large value of $N_{10}$, however, it is required to impart a refractive index distribution for a long time, which is undesirable from a viewpoint of a manufacturing cost of the radial gradient-index lens element. Further, a difference between a refractive index of a lens portion to be located on the optical axis and a marginal portion thereof must be large for obtaining a radial gradient-index lens element having a large value of $N_{10}$, and an extremely large difference in refractive index will undesirably impose strict tolerances on manufacturing of the radial gradient-index lens element. It is therefore desirable that at least one of radial gradient-index lens elements to be used in the image transmission optical system according to the present invention satisfies the following condition (21):

$$0.1 < |N_{10} \times f_G^2| < 1.6 \tag{21}$$

When a radial gradient-index lens element is configured so as to satisfy the condition (21), it is possible to manufacture a material for the radial radient-index lens element at a low cost and obtain the sufficient aberration correcting effects of the radial gradient-index lens element. If the lower limit of 0.1 of the condition (21) is exceeded, it will not be easy to obtain the correcting effects of the radial gradient-index lens element. If the upper limit of 1.6 of the condition (21) is exceeded, in contrast, a high cost will undesirably be required for manufacturing a material for the radial gradient-index lens element. It is more desirable that the condition (21) is satisfied by all radial gradient-index lens elements used in the image transmission optical system according to the present invention described above.

For allowing a radial gradient-index lens element to sufficiently exhibit its effects for correcting a Petzval's sum and longitudinal chromatic aberration, it must be configured so as to have a refractive power of medium which is strong to a certain degree. Considering a fact that a value of $N_{10}$ can be enlarged within a certain limited range, it is desirable to increase the thickness $d_G$ of the radial gradient-index lens element. However, it is difficult to impart an uniform refractive index distribution to a radial gradient-index lens element which is extremely thick, and strict manufacturing tolerances and a high manufacturing cost will be required for such a thick radial gradient-index lens element. It is therefore desirable that at least one of radial gradient-index lens elements to be used in the image transmission optical system according to the present invention satisfies the following condition (22):

$$0.1 < d_G/f_G < 2.1 \tag{22}$$

When a radial gradient-index lens element is configured so as to satisfy the condition (22), it has a total refractive power sufficient for correcting a Petzval's sum and longitudinal chromatic aberration. If the lower limit of 0.1 of the condition (22) is exceeded, the radial gradient-index lens element will have a weak refractive power of medium, thereby making it not easy to correct a Petzval's sum and longitudinal chromatic aberration. If the upper limit of 2.1 of the condition (22) is exceeded, in contrast, the radial gradient-index lens element will undesirably require a high manufacturing cost. Needless to say, it is more desirable that all radial gradient-index lens elements to be used in the image transmission optical system, according to the present invention satisfy the condition (22).

For correcting longitudinal chromatic aberration in particular in the image transmission optical system according to the present invention by using a radial gradient-index lens element, it is desirable to configure the lens element so as to satisfy the condition (1) or (5). When the lens element has a value of $1/V_{10}$ which is negative and extremely large in absolute value, however, it overcorrects longitudinal chromatic aberration, thereby making it impossible to obtain favorable imaging performance. Further, when $1/V_{10}$ has a value which is extremely close to a value of $1/V_{00}$, it is difficult to allow a radial gradient-index lens element to sufficiently exhibit its effect for correcting chromatic aberration. It is desirable for the image transmission optical system according to the present invention to comprise a radial gradient-index lens element which satisfies the following condition (23):

$$-0.2 < 0.1/V_{10} < 0.02 \tag{23}$$

A radial gradient-index lens element which satisfies the condition (23) is capable of correcting longitudinal chromatic aberration more favorably. If the lower limit of −0.2 of the condition (23) is exceeded, longitudinal chromatic aberration will undesirably be overcorrected. If the upper limit of 0.02 of the condition (23) is exceeded, in contrast, the radial gradient-index lens element will undesirably be incapable of correcting longitudinal chromatic aberration sufficiently. Needless to say, it is desirable that the condition (23) is satisfied by all radial gradient-index lens elements which are to be used in the image transmission optical system according to the present invention.

For favorably correcting longitudinal chromatic aberration in the image transmission optical system according to the present invention by using a radial gradient-index lens element, it is desirable to configure the lens element so as to satisfy the condition (23). For correcting longitudinal chromatic aberration more favorably, it is desirable that the image transmission optical system comprises at least one radial gradient-index lens element which satisfies the following condition (24):

$$-0.1 < 1/V_{10} < 0.012 \tag{24}$$

A radial gradient-index lens element which satisfies the condition (24) is capable of correcting longitudinal chromatic aberration more favorably. If the lower limit of −1.0 of the condition (24) is exceeded, longitudinal chromatic aberration will undesirably be overcorrected. If the upper limit of 0.012 of the condition (24) is exceeded, in contrast, the radial gradient-index lens element will undesirably be incapable of sufficiently correcting longitudinal chromatic aberration. It is needless to say that all radial gradient-index lens elements to be used in the image transmission optical system according to the present invention satisfy the condition (24).

When the image transmission optical system according to the present invention is to be used in non-flexible endoscopes or the similar optical instruments, the optical system is obliged to comprise a relay lens system which has a long distance as measured from an object to an image. A relay lens system which is long relatively to a radius of an image will be fragile. Each of radial gradient-index lens elements to be used in the image transmission optical system according to the present invention is configured so as to satisfy the following condition (25):

$$1.5 < d_G/IH < 30 \tag{25}$$

A radial gradient-index lens element which satisfies the condition (25) is not fragile. If the lower limit of 1.5 of the condition (25) is exceeded, it will be not easy to configure the relay system so as to be long as measured from an object to an image. If the upper limit of 30 of the condition (25) is exceeded, in contrast, the radial gradient-index lens element will undesirably be fragile.

When a radial gradient-index lens element has refractive index distribution coefficient of the second order $N_{10}$ which is too large for a radius of an image, it is difficult to configure the radial gradient-index lens element so as to be thick while reserving a refractive power required there for, thereby making it difficult to prolong a distance of a relay lens system as measured from an object to an image. It is desirable to configure each of radial gradient-index lens elements which are to be used in the image transmission optical system according to the present invention so as to satisfy the following condition (26):

$$0.2 \times 10^{-4} < |N_{10} \times IH^2| < 0.2 \times 10^{-1} \tag{26}$$

When each of the radial gradient-index lens elements satisfies the condition (26), it is possible to configure a relay lens system so as to have a long distance as measured from an object to an image, thereby providing an advantage for use of the image transmission optical system according to the present invention in non-flexible endoscopes. If the upper limit of $0.2 \times 10^{-1}$ of the condition (26) is exceeded, it will not be easy to prolong the distance as measured from an object to an image. If the lower limit of $0.2 \times 10^{-4}$ of the condition (26) is exceeded, in contrast, it will undesirably be difficult to allow the radial gradient-index lens elements to exhibit their effects for correcting a Petzval's sum and longitudinal chromatic aberration.

A Petzval's sum and longitudinal chromatic aberration can be corrected favorably by using radial gradient-index lens elements in the image transmission optical system according to the present invention. Aberrations other than a Petzval's sum and longitudinal chromatic aberration can be corrected more favorably by utilizing refractive index distribution coefficients of higher orders.

Since the image transmission optical system according to the present invention has a small field angle, it allows offaxial aberrations such as distortion and lateral chromatic aberration to be corrected relatively easily, but can hardly corrects spherical aberration. However, the image transmission optical system according to the present invention allows spherical aberration to be corrected by utilizing refractive index distribution coefficients of high orders of a radial gradient-index lens element. For correction of spherical aberration, refractive powers of surface and medium of the radial gradient-index lens element are determined, and coefficients such as $N_{10}$ and $V_{10}$, lens thickness $d_G$, radii of curvature and so on are selected so as to favorably correct a Petzval's sum and longitudinal chromatic aberration while satisfying specification items such as a total length required for the image transmission optical system. Further, coefficients of high orders such as $N_{20}$ are determined so as to correct spherical aberration to be produced in the image transmission optical system having these specification items while taking into consideration, needless to say, aberrations other than spherical aberration.

When the image transmission optical system is to be composed, in order from the object side, of a first positive lens unit and a second positive lens unit, it is desirable for favorable correction of aberrations to configure lens elements so as to have shapes satisfying the conditions (7), (8), (9) and (10) as described above. For loosening tolerances and reducing cost for lens polishing at a machining stage, it is undesirable that the lens elements have extremely small radii of curvature on surfaces thereof. Such extremely small radii of curvature will oblige the lens elements to have strengthened refractive powers of surface, thereby imposing stricter polishing tolerances and enhancing manufacturing cost of the lens elements. It is desirable to configure lens elements which are to be used for composing the image transmission optical system according to the present invention so as to satisfy the following conditions (27), (28), (29) and (30):

$$-0.3 < IH/r_1 < 0.1 \tag{27}$$

$$-0.2 < IH/r_2 < 0.02 \tag{28}$$

$$-0.02 < IH/r_3 < 0.2 \tag{29}$$

$$-0.1 < IH/r_4 < 0.3 \tag{30}$$

wherein the reference symbol IH represents an image height, the reference symbol $r_1$ designates a radius of curvature on an object side surface of a first lens unit, the reference symbol $r_2$ denotes a radius of curvature on an image side surface of the first lens unit, the reference symbol $r_3$ represents radius of curvature on an object side surface of a second lens unit and the reference symbol r4 designates a radius of curvature on an image side surface of the second lens unit.

By configuring the lens elements so as to satisfy the conditions (27), (28), (29) and (30), it is possible not only to correct aberrations favorably but also to obtain advantages from viewpoints of polishing tolerances and a manufacturing cost.

If these conditions are not satisfied, polishing tolerances will be strict and manufacturing cost will be high.

For allowing a radial gradient-index lens element to sufficiently exhibit its effects for correcting a Petzval's sum and longitudinal chromatic aberration, it is desirable to configure the lens element so as to satisfy the condition (14) as described above. When the image transmission optical system is to be used in a non-flexible endoscope in particular, it is desirable to configure the lens element so as to have a value of $\phi_m/\phi$ which satisfies the following condition (31):

$$0.2 < \phi_m/\phi < 2.5 \tag{31}$$

If the lower limit of 0.2 of the condition (31) is exceeded, the lens element will have a refractive power of medium $\phi_m$ which is weak relatively to a total refractive power $\phi$ thereof, thereby hardly allowed to exhibit its effect for correcting a Petzval's sum and longitudinal chromatic aberration. If the upper limit of 2.5 of the condition (31) is exceeded, in contrast, the lens element will have a weak total refractive power, thereby hardly being usable in the image transmission optical system according to the present invention.

When the image transmission optical system according to the present invention is to be used in a non-flexible endoscope, it is desirable to configure a radial gradient-index lens element so as to satisfy the condition (11) as described above. When the distance HD between principal points has an extremely large value, however, a relay lens system has an extremely long distance as measured from an object to an image, thereby being inadequate for use in a non-flexible endoscope. When the image transmission optical system according to the present invention is to be used in a non-flexible endoscope, it is desirable to configure a radial gradient-index lens element so as to satisfy the following condition (32):

$$10 < HD/IH < 35 \tag{32}$$

If the lower limit of 10 of the condition (32) is exceeded, the image transmission optical system according to the present invention will comprise a relay lens system having a distance as measured from an object to an image which is too short for use in a non-flexible endoscope. If the upper limit of 35 of the condition (32) is exceeded, in contrast, the image transmission optical system will comprise a relay lens system having a distance as measured from an object to an image which is too long for use in a non-flexible endoscope.

When the image transmission optical system according to the present invention is to be composed, in order from the object side, of a first positive lens unit, a second positive lens unit consisting of a single radial gradient-index lens element and a third positive lens unit, or three lens elements including at least one radial gradient-index lens element, it is desirable for more favorable correction of longitudinal chromatic aberration to configure the radial gradient-index lens element so as to satisfy the following of conditions (33) and (34):

$$|(N_{00}-1)/r_{1G}| < 0.65 \times 1 f_G \tag{33}$$

$$|(N_{00}-1)/r_{2G}| < 0.65 \times 1/f_G \tag{34}$$

wherein the reference symbol $N_{00}$ represents a refractive index of a portion of the radial gradient-index lens element which is located on the optical axis, the reference symbols $r_{1G}$ and $r_{2G}$ designate radii of curvature on an object side surface and an image side surface respectively of the radial gradient-index lens element, and the reference symbol $f_G$ denotes a focal length of the radial gradient-index lens element.

It is necessary for efficient utilization of the correcting effects of a radial gradient-index lens element to select adequate values for a refractive power of surface and a refractive power of medium respectively of the radial gradient-index lens element. For effective use of a radial gradient-index lens element in particular, it is desirable to configure it so as to have surfaces on which radii of curvature are large, or satisfy the conditions (33) and (34). If the condition (33) or (34) is not satisfied, the radial gradient-index lens element will hardly be capable of correcting longitudinal chromatic aberration favorably.

When the image transmission optical system according to the present invention is to be composed, in order from the object side, of a first positive lens unit, a second positive lens unit consisting of a single radial gradient-index lens element and a third positive lens unit, or at least three lens elements including at least one radial gradient-index lens element, it is desirable for more favorable correction of longitudinal chromatic aberration to configure the radial gradient-index lens element so as to satisfy the following condition (35):

$$-0.5 \times 10^{-1} < N_{10} \times IH < -0.5 \times 10^{-3} \tag{35}$$

For effectively using a radial gradient-index lens element so as to correct longitudinal chromatic aberration, it is desirable to configure the lens element so as to satisfy the condition (35). For favorable correction of longitudinal chromatic aberration, the radial gradient-index lens element must have a large value of refractive power of medium $\phi_m$ as seen from the formula (b). A radial gradient-index lens element which satisfies the condition (35) has a sufficiently large value of refractive power of medium $\phi_m$. If the upper limit of the condition (35) is exceeded, the radial gradient-index lens element will have a weak refractive power of medium, thereby under-correcting longitudinal chromatic aberration. If the lower limit of the condition (35) is exceeded, a difference between a refractive index of a lens portion to be located on the optical axis and a refractive index of a marginal portion will be too large, thereby undesirably enhancing manufacturing cost of a material of the radial gradient-index lens element and imposing stricter manufacturing tolerances.

When the image transmission optical system according to the present invention is to be composed, in order from the object side, of a first positive lens unit, a second positive lens unit consisting of a single gradient-index lens element and a third positive lens unit, or at least three lens elements including at least one radial gradient-index lens element, it is desirable for more favorable correction of longitudinal chromatic aberration to configure the radial gradient index lens element so as to satisfy the following condition (36):

$$1 < d_G/IH < 9 \tag{36}$$

For correcting longitudinal chromatic aberration, the radial gradient-index lens element must have a large value of refractive power of medium as judged from the formula (b). Further, the refractive power $\phi_m$ is proportional to a product of the refractive index distribution coefficient $N_{10}$ multiplied by thickness $d_G$ of a radial gradient-index lens element as expressed by the formula (c). For strengthening a refractive power of medium $\phi_m$, it is therefore desirable to configure a radial gradient-index lens element so as to satisfy the condition (36). If the upper limit of the condition (36) is exceeded, the radial gradient-index lens element will be thick, thereby undesirably requiring a high manufacturing cost and imposing strict polishing tolerances. If the lower limit of the condition(36) is exceeded, in contrast, the radial radient-index lens element will have a weak refractive power of medium and can hardly correct longitudinal chromatic aberration favorably. First through thirty-second embodiments of the image transmission optical system which have been described in detail are illustrated in FIG. 13 through FIG. 30 respectively. These embodiments have numerical data which are listed below:

Embodiment 1
NA=0.06, IH=1.0, BD=10.2 (mm)
$r_1 = -28.3213$
  $d_1 = 18.2917$ Radial gradient-index lens element 1
$r_2 = -91.2495$
  $d_2 = 20.0021$
$r_3 = 68.0258$
  $d_3 = 21.5075$ Radial gradient-index lens element 2
$r_4 = -19.4239$

| | $N_{00}$ | $N_{10}$ | $N_{20}$ |
|---|---|---|---|
| Radial gradient-index lens element 1 | | | |
| d line | 1.6 | $-0.21421 \times 10^{-2}$ | $0.17729 \times 10^{-5}$ |
| C line | 1.59673 | $-0.21392 \times 10^{-2}$ | $0.18093 \times 10^{-5}$ |
| F line | 1.60764 | $-0.21488 \times 10^{-2}$ | $0.16877 \times 10^{-5}$ |
| Radial gradient-index lens element 2 | | | |
| d line | 1.7 | $-0.64762 \times 10^{-3}$ | $0.27824 \times 10^{-5}$ |
| C line | 1.694 | $-0.65443 \times 10^{-3}$ | $0.38728 \times 10^{-}$ |
| F line | 1.714 | $-0.63173 \times 10^{-3}$ | $0.23804 \times 10^{-}$ |

Embodiment 2
NA=0.07, IH=1.0, BD=9 (mm)
$r_1 = 35.8279$
  $d_1 = 1.6381$ Radial gradient-index lens element 1
$r_2 = -10.5370$
  $d_2 = 18.9139$
$r_3 = 11.0493$
  $d_3 = 2.4480$ Radial gradient-index lens element 2
$r_4 = -35.9778$

| | $N_{00}$ | $N_{10}$ | $N_{20}$ | $N_{30}$ |
|---|---|---|---|---|
| Radial gradient-index lens element 1 | | | | |
| d line | 1.65 | $-0.71365 \times 10^{-2}$ | $-0.18059 \times 10^{-3}$ | $-0.92556 \times 10^{-5}$ |
| C line | 1.64512 | $-0.73323 \times 10^{-2}$ | $-0.18436 \times 10^{-3}$ | $-0.92832 \times 10^{-5}$ |
| F line | 1.66137 | $-0.66796 \times 10^{-2}$ | $-0.17177 \times 10^{-3}$ | $-0.91911 \times 10^{-5}$ |
| Radial gradient-index lens element 2 | | | | |
| d line | 1.6 | $-0.68597 \times 10^{-2}$ | $-0.11321 \times 10^{-3}$ | $-0.31517 \times 10^{-5}$ |
| C line | 1.596 | $-0.69497 \times 10^{-2}$ | $-0.10947 \times 10^{-3}$ | $-0.31438 \times 10^{-5}$ |
| F line | 1.60933 | $-0.66495 \times 10^{-2}$ | $-0.12192 \times 10^{-3}$ | $-0.31701 \times 10^{-5}$ |

Embodiment 3
NA=0.08, IH=1.0, BD=4.5 (mm)
$r_1 = -10.5249$
  $d_1 = 11.7245$ Radial gradient-index lens element 1
$r_2 = -18.6753$
  $d_1 = 21.4743$
$r_3 = 21.4531$
  $d_3 = 12.3012$ Radial gradient-index lens element 2
$r_4 = 10.2969$

| | $N_{00}$ | $N_{10}$ | $N_{20}$ | $N_{30}$ |
|---|---|---|---|---|
| Radial gradient-index lens element 1, 2 | | | | |
| d line | 1.6 | $-0.46717 \times 10^{-2}$ | $-0.10833 \times 10^{-5}$ | $-0.37649 \times 10^{-7}$ |
| C line | 1.59673 | $-0.46717 \times 10^{-2}$ | $-0.10717 \times 10^{-5}$ | $-0.37254 \times 10^{-7}$ |
| F line | 1.60764 | $-0.46717 \times 10^{-2}$ | $-0.11119 \times 10^{-5}$ | $-0.38290 \times 10^{-7}$ |

Embodiment 4
NA=0.072, IH=1.0, BD=4.9 (mm)
$r_1 = 138.4818$
  $d_1 = 21.4578$ Radial gradient-index lens element 1
$r_2 = -43.0312$
  $d_2 = 12.7844$
$r_3 = 43.0312$ $d_3$=21.4578 Radial gradient-index lens element 1
$r_4$=−138.4818

|        | $N_{00}$ | $N_{10}$ | $N_{20}$ | $N_{30}$ |
|--------|----------|----------|----------|----------|
| d line | 1.633    | $-0.18213 \times 10^{-2}$ | $-0.90575 \times 10^{-5}$ | $0.38202 \times 10^{-6}$ |
| C line | 1.62841  | $-0.18213 \times 10^{-2}$ | $-0.90574 \times 10^{-5}$ | $0.38202 \times 10^{-6}$ |
| F line | 1.6437   | $-0.18213 \times 10^{-2}$ | $-0.90577 \times 10^{-5}$ | $0.38203 \times 10^{-6}$ |

Embodiment 5
NA=0.072, IH=1.0, BD=4.9 (mm)
$r_1$=43.4663
$d_1$=20.9632 Radial gradient-index lens element 1
$r_2$=−59.1266
$d_2$=8.7652
$r_3$=59.1266
$d_3$=20.9632 Radial gradient-index lens element 1
$r_4$=−43.4663

| Radial gradient-index lens element 1 | | | | |
|--------|----------|----------|----------|----------|
|        | $N_{00}$ | $N_{10}$ | $N_{20}$ | $N_{30}$ |
| d line | 1.633    | $-0.19952 \times 10^{-2}$ | $-0.54736 \times 10^{-6}$ | $0.53074 \times 10^{-6}$ |
| C line | 1.62841  | $-0.19952 \times 10^{-2}$ | $-0.54737 \times 10^{-6}$ | $0.53075 \times 10^{-6}$ |
| F line | 1.6437   | $-0.19951 \times 10^{-2}$ | $-0.54733 \times 10^{-6}$ | $0.53071 \times 10^{-6}$ |

Embodiment 6
NA=0.1, IH=2.0, BD=4.9 (mm)
$r_1$=−18.8410
$d_1$=14.3177 Radial gradient-index lens element 1
$r_2$=−19.8526
$d_2$=22.0646
$r_3$=19.8526
$d_3$=14.3177 Radial gradient-index lens element 1
$r_4$=18.8410

| Radial gradient-index lens element 1 | | | | |
|--------|----------|----------|----------|----------|
|        | $N_{00}$ | $N_{10}$ | $N_{20}$ | $N_{30}$ |
| d line | 1.633    | $-0.29786 \times 10^{-2}$ | $-0.22712 \times 10^{-5}$ | $-0.19493 \times 10^{-7}$ |
| C line | 1.62841  | $-0.29827 \times 10^{-2}$ | $0.22743 \times 10^{-5}$  | $-0.19520 \times 10^{-7}$ |
| F line | 1.6437   | $-0.29691 \times 10^{-2}$ | $-0.22640 \times 10^{-5}$ | $-0.19431 \times 10^{-7}$ |

Embodiment 7
NA=0.142, IH=1.0, BD=8 (mm)
$r_1$=−10.1701
$d_1$=11.1382 Radial gradient-index lens element 1
$r_2$=−58.8591
$d_2$=28.3904
$r_3$=58.8591
$d_3$=11.1382 Radial gradient-index lens element 1
$r_4$=10.1701

| Radial gradient-index lens element 1 | | | | |
|--------|----------|----------|----------|----------|
|        | $N_{00}$ | $N_{10}$ | $N_{20}$ | $N_{30}$ |
| d line | 1.65     | $-0.51682 \times 10^{-2}$ | $0.90507 \times 10^{-5}$ | $-0.17938 \times 10^{-7}$ |
| C line | 1.6461   | $-0.51598 \times 10^{-2}$ | $0.90359 \times 10^{-5}$ | $-0.17909 \times 10^{-7}$ |
| F line | 1.6591   | $-0.51880 \times 10^{-2}$ | $0.90853 \times 10^{-5}$ | $-0.18006 \times 10^{-7}$ |

Embodiment 8
NA=0.072, IH=1.0, BD=5 (mm)
$r_1$=−9.4923
$d_1$=13.0911 Radial gradient-index lens element 1
$r_2$=−39.3475
$d_2$=23.8178
$r_3$=39.3475
$d_3$=13.0911 Radial gradient-index lens element 1
$r_4$=9.4923

| Radial gradient-index lens element 1 | | | | |
|--------|----------|----------|----------|----------|
|        | $N_{00}$ | $N_{10}$ | $N_{20}$ | $N_{30}$ |
| d line | 1.7      | $-0.48943 \times 10^{-2}$ | $0.50925 \times 10^{-5}$ | $-0.31010 \times 10^{-6}$ |
| C line | 1.69475  | $-0.48872 \times 10^{-2}$ | $0.50847 \times 10^{-5}$ | $-0.37956 \times 10^{-6}$ |
| F line | 1.71225  | $-0.49111 \times 10^{-2}$ | $0.51107 \times 10^{-5}$ | $-0.33124 \times 10^{-6}$ |

Embodiment 9
NA=0.1, IH=1.0, BD=5 (mm)
$r_1$=−3.4831
$d_1$=8.8433 Radial gradient-index lens element 1
$r_2$=−31.4073
$d_2$=32.3134
$r_3$=31.4073
$d_3$=8.8433 Radial gradient-index lens element 1
$r_4$=3.4831

| Radial gradient-index lens element 1 | | | | |
|--------|----------|----------|----------|----------|
|        | $N_{00}$ | $N_{10}$ | $N_{20}$ | $N_{30}$ |
| d line | 1.7      | $-0.11011 \times 10^{-1}$ | $0.38713 \times 10^{-4}$ | $-0.33875 \times 10^{-7}$ |
| C line | 1.69484  | $-0.10978 \times 10^{-1}$ | $0.38598 \times 10^{-4}$ | $-0.39757 \times 10^{-7}$ |
| F line | 1.71234  | $-0.11132 \times 10^{-1}$ | $0.39137 \times 10^{-4}$ | $-0.40151 \times 10^{-7}$ |

Embodiment 10
NA=0.1, IH=−1.0, BD=7 (mm)
$r_1$=−10.3246
$d_1$=10.6290 Radial gradient-index lens element 1
$r_2$=−38.6840
$d_2$=25.2420
$r_3$=38.6840
$d_3$=10.6290 Radial gradient-index lens element 1
$r_4$=10.3246

| Radial gradient-index lens element 1 | | | | |
|--------|----------|----------|----------|----------|
|        | $N_{00}$ | $N_{10}$ | $N_{20}$ | $N_{30}$ |
| d line | 1.633    | $-0.54642 \times 10^{-2}$ | $0.74405 \times 10^{-5}$ | $-0.46187 \times 10^{-7}$ |
| C line | 1.62841  | $-0.54563 \times 10^{-2}$ | $0.74298 \times 10^{-5}$ | $-0.46120 \times 10^{-7}$ |
| F line | 1.64370  | $-0.54826 \times 10^{-2}$ | $0.74655 \times 10^{-5}$ | $-0.46342 \times 10^{-7}$ |

Embodiment 11
NA=0.1, IH=1.0, BD=6 (mm)
$r_1$=−4.8694
$d_1$=9.9369 Radial gradient-index lens element 1
$r_2$=−61.4156
$d_2$=28.1270
$r_3$=61.4156
$d_3$=9.9369 Radial gradient-index lens element 1
$r_4$=4.8694

Radial gradient-index lens element 1

|        | $N_{00}$ | $N_{10}$ | $N_{20}$ | $N_{30}$ |
|--------|----------|----------|----------|----------|
| d line | 1.55     | $-0.79018 \times 10^{-2}$ | $0.28323 \times 10^{-4}$ | $-0.11594 \times 10^{-6}$ |
| C line | 1.547    | $-0.78875 \times 10^{-2}$ | $0.28272 \times 10^{-4}$ | $-0.11573 \times 10^{-6}$ |
| F line | 1.557    | $-0.79352 \times 10^{-2}$ | $0.28443 \times 10^{-4}$ | $-0.11643 \times 10^{-6}$ |

Embodiment 12
NA=0.1, IH=1.0, BD=5 (mm)
$r_1 = -4.9158$
  $d_1 = 11.4996$ Radial gradient-index lens element 1
$r_2 = -74.3432$
  $d_2 = 27.0008$
$r_3 = 74.3432$
  $d_3 = 11.4996$ Radial gradient-index lens element 1
$r_4 = 4.9158$ Radial gradient-index lens element 1

|        | $N_{00}$ | $N_{10}$ | $N_{20}$ | $N_{30}$ |
|--------|----------|----------|----------|----------|
| d line | 1.55     | $-0.68680 \times 10^{-2}$ | $0.19922 \times 10^{-4}$ | $-0.99872 \times 10^{-7}$ |
| C line | 1.54633  | $-0.68535 \times 10^{-2}$ | $0.19880 \times 10^{-4}$ | $-0.99662 \times 10^{-7}$ |
| F line | 1.55856  | $-0.69018 \times 10^{-2}$ | $0.20020 \times 10^{-4}$ | $-0.10036 \times 10^{-6}$ |

Embodiment 13
NA=0.08, IH=1.0, BD=2 (mm)
$r_1 = 23.9595$
  $d_1 = 28.1818$ Radial gradient-index lens element 1
$r_2 = -15.3333$
  $d_2 = 11.6366$
$r_3 = 15.3333$
  $d_3 = 28.1818$ Radial gradient-index lens element 1
$r_4 = -23.9595$ Radial gradient-index lens element 1

|        | $N_{00}$ | $N_{10}$ | $N_{20}$ |
|--------|----------|----------|----------|
| d line | 1.6      | $-0.52687 \times 10^{-3}$ | $0.29592 \times 10^{-7}$ |
| C line | 1.5964   | $-0.53281 \times 10^{-3}$ | $0.29926 \times 10^{-7}$ |
| F line | 1.6084   | $-0.51301 \times 10^{-3}$ | $0.28813 \times 10^{-7}$ |

Embodiment 14
NA=0.07, IH=1.0, BD=3.5 (mm)
$r_1 = \infty$
  $d_1 = 23.0004$ Radial gradient-index lens element 1
$r_2 = \infty$
  $d_2 = 6.9992$
$r_3 = \infty$
  $d_3 = 23.0004$ Radial gradient-index lens element 1
$r_4 = \infty$ Radial gradient-index lens element 1

|        | $N_{00}$ | $N_{10}$ | $N_{20}$ | $N_{30}$ |
|--------|----------|----------|----------|----------|
| d line | 1.633    | $-0.24737 \times 10^{-2}$ | $0.31528 \times 10^{-5}$ | $-0.16825 \times 10^{-5}$ |
| C line | 1.62841  | $-0.24694 \times 10^{-2}$ | $0.31472 \times 10^{-5}$ | $-0.16795 \times 10^{-5}$ |
| F line | 1.6437   | $-0.24840 \times 10^{-2}$ | $0.31658 \times 10^{-5}$ | $-0.16894 \times 10^{-5}$ |

Embodiment 15
NA=0.07, IH=1.0, BD=4.9 (mm)
$r_1 = 14.7912$
  $d_1 = 21.0000$ Radial gradient-index lens element 1
$r_2 = -16.3053$
  $d_2 = 8.7000$
$r_3 = 16.3053$
  $d_3 = 21.0000$ Radial gradient-index lens element 1
$r_4 = -14.7912$ Radial gradient-index lens element 1

|        | $N_{00}$ | $N_{10}$ | $N_{20}$ | $N_{30}$ |
|--------|----------|----------|----------|----------|
| d line | 1.633    | $-0.64948 \times 10^{-3}$ | $0.76811 \times 10^{-6}$ | $0.31971 \times 10^{-5}$ |
| C line | 1.62841  | $-0.66029 \times 10^{-3}$ | $0.78091 \times 10^{-6}$ | $0.32504 \times 10^{-5}$ |
| F line | 1.6437   | $-0.62426 \times 10^{-3}$ | $0.73824 \times 10^{-6}$ | $0.30728 \times 10^{-5}$ |

Embodiment 16
NA=0.072, IH=1.0, BD=4.9 (mm)
$r_1 = 138.4818$
  $d_1 = 21.4578$ Radial gradient-index lens element 1
$r_2 = -43.0312$
  $d_2 = 12.7844$
$r_3 = 43.0312$
  $d_3 = 21.4578$ Radial gradient-index lens element 1
$r_4 = -138.4818$
  $d_4 = 9.8000$
$r_5 = 138.4818$
  $d_5 = 21.4578$ Radial gradient-index lens element 1
$r_6 = -43.0312$
  $d_6 = 12.7844$
$r_7 = 43.0312$
  $d_7 = 21.4578$ Radial gradient-index lens element 1
$r_8 = -138.4818$
  $d_8 = 9.8000$
$r_{10} = 138.4818$
  $d_9 = 21.4578$ Radial gradient-index lens element 1
$r_{10} = -43.0312$
  $d_{10} = 12.7844$
$r_1 = 43.0312$
  $d_1 = 21.4578$ Radial gradient-index lens element 1
$r_{12} = -138.4818$ Radial gradient-index lens element 1

|        | $N_{00}$ | $N_{10}$ | $N_{20}$ | $N_{30}$ |
|--------|----------|----------|----------|----------|
| d line | 1.633    | $-0.18213 \times 10^{-2}$ | $-0.90575 \times 10^{-5}$ | $0.38202 \times 10^{-6}$ |
| C line | 1.62841  | $-0.18213 \times 10^{-2}$ | $-0.90574 \times 10^{-5}$ | $0.38202 \times 10^{-6}$ |
| F line | 1.6437   | $-0.18213 \times 10^{-2}$ | $-0.90577 \times 10^{-5}$ | $0.38203 \times 10^{-6}$ |

Embodiment 17
NA=0.008, IH=1.0, BD=15 (mm)
$r_1 = \infty$
  $d_1 = 0.2$ $n_1 = 1.788$ $v_1 = 4738$
$r_2 = 0.8478$
  $d_2 = 0.25$
$r_3 = \infty$
  $d_3 = 3.3399$ $n_2 = 1.757$ $v_2 = 47.87$
$r_4 = -2.1101$
  $d_4 = 1.2366$
$r_5 = 6.7800$
  $d_5 = 1.9094$ $n_3 = 1.60311$ $v_3 = 60.70$
$r_6 = -1.8349$
  $d_6 = 0.4100$ $n_4 = 1.84666$ $v_4 = 23.78$
$r_7 = -4.0011$
  $d_7 = 0.3489$
$r_8 = -1.9974$
  $d_8 = 0.4098$ $n_5 = 1.74077$ $v_5 = 27.79$
$r_9 = -4.5976$ $d_9=0.9734$ $n_6=1.7725$ $\nu_6=49.66$
$r_{10}=-2.5758$
$\quad d_{10}=9.3718$
$r_{11}=138.4818$
$\quad d_{11}=21.4578$ Radial gradient-index lens element 1
$r_{12}=-43.0312$
$\quad d_{12}=12.7844$
$r_{13}=43.0312$
$\quad d_{13}=21.4578$ Radial gradient-index lens element 1
$r_{14}=-138.4818$
$\quad d_{14}=9.8000$
$r_{15}=138.4818$
$\quad d_{15}=21.4578$ Radial gradient-index lens element 1
$r_{16}=-43.0312$
$\quad d_{16}=12.7844$
$r_{17}=43.0312$
$\quad d_{17}=21.4578$ Radial gradient-index lens element 1
$r_{18}=-138.4818$
$\quad d_{18}=9.8000$
$r_{19}=138.4818$
$\quad d_{19}=21.4578$ Radial gradient-index lens element 1
$r_{20}=-43.0312$
$\quad d_{20}=12.7844$
$r_{21}=43.0312$
$\quad d_{21}=21.4578$ Radial gradient-index lens element 1
$r_{22}=-138.4818$

| Radial gradient-index lens element 1 | | | | |
|---|---|---|---|---|
| | $N_{00}$ | $N_{10}$ | $N_{20}$ | $N_{30}$ |
| d line | 1.633 | $-0.18213 \times 10^{-2}$ | $-0.90575 \times 10^{-5}$ | $0.38202 \times 10^{-6}$ |
| C line | 1.62841 | $-0.18213 \times 10^{-2}$ | $-0.90574 \times 10^{-5}$ | $0.38202 \times 10^{-6}$ |
| F line | 1.6437 | $-0.18213 \times 10^{-2}$ | $-0.90577 \times 10^{-5}$ | $0.38203 \times 10^{-6}$ |

Embodiment 18
NA=0.1, IH=2.0, BD=5.5 (mm)
$r_1=9.7062$
$\quad d_1=23.5$ $n_1=1.51633$ $\nu_1=64.15$
$r_2=\infty$
$\quad d_2=2.0$ Radial gradient-index lens element 1
$r_3=32.3105$
$\quad d_3=3.5$
$r_4=-32.3105$
$\quad d_4=2.0$ Radial gradient-index lens element 1
$r_5=\infty$
$\quad d_5=23.5$ $n_1=1.51633$ $\nu_1=64.15$
$r_6=-9.7062$

| Radial gradient-index lens element 1 | | | |
|---|---|---|---|
| | $N_{00}$ | $N_{10}$ | $N_{20}$ |
| d line | 1.6 | $-0.15241 \times 10^{-1}$ | $0.12180 \times 10^{-3}$ |
| C line | 1.594 | $-0.15184 \times 10^{-1}$ | $0.12134 \times 10^{-3}$ |
| F line | 1.614 | $-0.15375 \times 10^{-1}$ | $0.12287 \times 10^{-3}$ |

NA=0.08, IH=1.0, BD=5.0 (mm)
$r_1=10.2360$
$\quad d_1=20.0$ $n_1=1.62004$ $\nu_1=36.2$
$r_2=\infty$
$\quad d_2=2.0$ Radial gradient-index lens element 1
$r_3=32.31-5$
$\quad d_3=3.5$
$r_4=-32.3105$
$\quad d_4=2.0$ Radial gradient-index lens element 1
$r_5=\infty$
$\quad d_5=23.5$ $n_1=1.51633$ $\nu_1=64.15$
$r_6=-9.7062$

| Radial gradient-index lens element 1 | | | |
|---|---|---|---|
| | $N_{00}$ | $N_{10}$ | $N_{20}$ |
| d line | 1.6 | $-0.15241 \times 10^{-1}$ | $0.12180 \times 10^{-3}$ |
| C line | 1.594 | $-0.15184 \times 10^{-1}$ | $0.12134 \times 10^{-3}$ |
| F line | 1.614 | $-0.15375 \times 10^{-1}$ | $0.12287 \times 10^{-3}$ |

Embodiment 19
NA=0.08, IH=1.0, BD=5.0 (mm)
$r_1=10.2360$
$\quad d_1=20.0$ $n_1=1.62004$ $\nu_1=36.2$
$r_2=\infty$
$\quad d_2=3.6$ Radial gradient-index lens element 1
$r_3=\infty$
$\quad d_3=3.6$
$r_4=\infty$
$\quad d_4=3.6$ Radial gradient-index lens element 1
$r_5=\infty$
$\quad d_5=20.0$ $n_1=1.62004$ $\nu_1 36.2$
$r_6=-10.236$

| Radial gradient-index lens element 1 | | | |
|---|---|---|---|
| | $N_{00}$ | $N_{10}$ | $N_{20}$ |
| d line | 1.65 | $-0.68587 \times 10^{-2}$ | $0.10032 \times 10^{-4}$ |
| C line | 1.64567 | $-0.68531 \times 10^{-2}$ | $0.10024 \times 10^{-4}$ |
| F line | 1.66011 | $-0.68716 \times 10^{-2}$ | $0.10051 \times 10^{-4}$ |

Embodiment 20
IH=1.0, NA=0.072, BD=4.9 (mm)
$r_1=14.3199$
$\quad d_1=19.0986$ $n_1=1.74100$ $\nu_1=52.68$
$r_2=-43.1055$
$\quad d_2=3.3468$
$r_3=-1079.4567$
$\quad d_3=7.9216$ $n_2$ (Radial gradient-index lens element)
$r_4=-17.1483$
$\quad d_4=6.2317$
$r_5=43.1055$
$\quad d_5=19.0986$ $n_3=1.74100$ $\nu_3=52.68$
$r_6=-14.3199$

| Radial gradient-index lens element | | | | |
|---|---|---|---|---|
| | $N_{00}$ | $N_{10}$ | $N_{20}$ | $N_{30}$ |
| d line | 1.63300 | $-1.7953 \times 10^{-3}$ | $3.7037 \times 10^{-6}$ | $-4.3703 \times 10^{-7}$ |
| C line | 1.62841 | $-1.8149 \times 10^{-3}$ | $3.7031 \times 10^{-6}$ | $-4.3703 \times 10^{-8}$ |
| F line | 1.64370 | $-1.7496 \times 10^{-3}$ | $3.7052 \times 10^{-6}$ | $-4.3703 \times 10^{-8}$ |

Embodiment 21
IH=1.0, NA=0.072, BD=4.9 (mm)
$r_1=15.3229$
$\quad d_1=19.0701$ $n_1=1.74100$ $\nu_1=52.68$
$r_2=-21.5459$
$\quad d_2=3.4341$
$r_3=260.2656$
$\quad d_3=7.9877$ $n_2$ (Radial gradient-index lens element)
$r_4=-25.8154$
$\quad d_4=6.1379$
$r_5=21.5459$ $d_5=19.0701$ $n_3=1.74100$ $\nu_3=52.68$
$r_6=-15.3229$ Radial gradient-index lens element

|  | $N_{00}$ | $N_{10}$ | $N_{20}$ | $N_{30}$ |
|---|---|---|---|---|
| d line | 1.63300 | $-8.7926 \times 10^{-4}$ | $2.6018 \times 10^{-6}$ | $5.2786 \times 10^{-7}$ |
| C line | 1.62841 | $-9.0642 \times 10^{-4}$ | $2.6822 \times 10^{-6}$ | $5.4416 \times 10^{-7}$ |
| F line | 1.64370 | $-8.1590 \times 10^{-4}$ | $2.4143 \times 10^{-6}$ | $4.8982 \times 10^{-7}$ |

Embodiment 22
IH=1.0, NA=0.073, BD=5.0 (mm)
$r_1=10.3617$
$d_1=19.5000$ $n_1=1.60342$ $\nu_1=38.01$
$r_2=\infty$
$d_2=3.3290$
$r_3=-20.6093$
$d_3=4.0000$ $n_2$ (Radial gradient-index lens element
$r_4=\infty$
$d_4=4.1710$
$r_5=\infty$
$d_5=19.5000$ $n_3=1.60342$ $\nu_3=38.01$
$r_6=-10.3617$ Radial gradient-index lens element

|  | $N_{00}$ | $N_{10}$ | $N_{20}$ | $N_{30}$ |
|---|---|---|---|---|
| d line | 1.63000 | $-1.4291 \times 10^{-2}$ | $8.9177 \times 10^{-5}$ | $-1.0462 \times 10^{-6}$ |
| C line | 1.62584 | $-1.4255 \times 10^{-2}$ | $8.8954 \times 10^{-5}$ | $-1.0435 \times 10^{-6}$ |
| F line | 1.63984 | $-1.4375 \times 10^{-2}$ | $8.9698 \times 10^{-5}$ | $-1.0523 \times 10^{-6}$ |
| g line | 1.64781 | $-1.4423 \times 10^{-2}$ | $8.9999 \times 10^{-5}$ | $-1.0558 \times 10^{-6}$ |

Embodiment 23
IH=1.0, NA=0.073, BD=4.9 (mm)
$r_1=10.7116$
$d_1=19.5700$ $n_1=1.63980$ $\nu_1=34.48$
$r_2=\infty$
$d_2=2.9800$
$r_3=22.2861$
$d_3=5.6000$
$r_4=-22.2861$
$d_4=2.9800$
$r_5=\infty$
$d_5=19.5700$ $n_3=1.63980$ $\nu_3=34.48$
$r_6=-10.7116$ Radial gradient-index lens element

|  | $N_{00}$ | $N_{10}$ | $N_{20}$ |
|---|---|---|---|
| d line | 1.64000 | $-3.0182 \times 10^{-3}$ | $-5.7042 \times 10^{-6}$ |
| C line | 1.63529 | $-3.0544 \times 10^{-3}$ | $-5.7726 \times 10^{-6}$ |
| F line | 1.65128 | $-2.9337 \times 10^{-3}$ | $-5.5445 \times 10^{-6}$ |
| g line | 1.66053 | $-2.5000 \times 10^{-3}$ | $-5.4518 \times 10^{-6}$ |

Embodiment 24
IH=1.0, NA=0.073, BD=4.9 (mm)
$r_1=10.2736$
$d_1=22.0000$ $n_1=1.62588$ $\nu_1=38.01$
$r_2=\infty$
$d_2=2.1500$
$r_3=-38.4575$
$d_3=2.4000$ $n_2$ (Radial gradient-index lens element)
$r_4=38.4575$
$d_4=2.1500$
$r_5=\infty$
$d_5=22.0000$ $n_3=1.62588$ $\nu_3=38.01$
$r_6=-10.2736$ Radial gradient-index lens element

|  | $N_{00}$ | $N_{10}$ | $N_{20}$ |
|---|---|---|---|
| d line | 1.67000 | $-2.5268 \times 10^{-2}$ | $2.7419 \times 10^{-4}$ |
| C line | 1.66440 | $-2.5184 \times 10^{-2}$ | $2.7327 \times 10^{-4}$ |
| F line | 1.68355 | $-2.5465 \times 10^{-2}$ | $2.7632 \times 10^{-4}$ |
| g line | 1.69478 | $-2.5579 \times 10^{-2}$ | $2.7756 \times 10^{-4}$ |

Embodiment 25
IH=1.0, NA=0.073, BD=4.9 (mm)
$r_1=10.2360$
$d_1=21.3300$ $n_1=1.62004$ $\nu_1=36.25$
$r_2=\infty$
$d_2=2.1200$
$r_3=\infty$
$d_3=3.8000$ $n_2$ (Radial gradient-index lens element)
$r_4=\infty$
$d_4=2.1200$
$r_5=\infty$
$d_5=21.3300$ $n_3=1.62004$ $\nu_3=36.25$
$r_6=-10.2360$ Radial gradient-index lens element

|  | $N_{00}$ | $N_{10}$ | $N_{20}$ |
|---|---|---|---|
| d line | 1.66000 | $-1.1625 \times 10^{-2}$ | $1.2009 \times 10^{-5}$ |
| C line | 1.65450 | $-1.1615 \times 10^{-2}$ | $1.1999 \times 10^{-5}$ |
| F line | 1.67283 | $-1.1648 \times 10^{-2}$ | $1.2033 \times 10^{-5}$ |
| g line | 1.68901 | $-1.1662 \times 10^{-2}$ | $1.2047 \times 10^{-5}$ |

Embodiment 26
IH=2.8, NA=0.13, BD=5.0 (mm)
$r_1=15.8467$
$d_1=39.3362$ $n_1=1.58313$ $\nu_1=59.36$
$r_2=-83.6726$
$d_2=0.6813$
$r_3=\infty$
$d_3=4.9714$ $n_2$ (Radial gradient-index lens element)
$r_4=\infty$
$d_4=0.6813$
$r_5=83.6726$
$d_5=39.3362$ $n_3=1.58313$ $\nu_3=34.48$
$r_6=-15.8467$ Radial gradient-index lens element

|  | $N_{00}$ | $N_{10}$ | $N_{20}$ | $N_{30}$ |
|---|---|---|---|---|
| d line | 1.6000 | $-4.9420 \times 10^{-3}$ | $1.4838 \times 10^{-6}$ | $5.7825 \times 10^{-10}$ |
| C line | 1.59600 | $-4.9378 \times 10^{-3}$ | $1.4825 \times 10^{-6}$ | $5.7777 \times 10^{-10}$ |
| F line | 1.60933 | $-4.9519 \times 10^{-3}$ | $1.4868 \times 10^{-6}$ | $5.7942 \times 10^{-10}$ |

Embodiment 27
IH=2.0, NA=0.15, BD=6.0 (mm)
$r_1=13.1185$
$d_1=22.5245$ $n_1=1.69680$ $\nu_3=55.53$
$r_2=113.9445$
$d_2=4.4755$
$r_3=\infty$
$d_3=4.0000$ $n_2$ (Radial gradient-index lens element)
$r_4=\infty$
$d_4=4.4755$
$r_5=-113.9445$ $d_5=22.5245$ $n_3=1.69680$ $v_3=55.53$
$r_6=-13.1185$

| Radial gradient-index lens element | | | |
|---|---|---|---|
| | $N_{00}$ | $N_{10}$ | $N_{20}$ |
| d line | 1.70000 | $-1.0278 \times 10^{-2}$ | $7.5279 \times 10^{-6}$ |
| C line | 1.69580 | $-1.0263 \times 10^{-2}$ | $7.5166 \times 10^{-6}$ |
| F line | 1.70980 | $-1.0314 \times 10^{-2}$ | $7.5543 \times 10^{-6}$ |
| g line | 1.71759 | $-1.0335 \times 10^{-2}$ | $7.5696 \times 10^{-6}$ |

Embodiment 28
IH=2.81, NA=0.129, BD=5.0 (mm)
$r_1=19.3019$
  $d_1=37.8418$ $n_1=1.62004$ $v_1=36.25$
$r_2=\infty$
  $d_2=4.6852$
$r_3=\infty$
  $d_3=9.9496$ $n_2$ (Radial gradient-index lens element)
$r_4=\infty$
  $d_4=4.6852$
$r_5=\infty$
  $d_5=37.8418$ $n_3=1.62004$ $v_3=36.25$
$r_6=-19.3019$

| Radial gradient-index lens element | | | | |
|---|---|---|---|---|
| | $N_{00}$ | $N_{10}$ | $N_{20}$ | $N_{30}$ |
| d line | 1.63300 | $-2.8699 \times 10^{-3}$ | $5.8235 \times 10^{-7}$ | $7.4915 \times 10^{-10}$ |
| C line | 1.62841 | $-2.8641 \times 10^{-3}$ | $5.8116 \times 10^{-7}$ | $7.4759 \times 10^{-10}$ |
| F line | 1.64370 | $-2.8834 \times 10^{-3}$ | $5.8514 \times 10^{-7}$ | $7.5271 \times 10^{-10}$ |
| g line | 1.62689 | $-2.8913 \times 10^{-3}$ | $5.8675 \times 10^{-7}$ | $7.5476 \times 10^{-10}$ |

Embodiment 29
IH=2.8, NA=0.14, BD=5.0 (mm)
$r_1=10.8891$
  $d_1=2.5413$ $n_1=1.88300$ $v_1=40.78$
$r_2=5.5378$
  $d_2=36.1778$ $n_2=1.59551$ $v_2=39.21$
$r_3=-185.1032$
  $d_3=1.2150$
$r_4=\infty$
  $d_{4=4.9609}$ $n_3$ (Radial gradient-index lens element)
$r_5=\infty$
  $d_5=1.2150$
$r_6=185.1032$
  $d_6=36.1778$ $n_4=1.59551$ $v_4=39.21$
$r_7=-5.5378$
  $d_7=2.5413$ $n_5=1.88300$ $v_5=40.78$
$r_8=-10.8891$

| Radial gradient-index lens element | | | | |
|---|---|---|---|---|
| | $N_{00}$ | $N_{10}$ | $N_{20}$ | $N_{30}$ |
| d line | 1.60000 | $-5.9457 \times 10^{-3}$ | $1.2891 \times 10^{-6}$ | $1.5908 \times 10^{-9}$ |
| C line | 1.59600 | $-5.9334 \times 10^{-3}$ | $1.2864 \times 10^{-6}$ | $1.5875 \times 10^{-9}$ |
| F line | 1.60933 | $-5.9745 \times 10^{-3}$ | $1.2953 \times 10^{-6}$ | $1.5985 \times 10^{-9}$ |
| g line | 1.61696 | $-5.9912 \times 10^{-3}$ | $1.2990 \times 10^{-6}$ | $1.6030 \times 10^{-9}$ |

Embodiment 30
IH=1.4, NA=0.1, BD=7.0 (mm)
$r_1=14.9452$ (aspherical surface)
  $d_1=25.0000$ $n_1=1.67790$ $v_1=55.33$
$r_2=\infty$
  $d_2=5.7500$
$r_3=\infty$
  $d_3=4.5000$ $n_2$ (Radial gradient-index lens element)
$r_4=\infty$
  $d_4=5.7500$
$r_5=\infty$
  $d_5=25.0000$ $n_3=1.67790$ $v_3=55.33$
$r_6=-14.9452$ (aspherical surface)

| Radial gradient-index lens element | | | |
|---|---|---|---|
| | $N_{00}$ | $N_{10}$ | $N_{20}$ |
| d line | 1.75000 | $-7.0916 \times 10^{-3}$ | $3.6023 \times 10^{-6}$ |
| C line | 1.74547 | $-7.0898 \times 10^{-3}$ | $3.6014 \times 10^{-6}$ |
| F line | 1.76047 | $-7.0958 \times 10^{-3}$ | $3.6044 \times 10^{-6}$ |
| g line | 1.76874 | $-7.0982 \times 10^{-3}$ | $3.6139 \times 10^{-6}$ | aspherical surface coefficient (1st surface) $A_4=-1.92690 \times 10^{-4}$, (6th surface) $A_4=1.9269033 \times 10^{-4}$ Embodiment 31
IH=1.0, NA=0.073, BD=4.9 (mm)
$r_1=10.2360$
  $d_1=21.3300$ $n_1=1.62004$ $v_1=36.25$
$r_2=\infty$
  $d_2=2.1200$
$r_3=\infty$
  $d_3=3.8000$ $n_2$ (Radial gradient-index lens element)
$r_4=\infty$
  $d_4=2.1200$
$r_5=\infty$
  $d_5=21.3300$ $n_3=1.62004$ $v_3=36.25$
$r_6=-10.2360$
  $d_6=9.8000$
$r_7=10.2360$
  $d_7=21.3300$ $n_4=1.62004$ $v_4=36.25$
$r_8=\infty$
  $d_8=2.1200$
$r_9=\infty$
  $d_{19}=3.8000$ $n_5$ (Radial gradient-index lens element)
$r_{10}=\infty$
  $d_{10}=2.1200$
$r_{11}=\infty$
  $d_{11}=21.3300$ $n_6=1.62004$ $v_6=36.25$
$r_{12}=-10.2360$
  $d_{12}=9.8000$
$r_{13}=10.2360$
  $d_{13}=21.3300$ $n_7=1.62004$ $v_7=36.25$
$r_{14}=\infty$
  $d_{14}=2.1200$
$r_{15}=\infty$
  $d_{15}=3.8000$ $n_8$ (Radial gradient-index lens element)
$r_{16}=\infty$
  $d_{16}=2.1200$
$r_{17}=\infty$
  $d_{17}=21.3300$ $n_9=1.62004$ $v_9=36.25$
$r_{18}=-10.2360$
  $d_{18}=9.8000$
$r_{19}=10.2360$
  $d_{19}=21.3300$ $n_1=1.62004$ $v_{10}=36.25$
$r_{20}=\infty$
  $d_{20}=2.1200$
$r_{21}=\infty$
  $d_{21}=3.8000$ $n_{11}$ (Radial gradient-index lens element)
$r_{22}=\infty$
  $d_{22}=2.1200$
$r_{23}=\infty$ $d_{23}$=21.3300 $n_{12}$=1.62004 $v_{12}$=36.25
$r_{24}$=−10.2360
$d_{24}$=9.8000
$r_{25}$=10.2360
$d_{25}$=21.3300 $n_{13}$=1.62004 $v_{13}$=36.25
$r_{26}$=∞
$d_{26}$=2.1200
$r_{27}$=∞
$d_{27}$=3.8000 $n_{14}$ (Radial gradient-index lens element)
$r_{28}$=∞
$d_{28}$=2.1200
$r_{29}$=∞
$d_{29}$=21.3300 $n_{15}$=1.62004 $v_{15}$=36.25
$r_{30}$=−10.2360

| Radial gradient-index lens element | | | |
|---|---|---|---|
| | $N_{00}$ | $N_{10}$ | $N_{20}$ |
| d line | 1.66000 | −1.1625 × 10$^{-2}$ | 1.2009 × 10$^{-5}$ |
| C line | 1.65450 | −1.1615 × 10$^{-2}$ | 1.1999 × 10$^{-5}$ |
| C line | 1.67283 | −1.1648 × 10$^{-2}$ | 1.2033 × 10$^{-5}$ |
| g line | 1.68901 | −1.1662 × 10$^{-2}$ | 1.2047 × 10$^{-5}$ |

Embodiment 32
IH=1.0, NA=0.0085, BD=13.33 (mm)
$r_1$=∞
$d_1$=0.3000 $n_1$=1.76820 $v_1$71.79
$r_2$=∞
$d_2$=0.1000
$r_3$=5.4470 (aspherical surface)
$d_3$=0.2000 $n_2$=1.78472 $v_2$=25.71
$r_4$=0.6020
$d_4$=0.3000
$r_5$=∞
$d_5$=5.7300 $n_3$=1.788004 $v_3$=43.78
$r_6$=−2.4830
$d_6$=0.2000
$r_7$=3.9660
$d_7$=1.5000 $n_4$=1.58913 $v_4$=61.18
$r_8$=−2.3820
$d_8$=0.4000 $n_5$=1.78472 $v_5$=25.71
$r_9$=−6.7170
$d_9$=0.9000
$r_{10}$=−2.1010 $n_6$=1.78472 $v_6$=25.71
$d_{10}$=0.4000
$r_{11}$=4.3600
$d_{11}$=1.2000 $n_7$=1.77250 $v_7$=49.66
$r_{12}$=−3.1560
$d_{12}$=2.5500
$r_{13}$=∞
$d_{13}$=4.9000
$r_{14}$=10.2360
$d_{14}$=21.3300 $n_8$=1.62004 $v_8$=36.25
$r_{15}$=∞
$d_{15}$=2.1200
$r_{16}$=∞
$d_{16}$=3.8000 $n_9$ (Radial gradient-index lens element)
$r_{17}$=∞
$d_{17}$=2.1200
$r_{18}$=∞
$d_{18}$=21.3300 $n_{10}$=1.62004 $v_{10}$=36.25
$r_{19}$=−10.2360
$d_{19}$=9.8000
$r_{20}$=10.2360

$d_{20}$=21.3300 $n_{11}$=1.62004 $v_{11}$=36.25
$r_{21}$=∞
$d_{21}$=2.1200
$r_{22}$=∞
$d_{22}$=3.8000 $n_{12}$ (Radial gradient-index lens element)
$r_{23}$=∞
$d_{23}$=2.1200
$r_{24}$=∞
$d_{24}$=21.3300 $n_{13}$=1.62004 $v_{13}$=36.25
$r_{25}$=−10.2360
$d_{25}$=9.8000
$r_{26}$=10.2360
$d_{26}$=21.3300 $n_{14}$=1.62004 $v_{14}$=36.25
$r_{27}$=∞
$d_{27}$=2.1200
$r_{28}$=∞
$d_{28}$=3.8000 $n_{15}$ (Radial gradient-index lens element)
$r_{29}$=∞
$d_{29}$=2.1200
$r_{30}$=∞
$d_{30}$=21.3300 $n_{16}$=1.62004 $v_{16}$=36.25
$r_{31}$=−10.2360
$d_{31}$=9.8000
$r_{32}$=10.2360
$d_{32}$=21.3300 $n_{17}$=1.62004 $v_{17}$=36.25
$r_{33}$=∞
$d_{33}$=2.1200
$r_{34}$=∞
$d_{34}$=3.8000 $n_{18}$ (Radial gradient-index lens element)
$r_{35}$=∞
$d_{36}$=21.3300 $n_{19}$=1.62004 $v_{19=36.25}$
$r_{37}$=−10.2360
$d_{37}$=9.8000
$r_{38}$=10.2360
$d_{38}$=21.3300 $n_{20}$=1.62004 $v_{20=36.25}$
$r_{39}$=∞
$d_{39}$=2.1200
$r_{40}$=∞
$d_{40}$=3.8000 $n_{21}$ (Radial gradient-index lens element)
$r_{41}$=∞
$d_{41}$=2.1200
$r_{42}$=∞
$d_{42}$=21.3300 $n_{22}$=1.62004 $v_{20}$=36.25
$r_{43}$=−10.2360

| Radial gradient-index lens element | | | |
|---|---|---|---|
| | $N_{00}$ | $N_{10}$ | $N_{20}$ |
| d line | .66000 | −1.625 × 10$^{-2}$ | .2009 × 10$^{-5}$ |
| C line | .65450 | −1.625 × 10$^{-2}$ | .1999 × 10$^{-5}$ |
| F line | .67283 | −1.648 × 10$^{-2}$ | .2033 × 10$^{-5}$ |
| g line | .68901 | −1.62 × 10$^{-2}$ | .2047 × 10$^{-5}$ | aspherical surface coefficient $A_4$=6.75540×10$^{-2}$, $A_6$=7.65820×10$^{-4}$, $A_8$=4.65710×10$^{-4}$ wherein the reference symbols r1, r2, . . . represent radii of curvature on surfaces of respective lens elements, the reference symbols d1, d2, . . . designate thicknesses of the respective lens elements, and the reference symbols $v_1$, $v_2$, . . . denote Abbe's numbers of the respective lens elements.

Listed below are values of the parameters adopted for the embodiments.

|  | Embodiment 1 1st lens | Embodiment 1 2nd lens | Embodiment 2 1st lens | Embodiment 2 2nd lens |
|---|---|---|---|---|
| $1/V_{10}$ | $0.448 \times 10^{-2}$ | $-0.35 \times 10^{-1}$ | $-0.915 \times 10^{-1}$ | $-0.438 \times 10^{-1}$ |
| $1/V_{00}$ | $0.182 \times 10^{-1}$ | $0.286 \times 10^{-1}$ | $0.25 \times 10^{-1}$ | $0.222 \times 10^{-1}$ |
| $2/V_{00}$ | $0.364 \times 10^{-1}$ | $0.572 \times 10^{-1}$ | $0.50 \times 10^{-1}$ | $0.444 \times 10^{-1}$ |
| $|(N_{00} - 1)/r_{1G}|$ | $0.212 \times 10^{-1}$ | $0.103 \times 10^{-1}$ | $0.181 \times 10^{-1}$ | $0.543 \times 10^{-1}$ |
| $|(N_{00} - 1)/r_{2G}|$ | $0.658 \times 10^{-2}$ | $0.360 \times 10^{-1}$ | $0.647 \times 10^{-1}$ | $0.167 \times 10^{-1}$ |
| $0.9 \times 1/f_G$ | $0.540 \times 10^{-1}$ | $0.542 \times 10^{-1}$ | $0.912 \times 10^{-1}$ | $0.610 \times 10^{-1}$ |
| $0.65 \times 1/f_G$ | $0.390 \times 10^{-1}$ | $0.391 \times 10^{-1}$ | $0.659 \times 10^{-1}$ | $0.441 \times 10^{-1}$ |
| $N_{10} \times IH^2$ | $-0.214 \times 10^{-2}$ | $-0.648 \times 10^{-2}$ | $-0.714 \times 10^{-2}$ | $-0.686 \times 10^{-2}$ |
| $|N_{10} \times IH^2|$ | $0.214 \times 10^{-2}$ | $0.648 \times 10^{-2}$ | $0.714 \times 10^{-2}$ | $0.686 \times 10^{-2}$ |
| $N_{10}$ | $-0.214 \times 10^{-2}$ | $-0.648 \times 10^{-2}$ | $-0.714 \times 10^{-2}$ | $-0.686 \times 10^{-2}$ |
| $IH/r1$ | $-0.0353$ | — | $0.0279$ | — |
| $IH/r2$ | $-0.0110$ | — | $-0.095$ | — |
| $IH/r3$ | — | $0.015$ | — | $0.091$ |
| $IH/r4$ | — | $-0.0515$ | — | $-0.0278$ |
| $ID/IH$ | $33.44$ | $33.44$ | $19.71$ | $19.71$ |
| $d_G/IH$ | $18.292$ | $21.508$ | $1.638$ | $2.448$ |
| $\phi_m/\phi$ | $1.31$ | $0.46$ | $0.23$ | $0.33$ |
| $IP/IH$ | $\infty$ | — | $\infty$ | — |
| $IP/IH$ | — | $\infty$ | — | $\infty$ |
| $ID/IH$ | $10.2$ | $10.2$ | $9$ | $9$ |
| $1_{10} \times fG^2$ | $-0.595$ | $-0.176$ | $-0.699$ | $-0.672$ |
| $d_G/f_G$ | $1.098$ | $1.295$ | $0.166$ | $0.247$ |
| $|N_{10} \times f_G^2|$ | $0.595$ | $0.176$ | $0.699$ | $0.672$ |
| $N_{20}$ | $0.178 \times 10^{-5}$ | $0.278 \times 10^{-5}$ | $-0.181 \times 10^{-3}$ | $-0.113 \times 10^{-3}$ |

|  | Embodiment 3 1st lens | Embodiment 3 2nd lens | Embodiment 4 | Embodiment 5 |
|---|---|---|---|---|
| $1/V_{10}$ | $0$ | $0$ | $0$ | $-0.791 \times 10^{-4}$ |
| $1/V_{00}$ | $0.182 \times 10^{-1}$ | $0.182 \times 10^{-1}$ | $0.242 \times 10^{-1}$ | $0.242 \times 10^{-1}$ |
| $2/V_{00}$ | $0.364 \times 10^{-1}$ | $0.364 \times 10^{-1}$ | $0.484 \times 10^{-1}$ | $0.484 \times 10^{-1}$ |
| $|(N_{00} - 1)/r_{1G}|$ | $0.570 \times 10^{-1}$ | $0.280 \times 10^{-1}$ | $0.457 \times 10^{-2}$ | $0.146 \times 10^{-1}$ |
| $|(N_{00} - 1)/r_{2G}|$ | $0.321 \times 10^{-1}$ | $0.583 \times 10^{-1}$ | $0.147 \times 10^{-1}$ | $0.107 \times 10^{-1}$ |
| $0.9 \times 1/f_G$ | $0.824 \times 10^{-1}$ | $0.825 \times 10^{-1}$ | $0.674 \times 10^{-1}$ | $0.726 \times 10^{-1}$ |
| $0.65 \times 1/f_G$ | $0.595 \times 10^{-1}$ | $0.596 \times 10^{-1}$ | $0.487 \times 10^{-1}$ | $0.524 \times 10^{-1}$ |
| $|N_{10} \times 1H^2|$ | $-0.467 \times 10^{-2}$ | $-0.467 \times 10^{-2}$ | $-0.182 \times 10^{-2}$ | $-0.200 \times 10^{-2}$ |
| $N_{10} \times 1H^2$ | $0.467 \times 10^{-2}$ | $0.467 \times 10^{-2}$ | $0.182 \times 10^{-2}$ | $0.200 \times 10^{-2}$ |
| $N_{10}$ | $-0.467 \times 10^{-2}$ | $-0.467 \times 10^{-2}$ | $-0.182 \times 10^{-2}$ | $-0.200 \times 10^{-2}$ |
| $IH/r1$ | $-0.095$ | — | $0.0072$ | $0.023$ |
| $IH/r2$ | $-0.0535$ | — | $-0.0232$ | $-0.0169$ |
| $IH/r3$ | — | $0.047$ | $0.0232$ | $0.0169$ |
| $IH/r4$ | — | $0.0971$ | $-0.0072$ | $-0.023$ |
| $HD/IH$ | $21.87$ | $21.87$ | $26.70$ | $24.78$ |
| $dG/IH$ | $11.725$ | $12.301$ | $21.458$ | $20.963$ |
| $\phi m/\phi$ | $1.20$ | $1.63$ | $1.04$ | $1.04$ |
| $EP/IH$ | $\infty$ | — | $\infty$ | $\infty$ |
| $OP/IH$ | — | $\infty$ | $\infty$ | $\infty$ |
| $BD/IH$ | $4.5$ | $4.5$ | $4.9$ | $4.9$ |
| $N_{10} \times f_G^2$ | $-0.557$ | $-0.556$ | $-0.325$ | $-0.307$ |
| $d_G/f_G$ | $1.074$ | $1.127$ | $1.607$ | $1.691$ |
| $|N_{10} \times f_G^2|$ | $0.557$ | $0.556$ | $0.325$ | $0.307$ |
| $N_{20}$ | $-0.108 \times 10^{-5}$ | $-0.108 \times 10^{-5}$ | $-0.906 \times 10^{-5}$ | $-0.547 \times 10^{-6}$ |

|  | Embodiment 6 | Embodiment 7 | Embodiment 8 | Embodiment 9 |
|---|---|---|---|---|
| $I/V_{10}$ | $-0.454 \times 10^{-4}$ | $0.545 \times 10^{-2}$ | $0.488 \times 10^{-2}$ | $0.99 \times 10^{-2}$ |
| $1/V_{00}$ | $0.242 \times 10^{-1}$ | $0.2 \times 10^{-1}$ | $0.25 \times 10^{-1}$ | $0.25 \times 10^{-1}$ |
| $2V_{00}$ | $0.484 \times 10^{-1}$ | $0.4 \times 10^{-1}$ | $0.5 \times 10^{-1}$ | $0.5 \times 10^{-1}$ |
| $|(N_{00} - 1)/r_{1G})|$ | $0.336 \times 10^{-1}$ | $0.639 \times 10^{-1}$ | $0.737 \times 10^{-1}$ | $0.201$ |
| $|(N_{00} - 1)/r_{2G})|$ | $0.319 \times 10^{-1}$ | $0.110 \times 10^{-1}$ | $0.178 \times 10^{-1}$ | $0.223 \times 10^{-1}$ |
| $0.9 \times 1/f_G$ | $0.740 \times 10^{-1}$ | $0.642 \times 10^{-1}$ | $0.775 \times 10^{-1}$ | $0.788 \times 10^{-1}$ |
| $0.65 \times 1/f_G$ | $0.534 \times 10^{-1}$ | $0.464 \times 10^{-1}$ | $0.560 \times 10^{-1}$ | $0.569 \times 10^{-1}$ |
| $N_{10} \times IH^2$ | $-0.119 \times 10^{-1}$ | $-0.517 \times 10^{-2}$ | $-0.489 \times 10^{-2}$ | $-0.110 \times 10^{-1}$ |
| $|N_{10} \times IH^2|$ | $0.119 \times 10^{-1}$ | $0.517 \times 10^{-2}$ | $0.489 \times 10^{-2}$ | $0.110 \times 10^{-1}$ |
| $N_{10}$ | $-0.298 \times 10^{-2}$ | $-0.517 \times 10^{-2}$ | $-0.489 \times 10^{-2}$ | $-0.110 \times 10^{-1}$ |
| $IH/r1$ | $-0.1062$ | $-0.0983$ | $-0.1053$ | $-0.2871$ |
| $IH/r2$ | $-0.0504$ | $-0.0170$ | $-0.0254$ | $-0.0318$ |
| $IH/r3$ | $0.0504$ | $0.0170$ | $0.0254$ | $0.0318$ |
| $IH/r4$ | $0.1062$ | $0.0983$ | $0.1053$ | $0.2871$ |
| $HD/IH$ | $12.15$ | $28.01$ | $23.24$ | $22.89$ |
| $d_G/IH$ | $7.159$ | $11.138$ | $13.091$ | $8.843$ |
| $\phi m/\phi$ | $1.04$ | $1.76$ | $1.49$ | $2.23$ |
| $EP/IH$ | $\infty$ | $\infty$ | $\infty$ | $\infty$ |
| $OP/IH$ | $\infty$ | $\infty$ | $\infty$ | $\infty$ |
| $BD/IH$ | $2.45$ | $8$ | $5$ | $5$ |
| $|N_{10} \times f_G^2|$ | $-0.441$ | $-1.016$ | $-0.661$ | $-1.438$ |
| $d_G/f_G$ | $1.177$ | $0.795$ | $1.127$ | $0.774$ |

-continued

| | | | | |
|---|---|---|---|---|
| $\|N_{10} \times f_G^2\|$ | 0.441 | 1.016 | 0.661 | 1.438 |
| $N_{20}$ | $-0.227 \times 10^{-5}$ | $0.905 \times 10^{-5}$ | $-0.509 \times 10^{-5}$ | $-0.387 \times 10^{-4}$ |

| | Embodiment 10 | Embodiment 11 | Embodiment 12 | Embodiment 13 |
|---|---|---|---|---|
| $1/V_{10}$ | $0.48 \times 10^{-2}$ | $0.603 \times 10^{-2}$ | $0.702 \times 10^{-2}$ | $0.376 \times 10^{-1}$ |
| $1/V_{00}$ | $0.242 \times 10^{-1}$ | $0.182 \times 10^{-1}$ | $0.222 \times 10^{-1}$ | $0.2 \times 10^{-1}$ |
| $2/V_{00}$ | $0.484 \times 10^{-1}$ | $0.364 \times 10^{-1}$ | $0.444 \times 10^{-1}$ | $0.4 \times 10^{-1}$ |
| $\|(N_{00}-1)/r_{1G}\|$ | $0.613 \times 10^{-1}$ | 0.113 | 0.112 | $0.250 \times 10^{-1}$ |
| $\|(N_{00}-1)/r_{2G}\|$ | $0.164 \times 10^{-1}$ | $0.896 \times 10^{-2}$ | $0.740 \times 10^{-2}$ | $0.391 \times 10^{-1}$ |
| $0.9 \times 1/f_G$ | $0.710 \times 10^{-1}$ | $0.733 \times 10^{-1}$ | $0.764 \times 10^{-1}$ | $0.535 \times 10^{-1}$ |
| $0.65 \times 1/f_G$ | $0.512 \times 10^{-1}$ | $0.530 \times 10^{-1}$ | $0.552 \times 10^{-1}$ | $0.387 \times 10^{-1}$ |
| $N_{10} \times IH^2$ | $-0.546 \times 10^{-2}$ | $-0.790 \times 10^{-2}$ | $-0.687 \times 10^{-2}$ | $-0.527 \times 10^{-3}$ |
| $\|N_{10} \times IH^2\|$ | $0.546 \times 10^{-2}$ | $0.790 \times 10^{-2}$ | $0.687 \times 10^{-2}$ | $0.527 \times 10^{-3}$ |
| $N_{10}$ | $-0.546 \times 10^{-2}$ | $-0.790 \times 10^{-2}$ | $-0.687 \times 10^{-2}$ | $-0.527 \times 10^{-3}$ |
| $IH/r1$ | $-0.0969$ | $-0.2054$ | $-0.2034$ | $-0.0417$ |
| $IH/r2$ | $-0.0259$ | $-0.0163$ | $-0.0135$ | $-0.0652$ |
| $IH/r3$ | $0.0259$ | $0.0163$ | $0.0135$ | $0.0652$ |
| $IH/r4$ | $0.0969$ | $0.2054$ | $0.2-34$ | $0.0471$ |
| $HD/IH$ | 25.35 | 24.55 | 23.55 | 33.62 |
| $d_G/IH$ | 10.629 | 9.937 | 11.500 | 28.182 |
| $\phi m/\phi$ | 1.47 | 1.93 | 1.86 | .50 |
| $EP/IH$ | $\infty$ | $\infty$ | $\infty$ | $\infty$ |
| $OP/IH$ | $\infty$ | $\infty$ | $\infty$ | $\infty$ |
| $BD/IH$ | 7 | 8 | 5 | 2 |
| $N_{10} \times f_G^2$ | $-0.880$ | $-1.188$ | $-0.954$ | $-1.149$ |
| $d_G/f_G$ | 0.838 | 0.810 | 0.976 | 1.676 |
| $\|N_{10} \times f_G^2\|$ | 0.880 | 1.188 | 0.954 | 0.149 |
| $N_{20}$ | $0.744 \times 10^{-5}$ | $0.283 \times 10^{-4}$ | $-0.200 \times 10^{-4}$ | $-0.296 \times 10^{-7}$ |

| | Embodiment 14 | Embodiment 15 | Embodiment 18 | Embodiment 19 |
|---|---|---|---|---|
| $1/V_{10}$ | $0.590 \times 10^{-2}$ | $-0.556 \times 10^{-1}$ | $0.125 \times 10^{-1}$ | $0.270 \times 10^{-2}$ |
| $1/V_{00}$ | $0.242 \times 10^{-1}$ | $0.242 \times 10^{-1}$ | $0.333 \times 10^{-1}$ | $0.222 \times 10^{-1}$ |
| $2/V_{00}$ | $0.484 \times 10^{-1}$ | $0.484 \times 10^{-1}$ | $0.666 \times 10^{-1}$ | $0.444 \times 10^{-1}$ |
| $\|(N_{00}-1)/r_{1G}\|$ | 0 | $0.428 \times 10^{-1}$ | 0 | 0 |
| $\|(N_{00}-1)/r_{2G}\|$ | 0 | $0.388 \times 10^{-1}$ | $0.186 \times 10^{-1}$ | 0 |
| $0.9 \times 1/f_G$ | $0.772 \times 10^{-1}$ | $0.660 \times 10^{-1}$ | $0.381 \times 10^{-1}$ | $0.437 \times 10^{-1}$ |
| $0.65 \times 1/f_G$ | $0.557 \times 10^{-1}$ | $0.476 \times 10^{-1}$ | $0.275 \times 10^{-1}$ | $0.437 \times 10^{-1}$ |
| $N_{10} \times IH^2$ | $-0.247 \times 10^{-2}$ | $-0.649 \times 10^{-3}$ | $-0.610 \times 10^{-1}$ | $-0.686 \times 10^{-2}$ |
| $\|N_{10} \times IH^2\|$ | $0.247 \times 10^{-2}$ | $0.649 \times 10^{-3}$ | $0.610 \times 10^{-1}$ | $0.686 \times 10^{-2}$ |
| $N_{10}$ | $-0.247 \times 10^{-2}$ | $-0.649 \times 10^{-3}$ | $-0.152 \times 10^{-1}$ | $-0.686 \times 10^{-2}$ |
| $IH/r1$ | 0 | $-0.0676$ | $0.532 \times 10^{-1}$ | $0.606 \times 10^{-1}$ |
| $IH/r2$ | 0 | $-0.0614$ | $0.186 \times 10^{-1}$ | 0 |
| $IH/r3$ | 0 | $0.0614$ | $-0.186 \times 10^{-1}$ | 0 |
| $IH/r4$ | 0 | $-0.0676$ | $-0.532 \times 10^{-1}$ | $-0.606 \times 10^{-1}$ |
| $HD/IH$ | 23.33 | 27.50 | 16.737 | 29.216 |
| $d_G/IH$ | 23.00 | 8.7 | 1.0 | 3.6 |
| $\phi m/\phi$ | 1.0 | 0.37 | 1.44 | 1.0 |
| $EP/IH$ | $\infty$ | $\infty$ | $\infty$ | $\infty$ |
| $OP/IH$ | $\infty$ | $\infty$ | $\infty$ | $\infty$ |
| $BD/IH$ | 3.5 | 4.9 | 5.5 | 5.0 |
| $N_{10} \times f_G^2$ | $-0.336$ | $-1.121$ | $-8.51$ | $-2.916$ |
| $d_G/f_G$ | 1.972 | 1.539 | $0.847 \times 10^{-1}$ | 0.175 |
| $\|N_{10} \times f_G^2\|$ | 0.336 | 0.121 | 8.51 | 2.916 |
| $N_{20}$ | $-0.315 \times 10^{-5}$ | $0.768 \times 10^{-6}$ | $0.122 \times 10^{-3}$ | $-0.10 \times 10^{-4}$ |

| | Embodiment 20 | Embodiment 21 | Embodiment 22 | Embodiment 23 |
|---|---|---|---|---|
| $1/V_{10}$ | $-0.36 \times 10^{-1}$ | $-0.103$ | $0.8 \times 10^{-2}$ | $0.4 \times 10^{-1}$ |
| $1/V_{00}$ | $0.24 \times 10^{-1}$ | $0.24 \times 10^{-1}$ | $0.22 \times 10^{-1}$ | $0.25 \times 10^{-1}$ |
| $2/V_{00}$ | $0.48 \times 10^{-1}$ | $0.48 \times 10^{-1}$ | $0.44 \times 10^{-1}$ | $0.5 \times 10^{-1}$ |
| $\|(N_{00}-1)/r_{1G}\|$ | $0.6 \times 10^{-3}$ | $0.24 \times 10^{-2}$ | $0.306 \times 10^{-1}$ | $0.287 \times 10^{-1}$ |
| $\|(N_{00}-1)/r_{2G}\|$ | $0.369 \times 10^{-1}$ | $0.245 \times 10^{-1}$ | 0 | $0.287 \times 10^{-1}$ |
| $0.9 \times 1/f_G$ | $0.558 \times 10^{-1}$ | $0.36 \times 10^{-1}$ | $0.747 \times 10^{-1}$ | $0.765 \times 10^{-1}$ |
| $0.65 \times 1/f_G$ | $0.403 \times 10^{-1}$ | $0.26 \times 10^{-1}$ | $0.540 \times 10^{-1}$ | $0.553 \times 10^{-1}$ |
| $N_{10} \times IH^2$ | $-0.180 \times 10^{-2}$ | $-0.880 \times 10^{-3}$ | $-0.143 \times 10^{-1}$ | $-0.302 \times 10^{-2}$ |
| $\|N_{10} \times IH^2\|$ | $0.180 \times 10^{-2}$ | $0.880 \times 10^{-3}$ | $0.143 \times 10^{-1}$ | $0.302 \times 10^{-2}$ |
| $N_{10}$ | $-0.180 \times 10^{-2}$ | $-0.880 \times 10^{-3}$ | $-0.143 \times 10^{-1}$ | $-0.302 \times 10^{-2}$ |
| $IH/r1$ | — | — | — | — |
| $IH/r2$ | — | — | — | — |
| $IH/r3$ | — | — | — | — |
| $IH/r4$ | — | — | — | — |
| $HD/IH$ | — | — | — | — |
| $d_G/IH$ | 7.92 | 7.99 | 4.0 | 5.6 |
| $\phi m/\phi$ | 0.459 | 0.351 | 1.38 | 0.398 |
| $EP/IH$ | $\infty$ | $\infty$ | $\infty$ | $\infty$ |
| $OP/IH$ | $\infty$ | $\infty$ | $\infty$ | $\infty$ |
| $BD/IH$ | 4.9 | 4.9 | 5.0 | 4.9 |
| $N_{10} \times f_G^2$ | $-0.467$ | $-0.550$ | $-2.07$ | $-0.418$ |

-continued

| | | | | |
|---|---|---|---|---|
| $d_G/f_G$ | 0.491 | 0.320 | 0.332 | 0.476 |
| $|N_{10} \times f_G^2|$ | 0.467 | 0.550 | 2.07 | 0.418 |
| $N_{20}$ | $-0.370 \times 10^{-5}$ | $0.260 \times 10^{-5}$ | $-0.892 \times 10^{-4}$ | $-0.570 \times 10^{-5}$ |

| | Embodiment 24 | Embodiment 25 | Embodiment 26 | Embodiment 27 |
|---|---|---|---|---|
| $1/V_{10}$ | $-0.11 \times 10^{-1}$ | $0.03 \times 10^{-2}$ | $0.3 \times 10^{-2}$ | $0.5 \times 10^{-2}$ |
| $1/V_{00}$ | $0.29 \times 10^{-1}$ | $0.28 \times 10^{-1}$ | $0.22 \times 10^{-1}$ | $0.2 \times 10^{-1}$ |
| $2/V_{00}$ | $0.57 \times 10^{-1}$ | $0.56 \times 10^{-1}$ | $0.44 \times 10^{-1}$ | $0.4 \times 10^{-1}$ |
| $|(N_{00}-1)/r_{1G}|$ | $0.174 \times 10^{-3}$ | 0 | 0 | 0 |
| $|(N_{00}-1)/r_{2G}|$ | $0.174 \times 10^{-1}$ | 0 | 0 | 0 |
| $0.9 \times 1/f_G$ | $0.774 \times 10^{-1}$ | $0.765 \times 10^{-1}$ | $0.432 \times 10^{-1}$ | $0.72 \times 10^{-1}$ |
| $0.65 \times 1/f_G$ | $0.559 \times 10^{-1}$ | $0.553 \times 10^{-1}$ | $0.312 \times 10^{-1}$ | $0.52 \times 10^{-1}$ |
| $N_{10} \times IH^2$ | $-0.253 \times 10^{-1}$ | $-0.116 \times 10^{-1}$ | $-0.387 \times 10^{-1}$ | $-0.411 \times 10^{-1}$ |
| $|N_{10} \times IH^2|$ | $0.253 \times 10^{-1}$ | $0.116 \times 10^{-1}$ | $0.387 \times 10^{-1}$ | $0.411 \times 10^{-1}$ |
| $N_{10}$ | $-0.253 \times 10^{-1}$ | $-0.116 \times 10^{-1}$ | $-0.494 \times 10^{-2}$ | $-0.103 \times 10^{-1}$ |
| IH/r1 | — | — | — | — |
| IH/r2 | — | — | — | — |
| IH/r3 | — | — | — | — |
| IH/r4 | — | — | — | — |
| HD/IH | — | — | — | — |
| $d_G/IH$ | 2.4 | 3.8 | 1.78 | 2.0 |
| $\phi m/\phi$ | 1.410 | 1.0 | 1.0 | 1.0 |
| EP/IH | ∞ | ∞ | ∞ | ∞ |
| OP/IH | ∞ | ∞ | ∞ | ∞ |
| BD/IH | 4.9 | 4.9 | 5.0 | 6.0 |
| $N_{10} \times f_G^2$ | $-3.427$ | $-1.609$ | $-2.145$ | $-1.606$ |
| $d_G/f_G$ | 0.206 | 0.323 | 0.239 | 0.32 |
| $|N_{10} \times f_G^2|$ | 3.42 | 1.609 | 2.145 | 1.606 |
| $N_{20}$ | $-0.274 \times 10^{-3}$ | $0.12 \times 10^{-4}$ | $-0.148 \times 10^{-5}$ | $-0.753 \times 10^{-5}$ |

| | Embodiment 28 | Embodiment 29 | Embodiment 30 |
|---|---|---|---|
| $1/V_{10}$ | $0.7 \times 10^{-2}$ | $0.7 \times 10^{-2}$ | $0.1 \times 10^{-2}$ |
| $1/V_{00}$ | $0.24 \times 10^{-1}$ | $0.22 \times 10^{-1}$ | $0.2 \times 10^{-1}$ |
| $2/V_{00}$ | $0.48 \times 10^{-1}$ | $0.44 \times 10^{-1}$ | $0.4 \times 10^{-1}$ |
| $|(N_{00}-1)/r_{1G}|$ | 0 | 0 | 0 |
| $|(N_{00}-1)/r_{2G}|$ | 0 | 0 | 0 |
| $0.9 \times 1/f_G$ | $0.513 \times 10^{-1}$ | $0.531 \times 10^{-1}$ | $0.567 \times 10^{-1}$ |
| $0.65 \times 1/f_G$ | $0.371 \times 10^{-1}$ | $0.384 \times 10^{-1}$ | $0.416 \times 10^{-1}$ |
| $N_{10} \times IH^2$ | $-0.227 \times 10^{-1}$ | $-0.466 \times 10^{-1}$ | $-0.139 \times 10^{-1}$ |
| $|N_{10} \times IH^2|$ | $0.227 \times 10^{-1}$ | $0.466 \times 10^{-1}$ | $0.139 \times 10^{-1}$ |
| $N_{10}$ | $-0.287 \times 10^{-2}$ | $-0.595 \times 10^{-2}$ | $-0.709 \times 10^{-2}$ |
| IH/r1 | — | — | — |
| IH/r2 | — | — | — |
| IH/r3 | — | — | — |
| IH/r4 | — | — | — |
| HD/IH | — | — | — |
| $d_G/IH$ | 3.54 | | 3.214 |
| $\phi m/\phi$ | 1.0 | | 1.0 |
| EP/IH | ∞ | ∞ | ∞ |
| OP/IH | ∞ | ∞ | ∞ |
| BD/IH | 5.0 | 5.0 | 7.0 |
| $N_{10} \times f_G^2$ | $-0.883$ | $-1.708$ | $-1.73$ |
| $d_G/f_G$ | 0.567 | 0.293 | 0.288 |
| $|N_{10} \times f_G^2|$ | 0.883 | 1.708 | 1.73 |
| $N_{20}$ | $0.582 \times 10^{-6}$ | $0.129 \times 10^{-5}$ | $-0.362 \times 10^{-5}$ |

Figure 13:
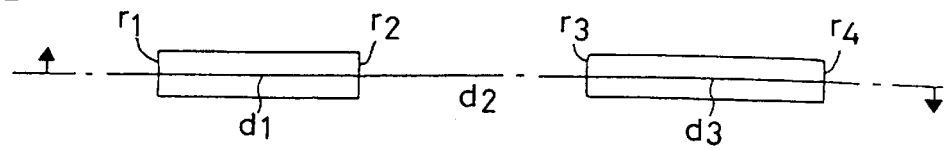
FIG. 13 shows a sectional view illustrating a composition of a first embodiment of the image transmission optical system according to the present invention.

The first embodiment of the present invention has a composition illustrated in a sectional view shown in FIG. 13. Speaking concretely, the first embodiment is composed, in order from the object side, of a first meniscus lens unit which has a positive refractive power and a concave surface on the object side, and a second biconvex lens unit which has a positive refractive power, or is configured as an image transmission optical system which has a numerical aperture of 0.06 and an image height of 1.0, comprises two lens elements, and is configured so as to have a length of 10.2 mm as measured from an end surface thereof to an image. Though it is ordinarily difficult to composed an optical system having favorably corrected aberrations, the image transmission optical system according to the present invention which is composed of the two lens elements has aberrations favorably corrected by using radial gradient-index lens elements.

Figure 14:
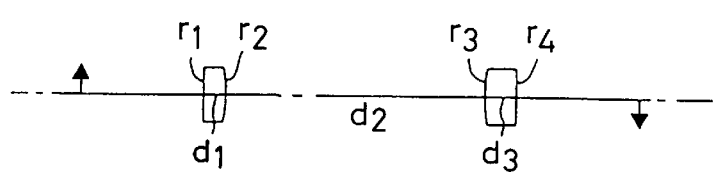
FIG. 14 shows a sectional view illustrating a composition of a second embodiment of the image transmission optical system according to the present invention.

The second embodiment of the present invention has a composition illustrated in a sectional view shown in FIG. 14. Speaking concretely, the second embodiment is an image transmission optical system which is composed, in order from the object side, of a first biconvex lens unit having a positive refractive power and a second biconvex lens unit having a positive refractive power, has a numerical aperture of 0.07 and a image height of 1.0, comprises two lens elements, and is configured so as to have a length of 9 mm as measured from an end surface thereof to an image. A radial gradient-index lens element is used in each of the lens units. The second embodiment which uses the radial gradient-index lens elements having thickness $d_G$ much smaller than that of the radial gradient-index lens elements adopted for the first embodiment provides an advantage from a view point of manufacturing cost of these lens elements. Further, the radial gradient-index lens elements have the small thickness $d_G$ in the second embodiment, these lens elements are configured so as to satisfy the condition (13) and have refractive powers of medium strong enough to favorably correct a Petzval's sum and longitudinal chromatic aberration.

Figure 15:
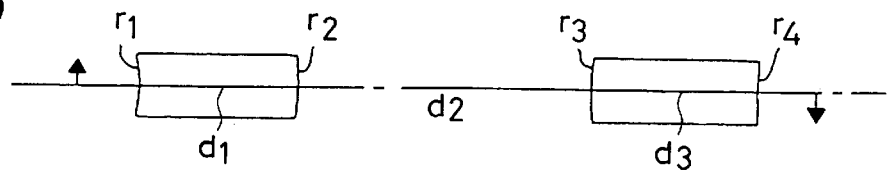
FIG. 15 shows a sectional view illustrating a composition of third, sixth, seventh, eighth, ninth, tenth, eleventh and twelfth embodiments of the image transmission optical system according to the present invention.

The third embodiment has a composition illustrated in a sectional view shown in FIG. 15. That is to say, the third embodiment is an image transmission optical system which is composed, in order from the object side, of a first meniscus lens unit which has a positive refractive power and a concave surface on the object side and a second meniscus lens unit which has a positive refractive power and a concave surface on the image side; has a numerical aperture of 0.08, an image height of 1.0 and a length of 4.5 mm as measured from an end surface thereof to an image surface; and comprises two lens elements. Owing to a radial gradient-index lens element used in each of the lens units, this embodiment is capable of correcting aberrations. Radial gradient-index lens elements having the same refractive index distribution and radii of curvature which are different from each other are used in the first lens unit and the second lens unit. That is to say, the two radial gradient-index lens elements used in the third embodiment can be obtained by forming these lens elements from a single glass rod and imparting different radii of curvature to these lens elements. Accordingly, the third embodiment eliminates a necessity to impart two types of refractive index distributions, thereby providing an advantage from a viewpoint of manufacturing costs of these lens elements.

Figure 16:
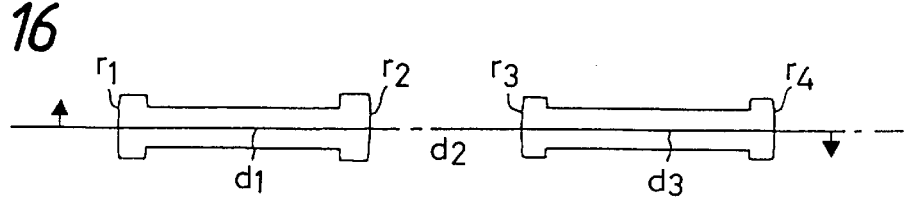
FIG. 16 shows a sectional view illustrating a composition of fourth, fifth, thirteenth and fifteenth embodiment of the image transmission optical system according to the present invention.
Figure 17:
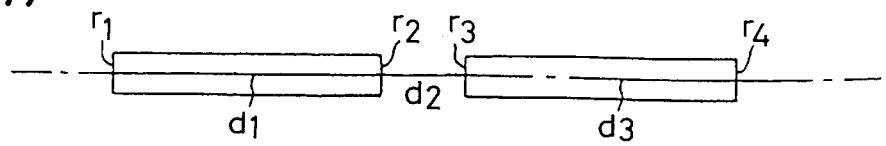
FIG. 17 shows a sectional view illustrating a composition of a fourteenth embodiment of the image transmission optical system according to the present invention.

The fourth embodiment has a composition having a sectional composition illustrated in FIG. 16. Speaking concretely, the fourth embodiment is an image transmission optical system which is composed, in order from the object side, of a first biconvex lens unit having a positive refractive power and a second biconvex lens unit having a positive refractive power; has a numerical aperture of 0.072, an image height of 1.0 and a length of 4.9 mm as measured from an end surface thereof to an image surface; and comprises two lens elements. The fourth embodiment is capable of exhibiting its effects for correcting aberrations owing to a radial gradient-index lens element used in each of the lens units. In the fourth embodiment, radial gradient-index lens elements are disposed in the first lens unit and the second lens unit which have substantially the same and are disposed symmetrically. That is to says the first lens unit and the second lens unit used in the fourth embodiment can be obtained by fabricating two lens elements from a single glass rod to which a refractive index distribution has been imparted, polishing surfaces of these lens elements so as to have radii of curvatures which are nearly equal to each other, polishing the other surfaces of the lens elements so as to have radii of curvature which are nearly equal to each other and disposing the lens elements symmetrically. Accordingly, the fourth embodiments provides an advantage from a viewpoint of manufacturing cost of the lens elements since it eliminates the necessity to impart two types of refractive index distributions and makes a single polishing process sufficient for the two lens elements. Further, the fourth embodiment has another merit that allows little lateral chromatic aberration, distortion and coma to be produced by the lens elements which have the same radius of curvature and refractive index distribution, and are disposed symmetrically.

Though a biconvex lens element produces negative spherical aberration 1, this aberration can be corrected by a refractive index distribution of a radial gradient-index lens element which lowers a refractive index in a direction from an optical axis toward a marginal portion. A value of $N_{10}$, which largely influences a difference between a refractive index of a lens portion located on the optical axis and a refractive index of the marginal portion is determined nearly dependently on requirements for correcting a Petzval's sum and longitudinal chromatic aberration. In the fourth embodiment, slightly overcorrected negative spherical aberration is corrected by controlling a value of spherical aberration produced by a medium. In other words, spherical aberration is corrected favorably in the optical system as a whole by selecting a negative value for refractive index distribution coefficient of high order N20 so that the medium produces negative spherical aberration, thereby correcting the spherical aberration produced by the surface which is slightly overcorrected in the positive direction.

The fourth embodiment has high optical performance though it is composed only of the two lens elements.

Further, the fourth embodiment selects a shape illustrated in FIG. 16 for the radial gradient-index lens elements so that they are not fragile. This shape is similar to that described with reference to FIG. 10. An effect which is similar to that available with the shape shown in FIG. 10 can be obtained by selecting not only the shape shown in FIG. 16 but also a shape shown in FIG. 11A wherein a radial gradient-index lens element is thinned in the vicinities of both ends thereof. A radial gradient-index lens element illustrated in FIG. 11A also has an outside diameter in the vicinity of a center thereof which is different from an outside diameter in the vicinities of air-contact surfaces 27 and cannot be broken by stress applied to a point 25.

Figure 11A:
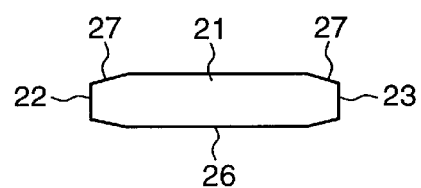
FIG. 11A and FIG. 11B show sectional views descriptive of another means for preventing breakage of the image transmission optical system according to the present invention.
Figure 11B:
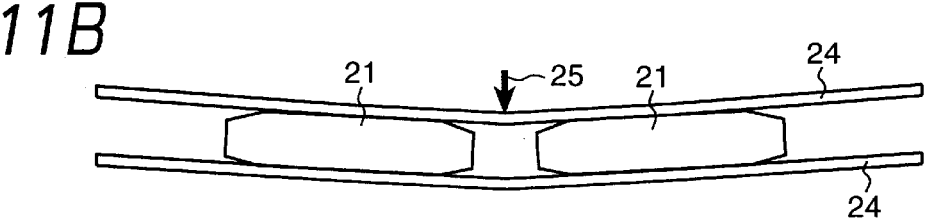
Figure 12A:
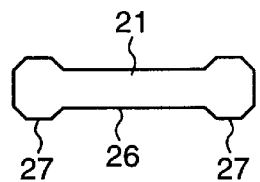
FIG. 12A and FIG. 12B show sectional views illustrating still another means for preventing breakage of the image transmission optical system according to the present invention.
Figure 12B:
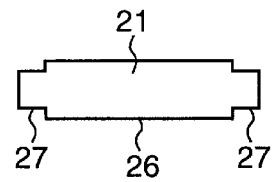

Not only the shapes illustrated in FIG. 10A and FIG. 11A, but also the shape shown in FIG. 12A and FIG. 12B can provide an effect which is similar to that available with the shape shown in FIG. 10. It is needless to say that it is desirable for preventing the radial gradient-index lens elements from breaking to select in any case one of the shapes exemplified in FIG. 10A, FIG. 11A, FIG. 12A and FIG. 12B.

The fifth embodiment of the present invention has a composition which is similar to that illustrated in FIG. 16. Speaking concretely, preferred as the fifth embodiment is an image transmission optical system which is composed, in order from the object side, of a first biconvex lens unit which has a positive refractive power and a second biconvex lens unit which has a positive refractive power; has a numerical aperture of 0.07 and an image height of 1.0 and a distance of 4.9 mm as measured from an end surface thereof to an image; and comprises two lens elements. Owing to radial gradient-index lens elements used in the first lens unit and the second lens unit, the fifth embodiment is capable of obtaining effects for correcting aberrations. Like the fourth embodiment, the fifth embodiment provides advantages from viewpoints of a manufacturing cost and correction of lateral chromatic aberration, distortion and coma by selecting a composition wherein the two radial gradient-index fens elements having the same refractive index distribution and the same radius of curvature are disposed symmetrically. The fifth embodiment also has high optical performance though it is composed only of the two lens elements.

The sixth embodiment has a composition similar to that illustrated in FIG. 15. That is to say, the sixth embodiment is an image transmission optical system which; is composed, in order from the object side, a first meniscus lens unit which has a positive refractive power and a concave surface on the object side and a second meniscus lens unit which has a positive refractive power and a concave surface on the image side; has a numerical aperture of 0.1, an image height of 2.0 and a distance of 4.9 mm as measured from an end surface thereof to an image; and comprises two radial gradient-index lens elements. The sixth embodiment is capable of correcting aberrations by using radial gradient-index lens elements in both the lens units. Like the fourth embodiment, the sixth embodiment provides advantages from the viewpoints of a manufacturing cost and correction of lateral chromatic aberration, distortion and coma by selecting a composition wherein the two radial gradient-index lens elements having the same refractive index distribution and the same radii of curvature are disposed symmetrically. Though it is rather tedious to correct spherical aberration and astigmatism in the sixth embodiment which has the numerical aperture of 0.1 and the image height of 2.0 higher than those of the fourth embodiment or the fifth embodiment, aberrations are corrected favorably by symmetrically disposing the radial gradient-index lens elements having the same shape and utilizing the refractive index distribution coefficients of high orders. The sixth embodiment also has high optical performance though it is composed only of the two lens elements.

The seventh embodiment has a composition which is similar to that illustrated in FIG. 15. The seventh embodiment is an image transmission optical system which is composed, in order from the object side, of a first meniscus lens unit which has a positive refractive power and a concave surface on the object side and a second meniscus lens unit which has a positive refractive power and a concave surface on the image side; has a numerical aperture of 0.142 and an image height of 1.0; and comprises two lens elements. Radial gradient-index leas elements disposed in both of the lens units allows the seventh units allows the seventh embodiment to have effects for correcting abberrations. Like the fourth embodiment, the seventh embodiment has advantages for reducing a manufacturing cost and correcting lateral chromatic aberration, distortion and coma owing to the composition thereof wherein the two radial gradient-index lens elements have the same refractive index distribution and the same radii of curvature. Though the seventh embodiment has the numerical aperture of 0.142 which is higher than that of the sixth embodiment, the seventh embodiment has high optical performance since it favorably corrects spherical aberration by utilizing the refractive index distribution coefficients of high orders of the radial gradient-index lens elements. The seventh embodiment which has the high numerical aperture avows negative spherical aberration to be produced in the optical system as a whole, it is capable of correcting this aberration by selecting a positive value for the refractive index distribution coefficient of the fourth order $N_{20}$ so that positive spherical aberration is produced by a medium. It will be understood that the seventh embodiment also features high optical performance though it is composed only of the two lens elements.

Preferred as the eighth embodiment of the present invention is an image transmission optical system which has a composition similar to that illustrated in FIG. 15; is composed, in order from the object side, of a first meniscus lens unit which has a positive refractive power and a concave surface on the object side, and a second meniscus lens unit which has a positive refractive power and a concave surface on the image side; has a numerical aperture of 0.072, an image height of 1.0 and a length of 5 mm as measured from an end surface thereof to an image; and comprises two lens elements. Radial gradient-index lens elements are used in both the lens units so that the eighth embodiment exhibits the effect for correcting aberrations. Like the fourth embodiment, the eighth embodiment provides an advantage for reducing a manufacturing cost as well as those for correcting lateral chromatic aberration, distortion and coma by adopting a composition wherein the radial gradient-index lens elements having the same refractive index distribution and the same radii of curvature are disposed symmetrically. The radial gradient-index lens elements used in the eighth embodiment have an Abbe's number of 40 on the optical axis which provides relatively high dispersing power, but are configured so as to satisfy the condition (14), thereby permitting favorable correction of longitudinal chromatic aberration. The eighth embodiment also features high optical performance in spite of the fact that it consists only of the two lens elements.

Preferred as the ninth embodiment of the present invention is an image transmission optical system which has a composition similar to that illustrated in FIG. 15; is composed, in order from the object side, of a first meniscus lens unit which has a positive refractive power and a concave surface on the object side, and a second meniscus lens unit which has a positive refractive power and a concave surface on the image side; has a numerical aperture of 0.1, an image height of 1.0 and a length of 5 mm as measured from an end surface thereof to an image; and comprises two lens elements. Radial gradient-index lens elements used in both the lens units allows the ninth embodiment to have the effects for correcting aberrations. Like the fourth embodiment, the ninth embodiment has an advantage for lowering manufacturing cost as well as for correcting lateral chromatic aberration, distortion and coma by selecting a composition wherein the two radial gradient-index lens elements having the same refractive index distribution and the same radii of curvature are disposed symmetrically. The ninth embodiment in which chromatic aberration is favorably corrected at four wavelengths of the d-line, C-line, F-line and g-line features high optical performance though it is composed only of the two lens elements. The tenth embodiment has a composition which is the substantially the same as that illustrated in FIG. 15. The tenth embodiment is an image transmission optical system which is composed of a first meniscus lens unit which has a positive refractive power and a concave surface on the object side, and a second meniscus lens unit which has a positive refractive power and a concave surface on the image side; has a numerical aperture of 0.14, an image height of 1.0 and a length of 7 mm as measured from an end surface thereof to an image; and uses two lens elements. Used in both the lens units are radial gradient-index lens elements for allowing the tenth embodiment to exhibit its effect for correcting aberrations, similar to the fourth embodiment, the tenth embodiment provides an advantage for reduction of manufacturing cost as well as for correcting lateral chromatic aberration, distortion and coma by selecting a composition wherein the two radial gradient-index lens elements having the same refractive index distribution and the same radii of curvature are arranged symmetrically. Though the tenth embodiment consists only of the two lens elements, it has high optical performance.

The eleventh embodiment has a composition which is the substantially same as that shown in FIG. 15. The eleventh embodiment is an image transmission optical system which is composed, in order from the object side, of a first meniscus lens unit which has a positive refractive power and a concave surface on the object side, a second meniscus lens unit which has a positive refractive power and a concave surface on the image side; has a numerical aperture 0.1, an image height of 1.0 and a length of 6 mm as measured from an end surface thereof to an image; and uses two lens elements. The tenth embodiment exhibits the effect for correcting aberrations owing to radial gradient-index lens element used in both the lens units. Similarly to the fourth embodiment, the tenth embodiment provides an advantage for reducing manufacturing cost as well as those for correcting lateral chromatic aberration, distortion and coma since it adopts a composition wherein the two radial gradient-index lens elements having the same refractive index distribution and the same radii of curvature are arranged symmetrically. The eleventh embodiment wherein the radial gradient-index lens elements have an Abbe's number of 55 on the optical axis for providing a relatively weak dispersing power has a composition advantageous for correction of chromatic aberration. The eleventh embodiment also features high optical performance though it is composed only of the two lens elements.

An image transmission optical system preferred as the twelfth embodiment of the present invention has a composition which is substantially the same as that illustrated in FIG. 15. This optical system is composed, in order from the object side, of a first meniscus lens unit which has a positive refractive power and a concave surface on the object side, and a second meniscus lens unit which has a positive refractive power and a concave surface on the image side; has a numerical aperture of 0.1, an image height of 1.0 and a length of 5 mm as measured from an end surface thereof to an image; and uses two lens elements. The twelfth embodiment is capable of exhibiting the effect for correcting aberrations owing to radial gradient-index lens element disposed in both the lens units. Similarly to the fourth embodiment, the twelfth embodiment has an advantage for reducing a manufacturing cost as wall as other advantages for correcting lateral chromatic aberration, distortion and coma since it selects a composition wherein the two radial gradient-index lens elements having the same refractive index distribution and the same radii of curvature are disposed symmetrically. The twelfth embodiment has high optical performance though it consists only of the two lens elements.

Preferred as the thirteenth embodiment is an image transmission optical system which has a composition which is substantially the same as that illustrated in FIG. 16; is composed of a first biconvex lens unit having a positive refractive power and a second biconvex lens unit having a positive refractive power; has a numerical aperture of 0.1, an image height of 1.0 and a length of 2 mm as measured from an end surface thereof to an image; and comprises two lens elements. Since radial gradient-index lens elements are used in both the lens units, the thirteenth embodiment is capable of exhibiting the correcting effects which is the substantially the same as those of the first embodiment. Like the fourth embodiment, the thirteenth embodiment provides an advantage for lowering manufacturing cost as well as advantages for correcting lateral chromatic aberration, distortion and coma by adopting a composition wherein the radial gradient-index lens elements having the same refractive index distribution and the same radii of curvature are disposed symmetrically. The thirteenth embodiment is an example which allows a manufacturing cost to be lowered by selecting a smaller value for refractive index distribution coefficient of the second order $N_{10}$ and shortening a time required for imparting a refractive index distribution. Though it is generally difficult to strengthen a refractive power of medium when a time for imparting a refractive index distribution is shortened and a small value is selected for $N_{10}$, this problem is solved by configuring the radial gradient-index lens elements so as to satisfy the condition (12). Speaking concretely, a refractive power of medium to be given by the formula (c) is strengthened by thickening the radial gradient-index lens elements, thereby making it possible to favorably correct a Petzval's sum and longitudinal chromatic aberration in the thirteenth embodiment. The thirteenth embodiment features high optical performance though it is composed only of the two lens elements. The fourteenth embodiment has a composition illustrated in FIG. 17. Speaking concretely, the fourteenth embodiment is an image transmission optical system which is composed, in order from the object side, of a first lens unit which has a positive refractive power and planar surfaces in nearly parallel with each other, and a second lens unit which has a positive refractive power and planar surfaces in parallel with each other, has a numerical aperture of 0.07, an image height of 1.0 and a length of 3.5 mm as measured from an end surface thereof to an image; and comprises two lens elements. Two radial gradient-index lens elements used in both the lens units allows the fourteenth embodiment to exhibit the effects for correcting aberrations. The fourteenth embodiment, in which the lens elements having surfaces nearly in parallel with one another and the substantially the same refractive index distribution are disposed symmetrically, provides an advantage for lowering manufacturing cost and has merits of correcting lateral chromatic aberration, distortion and coma. The fourteenth embodiment has high optical performance in spite of the fact that it is composed only of the two lens elements.

The fifteenth embodiment is an image transmission optical system which has a composition which is substantially the same as that illustrated in FIG. 16; is composed of a first biconvex lens unit having a positive refractive power and a second biconvex lens unit having a positive refractive power; has a numerical aperture of 0.07, an image height of 1.0 and a length of 4.9 mm as measured from an end surface thereof to an image; and uses two lens elements. Radio gradient-index lens elements disposed in both the lens units allow the fifteenth embodiment to exhibit the effects for correcting aberrations. Though the fifteenth embodiment is composed only of the two lens elements, it features high optical performance.

The sixteenth embodiment has a composition which is illustrated in FIG. 18A and FIG. 18B in a condition where the optical system is divided, at a center of an optical axis, into two portions. The sixteenth embodiment is composed of three sets of the image transmission optical systems preferred as the fourth embodiment of the present invention for transmitting an image three cycles. The image transmission optical system can be disposed in a plurality as exemplified by the sixteenth embodiment wherein three sets of the image transmission optical system are disposed serially. The high performance of the image transmission optical system according to the present invention is maintained even when a plurality thereof is disposed as in the case of the sixteenth embodiment.

Figure 19:
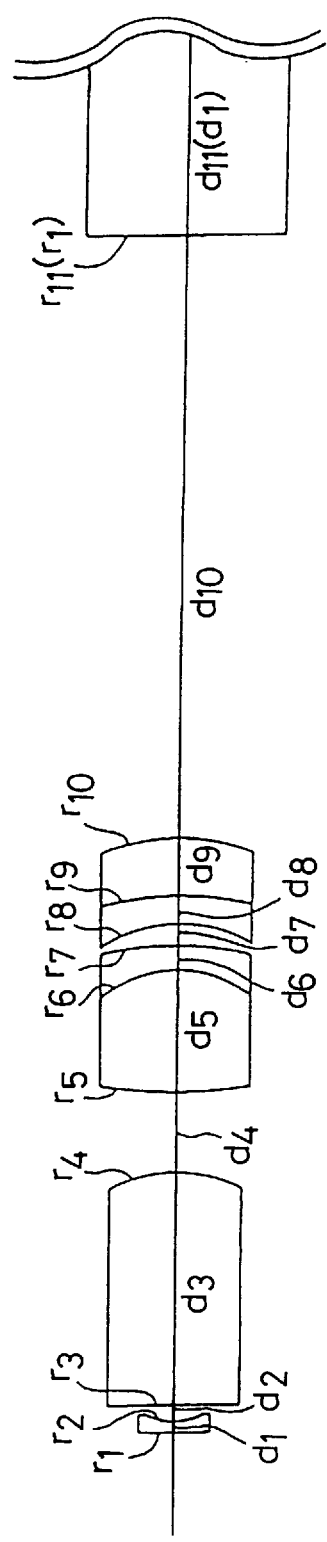
FIG. 19 shows a sectional view illustrating a composition of a seventeenth embodiment of the image transmission optical system according to the present invention.

The seventeenth embodiment is an example in which the image transmission optical system preferred as the sixteenth embodiment is combined with an objective lens system illustrated in FIG. 19. When the image transmission optical system according to the present invention is combined with an objective lens system, it is usable in an non-flexible endoscope or the like optical instrument. The image transmission optical system according to the present invention is capable of exhibiting its high optical performance even when it is combined with an objective lens system.

The seventeenth embodiment is an example wherein the image transmission optical system according to the present invention is used in a non-flexible endoscope which requires a relay lens systems each having a long distance as measured from an object to an image. Therefore, it is desirable to configure the image transmission optical system according to the present invention so as to satisfy this requirement. The image transmission optical system preferred as the second embodiment, for example, correct aberrations favorably, but has small thickness and is hardly usable in a non-flexible endoscope. When the image transmission optical system according to the present invention is to be used in a non-flexible endoscope, it is desirable to configure the optical system so as to satisfy the following condition (37):

$$6 < d_G/IH < 30 \tag{37}$$

If the lower limit of 6 of the condition (37) is exceeded, a radial gradient-index lens element will have thickness too short for use in a non-flexible endoscope. If the upper limit of 30 of the condition (37) is exceeded, in contrast, the radial gradient-index lens element is fragile and undesirable for use in a non-flexible endoscope.

When the image transmission optical system is to be used in a non-flexible endoscope, it is required to configure the optical system so as to have a total length which is prolonged to a certain degree. Since a refractive power of medium must have an adequate value to satisfy this requirement, it is desirable to satisfy the following condition (38):

$$0.4 \times 10^{-3} < |N_{10} \times IH^2| < 0.12 \times 10^{-1} \tag{38}$$

The image transmission optical system according to the present invention which is configured so as to satisfy the condition (38) is usable in a non-flexible endoscope. If the condition (38) is not satisfied the refractive power will be too strong to configure a radial gradient-index lens element so as to have sufficient thickness, thereby making it not easy to use the image transmission optical system according to the present invention in a non-flexible endoscope.

When the optical system according to the present invention is to be used in a plurality of sets to compose an image transmission optical system which is to be used in a non-flexible endoscope, as in the case of the seventeenth embodiment, it is desirable for obtaining high optical performance of the image transmission optical system that aberrations are favorably corrected in each of the optical system composing the image transmission optical system. In such a case, it is undesirable for obtaining the image transmission optical system having high optical performance to compose each set of optical systems, of a first lens unit consisting of a radial gradient-index lens element having planar surfaces and a second lens unit consisting of a radial gradient-index lens element having planar surfaces as exemplified by the fourteenth embodiment. An optical system which is composed only of two radial gradient-index lens elements having planar surfaces has narrow freedom for correction of aberrations and can hardly compose am image transmission optical system having high optical performance. However, the radial gradient-index lens element having the planar surfaces is advantageous for reducing a cost required for polishing lens elements. Therefore, optical systems having such a composition as that of the fourteenth embodiment are usable for composing an image transmission optical system which is to be used in a non-flexible endoscope when a manufacturing cost has higher priority than optical performance.

Figure 20:
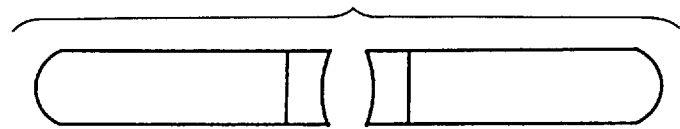
FIG. 20 through FIG. 26 show sectional views illustrating compositions of eighteenth through twenty-fourth embodiments respectively of the image transmission optical system according to the present invention.

The eighteenth embodiment has a composition illustrated in the sectional view shown in FIG. 20. Speaking concretely, the eighteenth embodiment is an image transmission optical system which is composed, in order from the object side, of a first lens unit which has a positive refractive power, and is composed of a cemented lens component consisting, in order from the object side, of a convexo-planar homogeneous lens element and a piano-concave radial gradient-index lens element, and a second lens unit which has a positive refractive power, and is composed, in order from the object side, of a concavo-planar radial gradient-index lens element and a plano-convex homogeneous lens element; has a numerical aperture of 0.15, as image height of 2.0 and a length of 5.5 mm as measured from an end surface thereof to an image. As compared with the optical system which is composed of the two radial gradient-index lens elements and preferred as the sixth embodiment, for example, the eighteenth embodiment which adopts the lens units configured as the cemented lens components reduces volumes of the radial gradient-index lens elements used in the optical system as a whole, thereby permitting reduction of manufacturing cost of the optical system. In the eighteenth embodiment, the first lens unit and the second lens unit are disposed nearly symmetrically on the optical axis, thereby allowing the optical system to favorably correct lateral chromatic aberration, distortion and coma in particular. The eighteenth embodiment has high optical performance.

Figure 21:
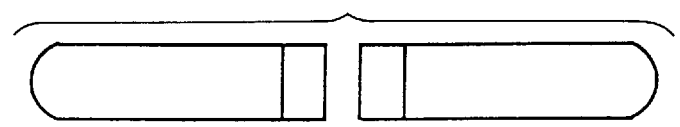

The nineteenth embodiment has a composition illustrated in a sectional view shown in FIG. 21. Speaking concretely, the nineteenth embodiment is an image transmission optical system which is composed, in order from the object side, of a first lens unit which has a positive refractive power and is composed of a cemented lens component consisting, in order from the object side, of a convexo-planar homogeneous lens element and a planar radial gradient-index lens element, and a second lens unit which has a positive refractive power and is composed, in order from the object side, of a planar radial gradient-index lens element and a plano-convex homogeneous lens element; and has a numerical aperture of 1.08, an image height of 1.0 and a length of 5 mm as measured from an end surface thereof to an image. Like the eighteenth embodiment described above, the nineteenth embodiment is an example which permits reduction of manufacturing cost By composing the lenses units of cemented lens consisting of the homogeneous lens elements and the radial gradient-index lens elements. Further, the nineteenth embodiment adopts the radial gradient-index lens elements each of which has planar surfaces on both sides thereof for reducing a cost required for polishing, thereby further lowering a manufacturing cost of the optical system. The first lens unit and the second lens unit are disposed nearly symmetrically on the optical axis, thereby allowing the optical system to favorably correct lateral chromatic aberration, distortion and coma in particular.

Figure 22:
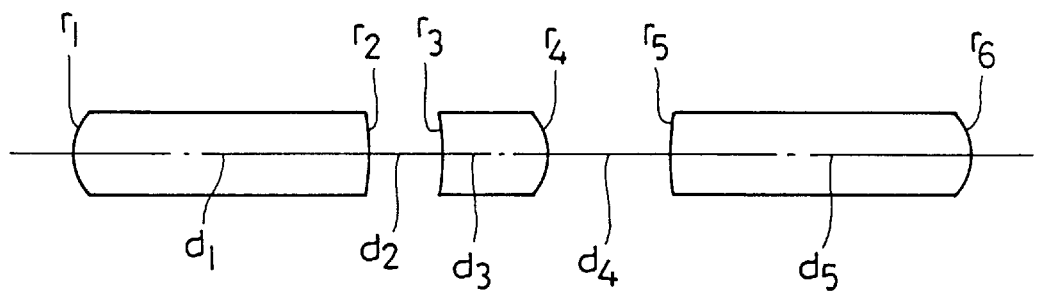

The twentieth embodiment has a composition illustrated in FIG. 22.

The twentieth embodiment is an image transmission optical system comprising an optical system for a single relay cycle which is composed, in order from the object side, of a first biconvex lens unit having a positive refractive power, a second meniscus lens unit having a positive refractive power and a third biconvex lens unit having a positive refractive power: the second lens unit being composed of a radial gradient-index lens element. The image transmission optical system has a numerical aperture of 0.072, an image height of 1.0 mm and a length of 4.9 mm as measured from an end surface thereof to an image.

An ordinary optical system which has a composition such as that illustrated in FIG. 22 but adopts a homogeneous lens element as the second lens unit is incapable of favorably correcting longitudinal chromatic aberration.

The twentieth embodiment which uses the radial gradient-index lens element as the second lens unit favorably corrects longitudinal chromatic aberration.

The twentieth embodiment has high optical performance though it is composed only of the three lens elements.

Figure 23:
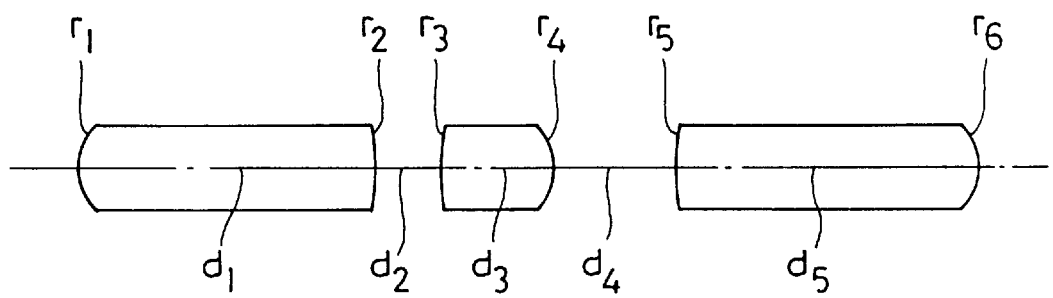

The twenty-first embodiment has a composition illustrated in FIG. 23. The twenty-first embodiment is an image transmission optical system comprising an optical system for a single relay cycle which is composed, in order from the object side, of a first biconvex lens unit having a positive refractive power, a second biconvex lens unit having a positive refractive power and a third biconvex lens unit having a positive refractive power: the second lens unit being composed of a radial gradient-index lens element. The image transmission optical system has a numerical aperture of 0.072, an image height of 1.0 mm and a length of 4.9 mm as measured from an end surface thereof to an image.

Though the image transmission optical system is apt to allow negative spherical aberration to be produced in the optical system as a whole, the twenty-first embodiment corrects negative spherical aberration by using a radial gradient-index lens element which is configured so as to satisfy the following condition (39):

$$N_{20}>0 \tag{39}$$

When refractive index distribution coefficient of the fourth order which has a positive value is imparted to a radial gradient-index lens element, its medium produces positive spherical aberration, whereby the radial gradient-index lens element is capable of correcting spherical aberration in an optical system as a whole. If the condition (39) is not satisfied, a medium of the radial gradient-index lens element produces negative spherical aberration, thereby making it difficult to correct spherical aberration favorably in an optical system as a whole.

The twenty-first embodiment is characterized in that it corrects spherical aberration by using a radial gradient-index lens element configured So as to satisfy the condition (39) and this correcting means is applicable to other embodiments each of which is composed of three lens elements.

The twenty-first embodiment has high optical performance in spite of the fact that it is composed only of three lens elements.

Figure 24:
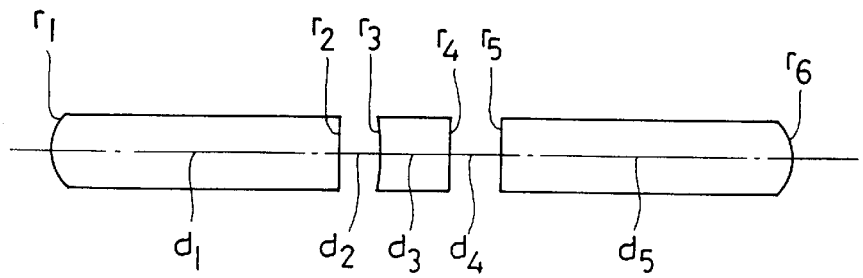

The twenty-second embodiment has a composition shown in FIG. 24. Preferred as the twenty-second embodiment is an image transmission optical system comprising a relay lens system for a single relay cycle which is composed, in order from the object side, of a first convexo-planar lens unit having a positive refractive power, a second concavo-planar lens unit having a positive refractive power and a third piano-convex lens unit having a positive refractive power; the second lens unit being composed of a radial gradient-index lens element. This optical system has a numerical aperture of 0.073, an image height of 1.0 mm and a length of 5 mm as measured from an end surface thereof to an image. The twenty-second embodiment is an example which reduces cost required for polishing lens elements and uses three planar surfaces out of the six surfaces disposed in the relay lens system for a single relay cycle.

Though the twenty-second embodiment is composed only of the three lens elements and uses a large number of planar surfaces, it has high optical performance.

Figure 25:
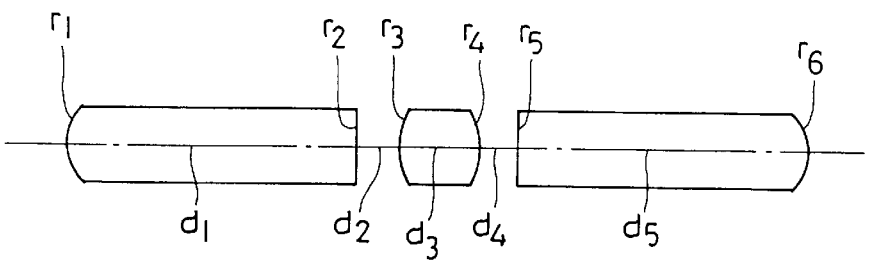

The twenty-third embodiment has a composition illustrated in FIG. 25. The twenty-third embodiment comprises a relay lens system for a single relay cycle which is composed, in order from the object side, of a first convexo-planar lens unit, a second biconvex lens unit and a third piano-convex lens unit: the second lens unit being composed of a radial gradient-index lens element. The twenty-third embodiment is an image transmission optical system which has a numerical aperture of 0.073, an image height of 1.0 mm and a length of 4.9 mm as measured from an end surface thereof to an image. The twenty-third embodiment is advantageous for correction of distortion, coma and lateral chromatic aberration owing to the composition thereof in which are object side lens element and the image side lens element are disposed symmetrically with regard to the radial gradient-index lens element used as the second lens unit.

The twenty-third embodiment has favorable optical performance though is it composed only of the three lens elements.

Figure 26:
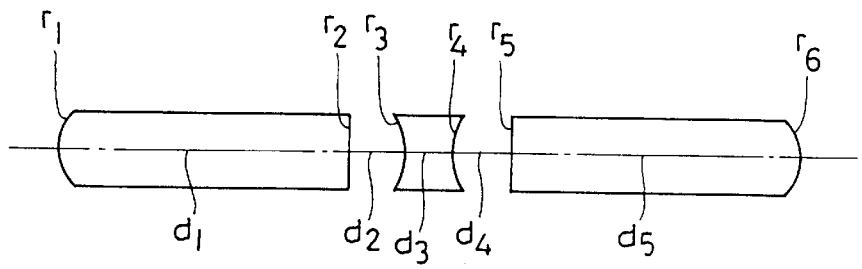

The twenty-fourth embodiment is composed as illustrated in FIG. 26. This embodiment comprises a relay lens system for a single relay cycle which is composed, in order from the object side, of a first convexo-planar lens unit, a second biconcave lens unit and a third piano-convex lens unit: the second lens unit being composed of a radial gradient-index lens element. The twenty-fourth embodiment is an image transmission optical system which has a numerical aperture of 0.073, an image height of 1.0 mm and a length of 4.9 mm as measured from an end surface thereof to an image. Like the twenty-third embodiment, the twenty-fourth embodiment is advantageous for correcting of distortion, coma and lateral chromatic aberration since it has the composition wherein the object side lens element and the image side lens element are disposed symmetrically with regard to the radial gradient-index lens element.

The twenty-fourth embodiment features high optical performance though it consists only of the three lens elements.

Figure 27:
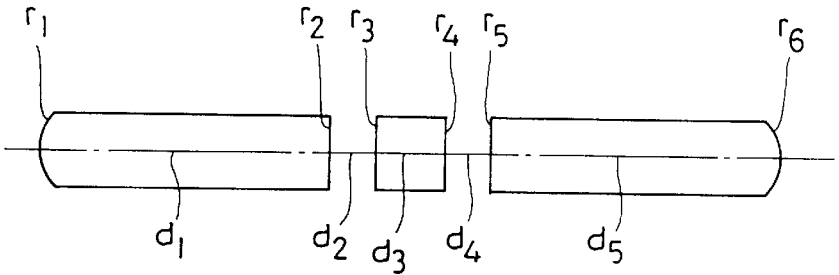
FIG. 27 shows a sectional view illustrating a composition of twenty-fifth, twenty-sixth, twenty-seventh, twenty-eighth and thirtieth embodiments of the image transmission optical system according to the present invention.

The twenty-fifth embodiment has a composition shown in FIG. 27 wherein a relay lens system for a single relay cycle is composed, in order from the object side, of a first convexo-planar lens unit having a positive refractive power, a second planar lens unit having a positive refractive power and a third piano-convex lens unit hating a positive refractive power: the second lens unit being composed of a radial gradient-index lens element. The twenty-fifth embodiment is an image transmission optical system having a numerical aperture of 0.073, an image height of 1.0 mm and a length of 4.9 mm as measured from an end surface thereof to an image. The twenty-fifth embodiment is also an example which reduces manufacturing cost of the optical system by using a large number of planar surfaces, or four planar surfaces out of the six surfaces disposed in the relay lens system for a single relay cycle. Further, the first lens unit and the third lens unit have the same shape and are disposed symmetrically with regard to the second lens unit (radial gradient-index lens element) so as to obtain advantages for correcting longitudinal chromatic aberration and spherical aberration.

The twenty-fifth embodiment has high optical performance though it is composed only of the three lens elements and uses a lard number of planar surfaces.

The twenty-sixth embodiment has a composition similar to that illustrated in FIG. 27, wherein a relay lens system for a single relay cycle is composed, in order from the object side, of a first biconvex lens unit having a positive refractive power, a second planar lens unit having a positive refractive power and a third biconvex lens unit having a positive refractive power: the second lens unit being composed of a radial gradient-index lens element. The twenty-sixth embodiment is an image transmission optical system which is composed of three lens elements, and has a numerical aperture of 0.13, an image height of 2.8 and a length of 5 mm as measured from an end surface thereof an image The twenty-sixth embodiment is an example wherein a numerical aperture is enlarged to 0.13 and spherical aberration which is aggravated in particular at such a large numerical aperture is corrected by using a radial gradient-index lens element.

The twenty-sixth embodiment features high optical performance though it has such a large numerical aperture and is composed only of the three lens elements.

The twenty-seventh embodiment has a composition similar to that illustrated in FIG. 27. The twenty-seventh embodiment is an image transmission optical system comprising a relay lens system for a single relay cycle which is composed, in order from the object side, of a first meniscus lens unit which has a convex surface on the object side and a positive refractive power, a second planar lens unit which has a positive refractive power, and a third meniscus lens unit which has a convex surface on the image side and has a positive refractive power: the second lens unit being composed of a radial gradient-index lens element. This optical system has a numerical aperture of 0.15, an image height of 3 mm and a length of 6 mm as measured from an end surface thereof to an image. The twenty-seventh embodiment has the numerical aperture of 0.15 which is larger than that of the twenty-sixth embodiment. Like the twenty-sixth embodiment, the twenty-seventh exigent uses the radial gradient-index lens element for correcting spherical aberration more favorably to obtain a brighter optical system. In spite of the fact that the twenty-seventh embodiment is composed only of the three lens elements and has the large numerical aperture of 0.15, it has high optical performance.

The twenty-eighth embodiment has a composition similar to that shown in FIG. 27, wherein a relay lens system for a single relay cycle is composed, in order from the object side, of a first convexo-planar lens unit having a positive refractive power, a second planar lens unit having a positive refractive power and a third piano-convex lens unit having a positive refractive power: the second lens unit being composed of a radial gradient-index lens element. The twenty-eighth embodiment is an image transmission optical system which has a numerical aperture of 0.129, an image height of 2.81 mm and a length of 5 mm as measured from an end surface thereof to an image. Spherical aberration is favorably corrected in the twenty-eighth embodiment which has a numerical aperture as large as 0.129 and uses four planar surfaces out of six surfaces disposed therein.

The twenty-eighth embodiment features high optical performance though it has the large numerical aperture of 0.129 and is composed only of the three lens elements.

Figure 28:
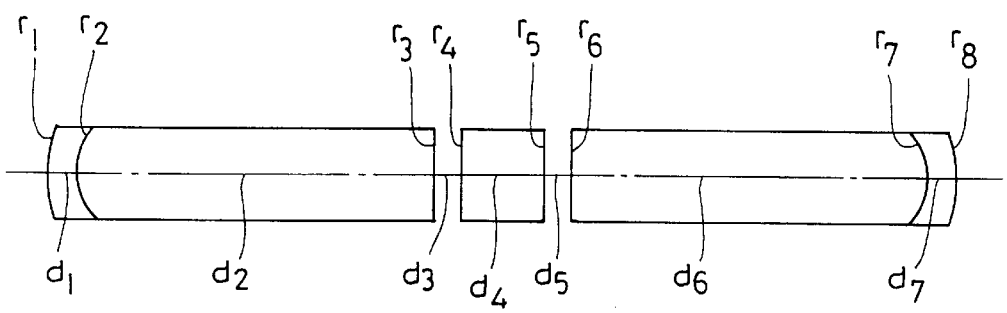
FIG. 28 shows a sectional view illustrating a composition of a nineteenth embodiment of the image transmission optical system according to the present invention.

The twenty-ninth embodiment has a composition illustrated in FIG. 28, wherein a relay lens system for a single relay cycle is composed, in order from the object side, of a first lens unit which has a positive refractive power and is composed of a cemented lens component consisting of a negative lens element and a positive lens element, a second planar lens unit having a positive refractive power, and a third lens unit which has a positive refractive power and is composed of a cemented lens component consisting of a positive lens element and a negative lens element: the second lens unit being composed of a radial gradient-index lens element. The twenty-ninth embodiment is an image transmission optical system which has a numerical aperture of 0.14, an image height of 2.8 mm and a length of 5 mm as measured from an end surface thereof to an image.

The twenty-ninth embodiment uses the first lens unit and the third lens unit which are configured as the cemented lens components for favorably corrected astigmatism in particular. When the image transmission optical system is to be used in a non-flexible endoscope, it is often combined with am objective lens system. Though it is general to cancel astigmatism which is produced by an objective lens system with that produced by an image transmission optical system so as to favorably correct astigmatism in the optical system as a whole to be used in an endoscope, it is desirable, in certain cases, to correct astigmatism favorably in an image transmission optical system alone. The twenty-ninth embodiment is effectively usable in such cases.

The twenty-ninth embodiment has favorably corrected aberrations including astigmatism.

The thirtieth embodiment has a composition similar to that illustrated in FIG. 27, wherein a relay lens system for a single relay cycle is composed, in order from the object side, of a first convexo-planar lens unit which has a positive refractive power, a second planar lens unit having a positive refractive power, and a third plano-convex lens unit which has a positive refractive power: the second lens unit being composed of a radial gradient-index lens element. The thirtieth embodiment is an image transmission optical system which has a numerical aperture of 0.1, an image height of 1.4 mm and a length of 7 mm as measured from an end surface thereof to an image. The thirtieth embodiment is configured so as to favorably correct mainly astigmatism by using aspherical surfaces as an object side surface of the first lens unit and an image side surface of the third lens unit.

The thirtieth embodiment which adopts the combination of the radial gradient-index lens element and the aspherical surfaces corrects all aberrations favorably since longitudinal chromatic aberration and spherical aberration are corrected mainly by the radial gradient-index lens element used as the second lens unit, astigmatism is corrected mainly by the aspherical surfaces disposed on the first lens unit and the third lens unit, and coma, distortion and lateral chromatic aberration are corrected by disposing the object side lens element and the image side lens element symmetrically with regard to the second lens unit.

The aspherical surfaces used in the thirtieth embodiment have shapes which are expressed by the formula shown below:

$$x = \frac{y^2/r}{1 + \sqrt{1 - (y/r)^2}} + \sum_{i=1}^{n} A_{2i} y^{2i}$$

wherein a direction along the optical axis is taken as the x axis, a direction perpendicular to the optical axis is taken as the y axis, the reference symbol r represents a radius of curvature on the optical axis and the reference symbol $A_{2i}$ designates an aspherical surface coefficient.

The thirtieth embodiment features high optical performance though it is composed only of the three lens elements.

Figure 29:
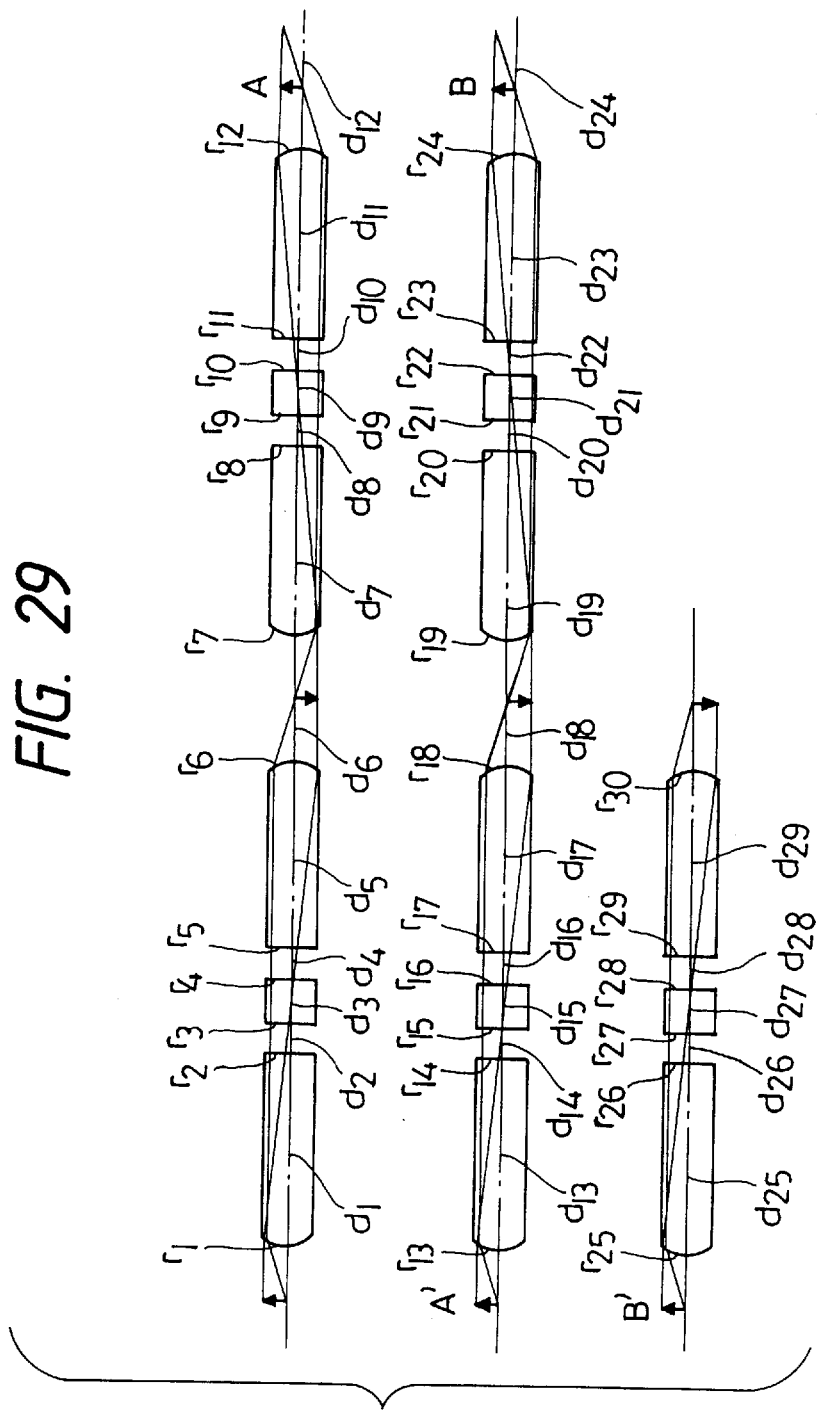
FIG. 29 shows a sectional view illustrating a composition of a thirty-first embodiment of the image transmission optical system according to the present invention.

The thirty-first embodiment has a composition illustrated in FIG. 29, wherein the image transmission optical system preferred as the twenty-fifth embodiment of the present invention is disposed serially in five sets on an optical axis for composing an image transmission optical system performing five image relaying cycles.

Though the thirty-first embodiment uses five sets of the optical system preferred as the twenty-fifth embodiment, it is possible to serially dispose a plurality of sets of other embodiments of the present invention for composing image transmission optical system, each performing a plurality of image relaying cycles.

The thirty-first embodiment has high performance though it is configured so as to perform a plurality, of image relaying cycles.

Figure 30:
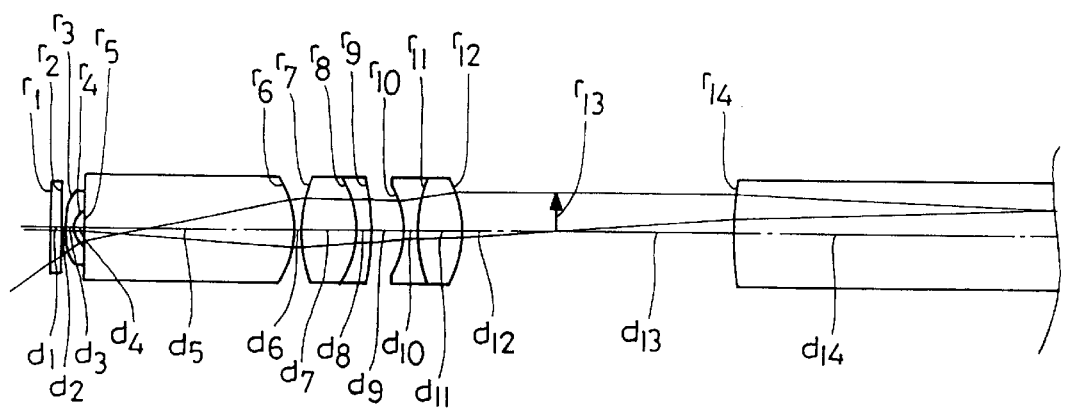
FIG. 30 shows a sectional view illustrating a composition of a thirty-second embodiment of the image transmission optical system according to the present invention.

The thirty-second embodiment has a composition illustrated in FIG. 30, wherein an objective lens system is disposed on the object side of the thirty-first embodiment which performs five image relaying cycles. Shown in FIG. 30 are a composition of the objective lens system and only an object side tip of the image transmission optical system with the other portions of the optical system omitted. The objective lens system adopted for the thirty-second embodiment uses an aspherical surface for correcting mainly distortion. The reference symbol $r_{13}$ represents an image of an object formed by the objective lens system.

The thirty-second embodiment has high optical performance regardless of the composition thereof wherein the objective lens systems is added to the image transmission optical system.

I claim:

1. An image transmission optical system having a magnification of approximately 1×, and comprising:
    at least one radial gradient-index lens element which has a refractive index distribution expressed by the formula (a) shown below, and has positive dispersing powers $V_{00}$ and $V_{10}$, and satisfies the following condition (1):

$$N(r)=N_{00}+N_{10}r^2+N_{20}r^4+ \ldots \tag{a}$$

$$1/V_{10}<1/V_{00} \tag{1}$$

wherein the reference symbol r represents a distance as measured from an optical axis in a radial direction, the reference symbol N(r) designates a refractive index of a lens portion at the radial distance r at a standard wavelength, the reference symbol $N_{00}$ denotes a refractive index of a lens portion located on the optical axis, the reference symbols $N_{10}$ and $N_{20}$ . . . represent refractive index distribution coefficients of the second, fourth, . . . orders respectively at the standard wavelength, and the reference symbols $V_{00}$ and $V_{10}$ designate dispersing powers of the radial gradient-index lens element which have values given by the following formulae respectively:

$$V_{00}=(N_{00d}-1)/(N_{00F}-N_{00C})$$

$$V_{10}=N_{10d}/(N_{10F}-N_{10C})$$

wherein the reference symbols $N_{00d}$, $N_{00F}$ and $N_{00C}$ represent refractive indices of the lens portion located on the optical axis for the d-line, F-line and the C-line respectively, and the reference symbols $N_{10d}$, $N_{10F}$ and $N_{10C}$ designate refractive index distribution coefficients of the second order for the d-line, F-line and C-line respectively.

2. An image transmission optical system comprising:
    a relay lens system for a single image relaying cycle which has a magnification of approximately 1×, and comprising, in order from an object side to an image side, a first lens unit having a positive refractive power; and
    a second lens unit having a positive refractive power, wherein each of said first lens unit and said second lens unit comprises at least one radial gradient-index lens element having a refractive index distribution expressed by the following formula (a):

$$N(r)=N_{00}+N_{10}r^2+N_{20}r^4+ \ldots \tag{a}$$

wherein the reference symbol r represents a distance as measured from an optical axis in a radial direction, the reference symbol N(r) designates a refractive index of a lens portion at the radial distance r at a standard wavelength, the reference symbol $N_{00}$ denotes a refractive index of a lens portion located on the optical axis, and the reference symbols $N_{10}$ and $N_{20}$ . . . represent refractive index distribution coefficients of the second, fourth, orders respectively at the standard wavelength, and comprising at least one radial gradient-index lens element which satisfies the following condition (5):

$$1/V_{10}<2V_{00} \tag{5}$$

wherein the reference symbols $V_{00}$ and $V_{10}$ represent dispersing powers of said radial gradient-index lens elements which are expressed by the following formulae respectively:

$$V_{00}=(N_{00d}1)/(N_{00F}-N_{00C})$$

$$V_{10}=(N_{10d}/(N_{10F}-N_{10C})$$

wherein the reference symbols $N_{00d}$, $N_{00F}$ and $N_{00C}$ represent refractive indices of said radial gradient-index lens element on the optical axis for the d-line, F-line and C-line respectively.

3. An image transmission optical system according to claim 2 wherein each of said lens units comprises a single radial gradient-index lens element.

4. An image transmission optical system according to claim 2 wherein each of said units comprises a cemented lens component consisting of a homogeneous lens element and said radial gradient-index lens element.

5. An image transmission optical system according to claim 4 wherein a lens element disposed on the image side in said first lens unit and a lens element disposed on the object side in said second lens unit are radial gradient-index lens elements.

6. An image transmission optical system according to claim 1 or 2 comprising at least one radial gradient-index lens element which satisfies the following condition (6):

$$N_{10}<0 \tag{6}$$

7. An image transmission optical system according to claim 2 wherein lens elements and said at least one radial gradient-index lens element of said first lens unit have shapes and a refractive index distribution which are substantially the same as those of said lens elements and said at least on radial gradient-index lens element of said second lens unit,
    said first lens unit and said second lens unit are disposed symmetrically on the optical axis, and
    a distance as measured from an object side surface of said first lens unit to an object is nearly equal to a distance as measured from an image side surface of said second lens unit to an image surface.

8. An image transmission optical system according to claim 2 satisfying the following conditions (7), (8), (9) and (10):

$$-0.6<IH/r_1<0.15 \tag{7}$$

$$-1.0<IH/r_2<0.1 \tag{8}$$

$$-0.1<IH/r_3<1.0 \tag{9}$$

$$-0.15<IH/r_4<0.6 \tag{10}$$

wherein the reference symbol IH represents an image height, the reference symbol $r_1$ designates a radius of curvature on an object side surface of said first lens unit, the reference symbol $r_2$ denotes a radius of curvature on the image side surface of said first lens unit, the reference symbol $r_3$ represents a radius of curvature on an object side surface of said second lens unit and the reference symbol $r_4$ designates a radius of curvature the image side surface of said second lens unit.

9. An image transmission optical system according to claim 2 satisfying the following condition (11):

$$5 < HD/IH \tag{11}$$

wherein the reference symbol HD represents a distance as measured from a rear principal point of said first lens unit to a front principal point of said second lens unit and the reference symbol IH designates an image height.

10. An image transmission optical system according to claim 1 or 2 comprising at least one radial gradient-index lens element which satisfies the following condition (12):

$$1.0 < d_G/IH < 50 \tag{12}$$

wherein the reference symbol $d_G$ represents a thickness of said radial gradient-index lens element and the reference symbol IH designates an image height.

11. An image transmission optical system according to claim 1 or 2 comprising at least one radial gradient-index lens element satisfying the following condition (13):

$$0.1 \times 10^{-5} < |N_{10} \times IH^2| < 0.1 \tag{13}$$

wherein the reference symbol $N_{10}$ represents a refractive index distribution coefficient of the second order and the reference symbol IH designates an image height.

12. An image transmission optical system according to claim 1 or 2 comprising at least one radial gradient-index lens element which satisfies the following condition (14):

$$0.1 < \phi_m/\phi < 5 \tag{14}$$

wherein the reference symbol $\phi_m$ represents a refractive power of medium of said radial gradient-index lens element and the reference symbol $\phi$ designates a total refractive power of said radial gradient-index lens element.

13. An image transmission optical system according to claim 5, wherein both said radial gradient-index lens element disposed at the most image side of said first lens unit and said radial gradient-index lens element disposed at the most object side of said second lens unit have flat surfaces on their object and image side surfaces, respectively.

14. An image transmission optical system according to claim 13, wherein said first lens unit consists of only two lens elements and said second lens unit consists of only two lens elements.

15. An image transmission optical system comprising
a relay lens system for a single image relaying cycle which has a magnification of approximately 1×, and comprising, in order from an object side to an image side, a first lens unit having a positive refractive power, a second lens unit having a positive refractive power and being disposed with an air space with respect to said first lens unit, and a third lens unit having a positive refractive power and being disposed with an air space with respect to said second lens unit,
wherein said second lens unit comprises a single radial gradient-index lens element having refractive index distribution expressed by the following formula (a):

$$N(r) = N_{00} + N_{10}r^2 + N_{20}r^4 + \ldots \tag{a}$$

wherein the reference symbol r represents a distance measured from an optical axis in a radial direction, the reference symbol N(r) designates a refractive index of a lens portion at the radial distance r at a standard wavelength, the reference symbol $N_{00}$ denotes a refractive index of a lens portion located on the optical axis, and the reference symbols $N_{10}$ and $N_{20}$ ... represent refractive index distribution coefficients of the second, fourth, ... orders respectively at the standard wavelength.

16. An image transmission optical system according to claim 15 comprising at lest one radial gradient-index lens element which satisfies the following condition (6):

$$N_{10} < 0 \tag{6}$$

wherein the reference symbol $N_{10}$ represent a refractive index distribution coefficient of the second order.

17. An image transmission optical system according to claim 15 comprising at least one radial gradient-index lens element which satisfies the following condition (5):

$$1/V_{10} < 2/V_{00} \tag{5}$$

wherein the reference symbols $V_{00}$ and $V_{10}$ represent dispersing powers of said radial gradient-index lens element which are expressed by the following formulae respectively:

$$V_{00} = (N_{00d} - 1)/(N_{00F} - N_{00C})$$

$$V_{10} = (N_{10d})/(N_{10F} - N_{10C})$$

wherein the reference symbols $N_{00d}$, $N_{00F}$ and $N_{00C}$ represent refractive indices of said radial gradient-index lens element on the optical axis for the d-line, F-line and C-line respectively, and the reference symbols $N_{10d}$, $N_{10F}$ and $N_{10C}$ designate refractive index distribution coefficients of the second order for the d-line, F-line and C-line respectively.

18. An image transmission optical system according to claim 16 comprising at least one radial gradient-index lens element which satisfies the following condition (5):

$$1/V_{10} < 2/V_{00} \tag{5}$$

wherein the reference symbols $V_{00}$ and $V_{10}$ represent dispersing powers of said radial gradient-index lens element which are expressed by the following formulae respectively:

$$V_{00} = (N_{00d} - 1)/(N_{00F} - N_{00C})$$

$$V_{10} = N_{10d}/(N_{10F} - N_{10C})$$

wherein the reference symbols $N_{00d}$, $N_{00F}$ and $N_{00C}$ represent refractive indices of said radial gradient-index lens element on the optical axis for the d-line, F-line and C-line respectively, and the reference symbols $N_{10d}$, $N_{10F}$ and $N_{10C}$ designate refractive index distribution coefficients of the second order for the d-line, F-line and C-line respectively.

19. An image transmission optical system according to claim 15 wherein a number of a single or a plurality of lens elements disposed on the object side of said radial gradient-index lens element is the same as that of a single or a plurality of lens elements disposed on the image side of said radial gradient-index lens element, wherein the lens elements disposed on the object side of said radial gradient-index lens element have radii of curvature and thickness which are substantially the same as those of the lens elements disposed on the image side of said radial gradient-index lens element, and wherein the lens element disposed on the object side of said radial gradient-index lens element and those disposed on the image side of said radial gradient-index lens element are arranged symmetrically with regard to said radial gradient-index lens element.

20. An image transmission optical system according to claim 17 wherein a number of a single or a plurality of lens elements disposed on the object side of said radial gradient-index lens element used as the second lens unit is the same as that of a single or a plurality of lens elements disposed on the image side of said radial gradient-index lens element, wherein the lens elements disposed on the object side of said radial gradient-index lens element have radii of curvature and thickness which are substantially the same as those of the lens elements disposed on the image side of said radial gradient-index lens element, and wherein the lens elements disposed on the object side of said radial gradient-index lens element and those disposed on the image side of said radial gradient-index lens element are arranged symmetrically with regard to said radial gradient-index lens element.

21. An image transmission optical system according to claim 15 comprising at least one radial gradient-index lens element which satisfies the following conditions (2) and (3):

$$|(N_{00}-1)/r_{1G}|<0.9\times 1/f_G \quad (2)$$

$$|(N_{00}-1)/r_{2G}|<0.9\times 1/f_G \quad (3)$$

wherein the reference symbol $N_{00}$ represents a refractive index of said radial gradient-index lens element on the optical axis, the reference symbols $r_{1G}$ nad $r_2G$ designate radii of curvature on an object side surface and an image side surface respectively of said radial gradient-index lens element, and the reference symbol $f_G$ denotes a focal length of said radial gradient-index lens element.

22. An image transmission optical system according to claim 17 comprising at least one radial gradient-index lens element which satisfies the following conditions (2) and (3):

$$|(N_{00}-1)/r_{1G}|<0.9\times 1/F_G \quad (2)$$

$$|(N_{00}-1)/r_{2G}|<0.9\times 1/f_G \quad (3)$$

wherein the reference symbol $N_{00}$ represents a refractive index of said radial gradient-index lens element on the optical axis, the reference symbols $r_{1G}$ nad $r_{2G}$ designate radii of curvature on an object side surface and an image side surface respectively of said radial gradient-index lens element, and the reference symbol $f_G$ denotes a focal length of said radial gradient-index lens element.

23. An image transmission optical system according to claim 15 satisfying the following condition (4):

$$-0.1<N_{10}\times IH^2<0 \quad (4)$$

wherein the reference symbol $N_{10}$ represents a refractive index distribution coefficient of the second order and the reference symbol IH designates an image height.

24. An image transmission optical system according to claim 17 satisfying the following condition (4):

$$-0.1<N_{10}\times IH^2 0 \quad (4)$$

wherein the reference symbol $N_{10}$ represents a refractive index distribution coefficient of the second order and the reference symbol IH designates an image height.

25. An image transmission optical system according to claim 15 satisfying the following condition (15):

$$0.8<d_G/IH<15 \quad (15)$$

wherein the reference symbol $d_G$ represents a thickness of said radial gradient-index lens element and the reference symbol IH designates an image height.

26. An image transmission optical system according to claim 7 satisfying the following condition (15):

$$0.8<d_G/IH<15 \quad (15)$$

wherein the reference symbol $d_G$ represents thickness of said radial gradient-index lens element and the reference symbol IH designates an image height.

27. An image transmission optical system according to claim 1, 2 or 15 satisfying the following conditions (16) and (17):

$$10<EP/IH \quad (16)$$

$$10<OP/IH \quad (17)$$

wherein the reference symbol EP represents a distance as measured from an object surface to an exit pupil, the reference symbol OP designates a distance as measured from an image surface to an exit pupil and the reference symbol IH denotes an image height.

28. An image transmission optical system according to claim 17 satisfying the following conditions (16) and (17):

$$10<EP/IH \quad (16)$$

$$10<OP/IH \quad (17)$$

wherein the reference symbol EP represents a distance as measured from an object surface to an exit pupil, the reference symbol OP designates a distance as measured from an image surface to an exit pupil and the reference symbol IH denotes an image height.

29. An image transmission optical system according to claim 17 satisfying the following condition (1):

$$1/V_{10}<1/V_{00} \quad (1)$$

wherein the reference symbols $V_{00}$ and $V_{10}$ represent dispersing powers of said radial gradient-index lens element which are expressed by the following formulae respectively:

$$V_{00}=(N_{00d}-1)/(N_{00F}-N_{00C})$$

$$V_{10}=N_{10d}/(N_{10F}-N_{10C})$$

wherein the reference symbols $N_{00d}$, $N_{00F}$ and $N_{00C}$ represent refractive indices of said radial gradient-index lens element on the optical axis for the d-line, F-line and C-line respectively, and the reference symbols $N_{10d}$, $N_{10F}$ and $N_{10C}$ designate refractive index distribution coefficients of the second order for the d-line, F-line and C-line respectively.

30. An image transmission optical system according to claim 1, 2 or 15 comprising at least one radial gradient-index lens element which has planar surfaces on both sides thereof.

31. An image transmission optical system according to claim 17 comprising at least one radial gradient-index lens element which has planar surfaces on both side thereof.

32. An image transmission optical system according to claim 1, 2 or 15 wherein an object and image formed in a relay lens system for a single image relaying cycle are located outside lens elements.

33. An image transmission optical system according to claim 17 wherein an object and an image formed in a relay lens system for a single image relaying cycle are located outside lens elements.

34. An image transmission optical system according to claim 1, 2, 15, 3, 4 or 5 wherein a plurality of said relay lens systems for a single image relaying cycle are disposed on an optical axis for relaying an object a plurality of cycles.

35. An image transmission optical system according to claim 15, wherein said second lens unit consists of only one lens element, and the one lens element of said second lens unit comprises a radial gradient-index lens element.

36. An image transmission optical system according to claim 35, wherein said first lens unit consists of only one homogenous lens element, and said third lens unit consists of only one homogenous lens element.

37. An image transmission optical system according to claim 36, wherein said radial gradient-index lens element of said second lens unit has flat surfaces on its object and image side surfaces.

38. An image transmission optical system having a magnification of approximately 1×, and comprising:

at least one radial gradient-index lens element which has a refractive index distribution expressed by the formula (a) shown below, and has positive dispersing powers $V_{00}$ and $V_{10}$ and satisfies the following condition (1):

$$N(r)=N_{00}+N_{10}r^2+N_{20}r^4+\ldots \quad (a)$$

$$1/V_{10} < 1/V_{00} \quad (1)$$

wherein the reference symbol r represents a distance as measured from an optical axis in a radial direction, the reference symbol N(r) designates a refractive index of a lens portion at the radial distance r at a standard wavelength, the reference symbol $N_{00}$ denotes a refractive index of a lens portion located on the optical axis, the reference symbols $N_{10}$ and $N_{20}$ . . . represents refractive index distribution coefficients of the second, fourth, . . . orders respectively at the standard wavelength, and the reference symbols $V_{00}$ and $V_{10}$ designate dispersing powers of the radial gradient-index lens element which have values given by the following formula respectively:

$$V_{00}=(N_{00d}-1)/(N_{00F}-N_{00C})$$

$$V_{10}=N_{10d}/(N_{10F}-N_{10C})$$

wherein the reference symbols $N_{00d}$, $N_{00F}$ and $N_{00C}$ represent refractive indices of the lens portion located on the optical axis for the d-line, F-line and the C-line respectively, and the reference symbols $N_{10d}$, $N_{10F}$ and $N_{10C}$ designate refractive index distribution coefficients of the second order for the d-line, F-line and C-line respectively, and said radial gradient-index lens element has a diameter at a central portion thereof which is different from a diameter at both ends thereof as viewed in a direction along a width thereof.

39. An image transmission optical system comprising a relay lens system for a single image relaying cycle which has a magnification of approximately 1×, and comprising, in order from an object side to an image side, a first lens unit having a positive refractive power; and a second lens unit having a positive refractive power, wherein each of said first lens unit and said second lens unit comprises at least one radial gradient-index lens element having a refractive index distribution expressed by the following formula (a):

$$N(r)=N_{00}+N_{10}r^2+N_{20}r^4+\ldots \quad (a)$$

wherein the reference symbol r represents a distance as measured from an optical axis in a radial direction, the reference symbol N(r) designates a refractive index of a lens portion at the radial distance r at a standard wavelength, the reference symbol $N_{00}$ denotes a refractive index of a lens portion located on the optical axis, and the reference symbols $N_{10}$ and $N_{20}$ . . . represent refractive index distribution coefficients of the second, fourth, . . . orders respectively at the standard wavelength, and said radial gradient-index lens element has a diameter at a central portion thereof which is different from a diameter at both ends thereof as viewed in a direction along a width thereof.

40. An image transmission optical system according to claim 39 wherein each of said lens units comprises of a single radial gradient-index lens element.

41. An image transmission optical system according to claim 39 wherein each of said lens units comprises a cemented lens component consisting of a homogeneous lens element and said radial gradient-index lens element.

42. An image transmission optical system according to claim 41 wherein a lens element disposed on the image side in said first lens unit and a lens element disposed on the object side in said lens unit are radial gradient-index lens elements.

43. An image transmission optical system comprising a relay lens system for a single image relaying cycle which has a magnification of approximately 1×, and comprising, in order from an object side to an image side, a first lens unit having a positive refractive power, a second lens unit having a positive refractive power, and a third lens unit having a positive refractive power, wherein said second lens unit comprises a single radial gradient-index lens element having refractive index distribution expressed by the following formula (a):

$$N(r)=N_{00}+N_{10}r^2+N_{20}r^4+\ldots \quad (a)$$

wherein the reference symbol r represents a distance measured from an optical axis in a radial direction, the reference symbol N(r) designates a refractive index of a lens portion at the radial distance r at a standard wavelength, the reference symbol $N_{00}$ denotes a refractive index of a lens portion located on the optical axis, and the reference symbols $N_{10}$ and $N_{20}$ . . . represent refractive index distribution coefficients of the second, fourth, . . . orders respectively at the standard wavelength, wherein said raid gradient-index lens element has a diameter at a central portion thereof which is different from a diameter at both ends thereof as viewed in a direction along a width thereof.

* * * * *